(12) United States Patent
Wilhelm et al.

(10) Patent No.: US 12,315,196 B2
(45) Date of Patent: May 27, 2025

(54) DETERMINING POSITION USING COMPUTER VISION, LIDAR, AND TRILATERATION

(71) Applicant: Ohio University, Athens, OH (US)

(72) Inventors: Jay Paul Wilhelm, Athens, OH (US);
Travis Wade Moleski, Nelsonville, OH (US)

(73) Assignee: Ohio University, Athens, OH (US)

( * ) Notice: Subject to any disclaimer, the term of this patent is extended or adjusted under 35 U.S.C. 154(b) by 426 days.

(21) Appl. No.: 17/838,609

(22) Filed: Jun. 13, 2022

(65) Prior Publication Data

US 2022/0327737 A1    Oct. 13, 2022

Related U.S. Application Data

(63) Continuation-in-part of application No. PCT/US2020/064865, filed on Dec. 14, 2020.
(Continued)

(51) Int. Cl.
*G06T 7/00* (2017.01)
*G06T 7/73* (2017.01)
*G06V 10/22* (2022.01)

(52) U.S. Cl.
CPC .............. *G06T 7/75* (2017.01); *G06V 10/225* (2022.01); *G06T 2207/10028* (2013.01)

(58) Field of Classification Search
CPC . G06T 2207/10028; G06T 2207/30252; G06T 2207/30244; G06T 7/70; G06T 7/73; G06T 2207/30241; G06T 7/11; G06T 7/50; G06T 7/68; G01S 17/89; G01S 17/86; G01S 7/4808; G01S 13/931; G01S 17/42;
(Continued)

(56) References Cited

U.S. PATENT DOCUMENTS 9,165,410 B1    10/2015    Bell et al.
2005/0008193 A1*    1/2005    Toyama ................... G06T 7/20
                                                       382/103
(Continued)

OTHER PUBLICATIONS

Sefati, Mohsen, et al. "Improving vehicle localization using semantic and pole-like landmarks." 2017 IEEE Intelligent Vehicles Symposium (IV). IEEE, 2017.*
(Continued)

*Primary Examiner* — Li Liu
(74) *Attorney, Agent, or Firm* — Wood Herron & Evans LLP

(57) ABSTRACT

Systems, methods, and computer program products for determining the position of a first point in space. A three-dimensional point cloud is generated that comprises a plurality of data points each defining a range from the first point in space to another point in space in a region around the first point. A two-dimensional image is captured of an area including at least some of the points to which ranges have been defined. One or more objects each corresponding to a landmark are identified in the two-dimensional image, and one or more of the data points are mapped to each object. A range to each of the one or more landmarks is determined based on the ranges defined by data points mapped to the objects. A position of the first point in space is then obtained based on known positions of the landmarks using trilateration.

20 Claims, 36 Drawing Sheets

Related U.S. Application Data

(60) Provisional application No. 62/947,623, filed on Dec. 13, 2019.

(58) Field of Classification Search
CPC ......... G01S 19/42; G01S 17/06; G06V 20/56; G06V 10/225; G06V 10/764; G06V 20/58; G06V 20/582; G06V 20/64; G06V 20/647; G06V 2201/07
See application file for complete search history.

(56) References Cited

U.S. PATENT DOCUMENTS

| | | | |
|---|---|---|---|
| 2014/0133749 A1 | 5/2014 | Kuo et al. | |
| 2018/0045519 A1* | 2/2018 | Ghadiok | ................... G06T 7/74 |
| 2018/0190016 A1 | 7/2018 | Yang | |
| 2019/0145781 A1* | 5/2019 | Iwai | ..................... G06V 20/582 |
| | | | 702/150 |
| 2019/0258225 A1 | 8/2019 | Link et al. | |
| 2020/0369351 A1* | 11/2020 | Behrendt | ............... G06V 20/00 |
| 2021/0278217 A1* | 9/2021 | Kato | ....................... G01C 21/30 |
| 2022/0012916 A1* | 1/2022 | Srinivasan | ............ G06V 20/56 |
| 2022/0270268 A1* | 8/2022 | Radha | ................ G06V 10/7715 |
| 2022/0277480 A1* | 9/2022 | Tokuhiro | ............... G01C 21/30 |
| 2023/0284550 A1* | 9/2023 | Yuasa | ..................... G05D 1/024 |

OTHER PUBLICATIONS

Zhao, Xiangmo, et al. "Fusion of 3D LIDAR and camera data for object detection in autonomous vehicle applications." IEEE Sensors Journal 20.9 (2020): 4901-4913.*

PCT Office, International Search Report and Written Opinion issued in PCT/US2020/064865 dated Mar. 17, 2021.

* cited by examiner

DETERMINING POSITION USING COMPUTER VISION, LIDAR, AND TRILATERATION

CROSS-REFERENCE TO RELATED APPLICATIONS

The present application claims the benefit of co-pending International Application Serial No. PCT/US2020/064865 filed Dec. 14, 2020 claiming priority from U.S. Provisional Application Ser. No. 62/947,623, filed Dec. 13, 2019, the disclosures of which are each incorporated by reference herein in their entirety.

BACKGROUND

This invention generally relates to methods of determining position and, in particular, to methods, systems, and computer program products for enhancing accuracy of a global position determined for a vehicle using images of landmarks captured from the vehicle.

Autonomous vehicles may be used for tasks that rely on accurate and robust position data to navigate through a region. These vehicles typically estimate their position globally due to local estimations not being enough for full routing. The Global Positioning System (GPS) is the de-facto standard in global position estimation. However, indoor and urban canyon environments typically do not allow GPS signals to be received reliably at the vehicle due to attenuation or serious multi-path interference of the signals. Thus, estimating global position using GPS often lacks accuracy in these environments.

Techniques that use object identification or landmarks to replace or supplement GPS information have been used in an attempt to address accuracy issues caused by poor GPS signals. These techniques rely on the ability to positively identify landmarks so that the global positions of the landmarks can be determined. However, identifying landmarks has proven to be difficult in practice.

Thus, there is a need for improved systems, methods, and computer program products for enhancing the accuracy of positioning systems, and in particular, that enable positioning systems to recognize landmarks and use data relating to these landmarks to increase the accuracy of position determinations.

SUMMARY

In an embodiment of the invention, a method of determining a position of a point in space is provided. The method includes capturing a two-dimensional image from the point in space, and identifying an object in the two-dimensional image that corresponds to a landmark. The method further includes collecting range data for the landmark including one or more data points each defining a distance from the point in space to a respective point on the landmark. The method further maps a pixel of the object to a first data point of the range data, and estimates the position of the point in space based on the position of the landmark and a range to the landmark determined at least in part from the first data point.

In an aspect of the method, the plurality of data points may comprise a three-dimensional point cloud.

In another aspect of the method, mapping the pixel of the object to the first data point of the range data may include determining a centroid of the object, projecting the point cloud onto the two-dimensional image, converting projected vertex coordinates into pixel coordinates, and selecting the data point from the point cloud that produces the pixel coordinate nearest the centroid of the object as the first data point.

In another aspect of the method, the pixel may be one of a plurality of pixels of the object each mapped to a respective data point of the three-dimensional point cloud, and the method may further include computing the range to the landmark as the distance from the point in space to the first data point plus an offset, wherein the offset is an estimated distance from the surface of the landmark corresponding the first data point and a three-dimensional point of the landmark associated with a known location of the landmark.

In another aspect of the method, the pixel may be one of a plurality of pixels of the object each mapped to a respective data point of the three-dimensional point cloud, and method may further include fitting the respective data points of the three-dimensional point cloud to a spherical surface, determining a center point of the spherical surface, and computing the range to the landmark as the distance from the point in space to the center point of the spherical surface.

In another aspect of the method, the two-dimensional image may be one of a group of one or more two-dimensional images captured from the point in space, and the object may be one of a plurality of objects identified in at least one of the one or more two-dimensional images. Each of the plurality of objects may correspond to a respective landmark, and the method may further include identifying one or more additional objects in one or more of the one or more two-dimensional images that correspond to one or more additional landmarks, collecting range data for each of the one or more additional landmarks, the range data including a plurality of data points each defining the distance from the point in space to a respective point on the respective landmark, mapping, for each of the one or more pluralities of data points, a pixel of the respective object to a data point of the respective plurality of data points, and estimating the position of the point in space based on each distance defined by each mapped data point and the respective position of each landmark using trilateration.

In another aspect of the method, identifying the landmark in pixel coordinates may include masking the two-dimensional image according to a color threshold for the object, and determining a location of the object within the two-dimensional image using color based object detection.

In another aspect of the method, the method may further include calculating a centroid of the object by defining an image moment of the masked two-dimensional image using a weighted average of pixel intensities.

In another aspect of the method, the object may be one of a plurality of objects in the two-dimensional image each corresponding to a respective landmark, and a respective color threshold may be defined for each object in the two-dimensional image.

In another aspect of the method, curve fitting may be used to determine the distance from the point in space to the respective point in the respective landmark.

In another embodiment of the invention, an apparatus is provided. The apparatus includes an imaging sensor, a ranging device, one or more processors, and a memory coupled to the one or more processors and including program code. The program code is configured so that, when it is executed by the one or more processors, it causes the apparatus to capture the two-dimensional image from the point in space, identify the object in the two-dimensional image that corresponds to the landmark, collect the range data for the landmark including the one or more data points each defining the distance from the point in space to the respective point on the landmark, map the pixel of the object to the first data point of the range data, and estimate the position of the point in space based on the position of the landmark and the range to the landmark determined at least in part from the first data point.

In an aspect of the apparatus, the one or more data points may comprise the three-dimensional point cloud.

In another aspect of the apparatus, the program code may cause the apparatus to map the pixel of the object to the first data point of the range data by determining the centroid of the object, projecting the point cloud onto the two-dimensional image, converting projected vertex coordinates into pixel coordinates, and selecting the data point from the point cloud that produces the pixel coordinate nearest the centroid of the object as the first data point.

In another aspect of the apparatus, the pixel may be one of the plurality of pixels of the object each mapped to the respective data point of the three-dimensional point cloud, and the program code may further cause the apparatus to compute the range to the landmark as the distance from the point in space to the first data point plus the offset, wherein the offset may be the estimated distance from the surface of the landmark corresponding the first data point and the three-dimensional point of the landmark associated with the known location of the landmark.

In another aspect of the apparatus, the pixel may be one of the plurality of pixels of the object each mapped to the respective data point of the three-dimensional point cloud, and the program code may further cause the apparatus to fit the respective data points of the three-dimensional point cloud to the spherical surface, determine the center point of the spherical surface, and compute the range to the range to the landmark as the distance from the point in space to the center point of the spherical surface.

In another aspect of the apparatus, the two-dimensional image may be one of the group of one or more two-dimensional images captured from the point in space, the object may one of the plurality of objects identified in at least one of the one or more two-dimensional images each corresponding to the respective landmark, and the program code may further cause the apparatus to identify one or more additional objects in one or more of the one or more two-dimensional images that correspond to one or more additional landmarks, collect range data for each of the one or more additional landmarks including the plurality of data points each defining the distance from the point in space to the respective point on the respective landmark, map, for each of the one or more pluralities of data points, the pixel of the respective object to the data point of the respective plurality of data points, and estimate the position of the point in space based on each distance defined by each mapped data point and the respective position of each landmark using trilateration.

In another aspect of the apparatus, the program code may further cause the apparatus to identify the landmark in pixel coordinates by masking the two-dimensional image according to the color threshold for the object, and determining the location of the object within the two-dimensional image using color based object detection.

In another aspect of the apparatus, the program code may further cause the apparatus to calculate the centroid of the object by defining the image moment of the masked two-dimensional image using the weighted average of pixel intensities.

In another aspect of the apparatus, the program code may cause the apparatus to determine the distance from the point in space to the respective point in the respective landmark using curve fitting.

In another embodiment of the invention, a computer program product is provided. The computer program product includes a non-transitory computer-readable storage medium, and program code stored on the non-transitory computer-readable storage medium. The program code is configured so that, when it is executed by one or more processors, it causes the one or more processors to capture the two-dimensional image from the point in space, identify the object in the two-dimensional image that corresponds to the landmark, collect range data for the landmark, the range data including one or more data points each defining the distance from the point in space to the respective point on the landmark, map the pixel of the object to the first data point of the range data, and estimate the position of the point in space based on the position of the landmark and the range to the landmark determined at least in part from the first data point.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Figure 1:
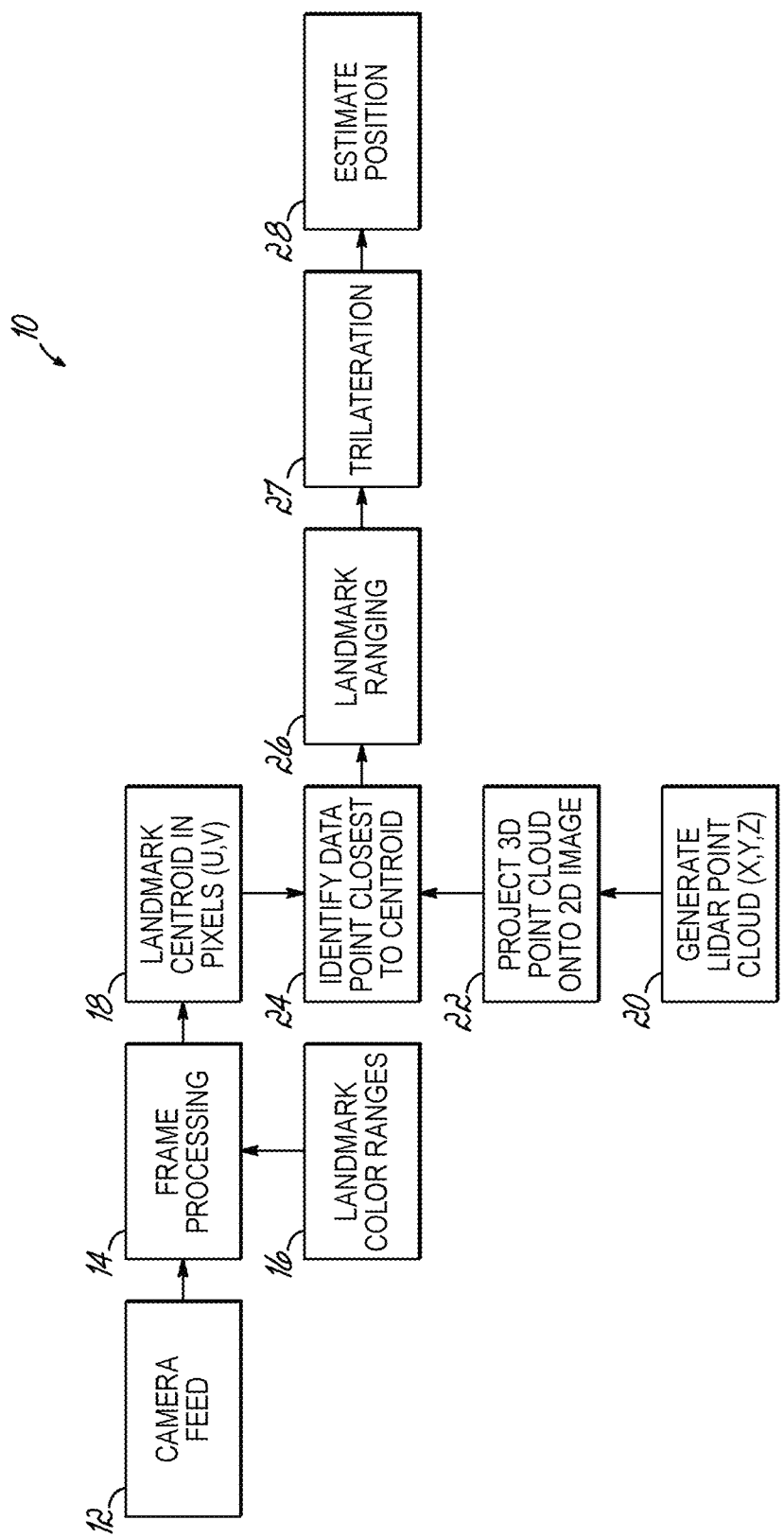
FIG. 1 is a diagrammatic view of a process for determining a position based on a three-dimensional point cloud of data points indicating ranges to one or more landmarks, and a two-dimensional image including the one or more landmarks.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION

Fundamental techniques for position estimation from known landmarks include trilateration, multilateration, and triangulation. GPS relies on multilateration, a process which assumes landmarks exist in space that have known absolute positions and that an object is able to estimate the distance to each respective landmark. Multilateration positioning uses the Time Difference of Arrival (TDoA) of synchronized clocks to position the transmitter relative to known locations of receiving towers. Trilateration relies upon known landmark positions and measured ranges that solves a set of distance equations with the object position as the common variable. Triangulation position estimation assumes that reference points are known and that the angle between the observer and reference points can be measured to construct a triangle. Embodiments of the present invention use trilateration to estimate position based on ranges to landmarks having a known position measured using LiDAR.

To improve the ability of positioning systems to recognize landmarks, embodiments of the invention combine color or other visual features of a landmark with the shape of the landmark. The addition of visual features improves the system's ability to identify landmarks. Embodiments of the invention can then hybridize point clouds comprising range data to the landmark with a color or infrared (IR) image of the same scene. The resulting hybrid data can be used to identify and range landmarks to estimate a global position. Visual classification of landmarks in a scene and laser ranging may be hybridized using a camera and scanning LiDAR facing the same direction. This hybrid landmark localization process has been evaluated using computer vision from simulated environments, and resulted in an average position error of 0.08 meters in a two-dimensional space. When extended to three dimensions, the error increased due to limited landmark separation in the third direction. The developed hybrid camera-LiDAR provided a successful position estimation for different landmark views.

Techniques used to replace or supplement GPS information to address accuracy issues caused by poor signals may rely on object identification or landmarks combined with ranging to these objects. The position of a vehicle relative to one or more landmarks can then be determined and globalized if the position of the landmark is known globally, e.g., by identifying and selecting ranging points specific to globally known landmarks, and using these ranging points for position estimation using, for example, trilateration.

One problem with these solutions that is solved by embodiments of the invention lies in combining the process of identifying a landmark so that its global position can be looked up and accurate ranging measurements. Accurate range measurements may be obtained using a LiDAR sensor, which is essentially a scanning laser array, or some other suitable ranging device. Point clouds can be built from the range data and a very accurate picture of the three-dimensional environment around the sensor can be utilized. However, landmarks are difficult to identify using only LiDAR because the shape of the landmark is the only discernible feature. Small gaps in the laser scan, along with a limited perspective of the landmark, can leave large data gaps.

To address this problem, LiDAR range data may be converted to Cartesian coordinates, e.g., by converting received LiDAR data from spherical coordinates to three-dimensional cartesian coordinates using azimuth and elevation of each laser based on the position of the LiDAR on the vehicle. The LiDAR Cartesian coordinates may then be mapped to image pixel coordinates. The LiDAR three-dimensional Cartesian coordinates may be converted to pixel coordinates using the camera's projection, translation, and rotation matrices. Camera and LiDAR positions along with vehicle position may also be used.

Once the conversions have been made, the image frame may be searched for desired landmarks using computer vision (color, shape, text, etc.). Landmarks can be any distinct global feature if the classifier and global position is known a priori. Stop signs, road signs, buildings, business logos, hospital signs, lights, etc. may all be used as landmarks. The centroid and bounding polygon of the landmark may then be determined in pixel coordinates, and the polygon searched for LiDAR points by co-locating LiDAR distances within detected landmark bounding polygons.

The range from the LiDAR unit to a landmark may be determined for the nearest LiDAR generated ranging point to the landmark's centroid and by calculating the magnitude of the LiDAR's cartesian coordinate data to find the range, referred to as the single point method. In an alternative embodiment, a surface fitting method may be used in which an overlay of a known landmark three-dimensional shape onto detected two-dimensional shape is used to improve the distance measurement.

Using the range data and a-priori global position for each landmark, the position of each landmark relative to the LiDAR unit may be determined by minimizing a cost function error (e.g., least squares or mean-square) between the measured range and an estimated range.

Embodiments of the invention cross reference camera and LiDAR data and use that shared information for positioning vehicles (such as an Unmanned Aerial Vehicle (UAV)) based on trilateration. One benefit of the mapping/sharing of information is more accurate specific landmark ranging as compared to computer vision techniques alone. Applications of this technology include ranging and detection of humans in an environment for more reliable autonomous system integration into pedestrian congested areas, identification and tracking of human performance or organs during surgery, and use in safety systems that can track and identify harmful situations for workers near large moving equipment or robots. The systems and methods described herein may be used in an autonomous ground vehicle, and may include co-operative positioning where one or more other moving vehicles are used as landmarks to further improve position accuracy.

Exemplary commercial applications include improved autonomous system navigation reliability in urban environments for human transportation (e.g., Uber, Lyft) or package delivery or indoor warehouse management (e.g., Amazon). Integration into connected vehicle (CV) and automated vehicle (AV) systems may increase accuracy of positioning solutions as the number of vehicles on the road increases, and allow increased traffic density. This feature may be of particular interest to departments of transportation and commercial trucking companies. Applications are not limited to terrestrial use. For example, embodiments of the invention may be used to enhance navigation data for autonomous systems landing on celestial bodies.

Sensor simulations with camera and LiDAR have been performed and compared to simulated GPS, and working simulations of processes in accordance with embodiments of the invention have been fully developed in simulation. A ground vehicle in Microsoft's AirSim has been simulated with camera and LiDAR. With the simulated sensors, the trilateration processes described herein have been compared to simulated GPS within simultaneous localization and mapping. Position estimation methods based on single point landmark ranges generated an average X and Y error of 0.05 m for 100 data points for a static vehicle. Position estimation methods based on surface fitting landmark ranges showed about a 28.3% improvement in accuracy over single point methods. These processes are advantageous in that they require less computer processing than stereo cameras and surface mapping while giving accurate position estimation.

In addition to the use of Red-Green-Blue (RGB) based cameras and color, other types of imaging sensors and characteristics of landmarks may be used to identify the landmarks. Characteristics of landmarks may include, but are not limited to, the shape, infrared strength or temperature, patterns, and Radio Frequency (RF) signatures. Characteristics of the landmarks can be used individually or in combinations to identify the landmarks. By way of example, stop signs or signs in general (with text or shapes) have distinctive shapes. Particular buildings, doors and windows on buildings, the arrangement of patterns on buildings, store signs with their logos (e.g., Starbucks) could all provide distinctive shapes in captured images that would allow the system to recognize the landmark. Distinctive temperature gradients may be generated by the positioning of lights, Heating, Ventilation, and Air Conditioning (HVAC) units, or due to variations in the thermal properties of the building. Radio towers may be identifiable based on their shape and the characteristics of their RF emissions, which could provide a unique set of features used for identification. Machine learning (e.g., reinforcement training) or deep learning may be trained for use in identifying the landmarks from various sensor sources.

Trilateration positioning solutions based on known landmarks may be used for navigation in indoor environments. Solutions to trilateration problems may require knowledge of global positions of landmarks and that an observer can identify and range each respective landmark. Typical methods for landmark detection and ranging solely rely on camera feedback, which may not present reliable results for small indoor environments. Camera based techniques may be useful for object detection, but may lack accuracy when ranging. LiDAR may be used to generate range data, but may lack an ability to be used for object detection alone. Embodiments of the present invention may use monocular vision for object detection while using LiDAR for object ranging. Color matching may be used to identify landmarks while LiDAR may be used to range each respective landmark using a pinhole camera projection model. No-noise sensor simulations using AirSim® software were used to determine ideal landmark placement and investigate optimization algorithm performance. AirSim software is available from the Microsoft Corporation of Redmond, Washington, United States. Simulations with noise models were evaluated using a hybrid camera-LiDAR positioning method. Finally, experiments were performed to verify the real-time feasibility of the hybrid camera-LiDAR method and determine the systems performance when compared to results obtained using Vicon motion capture software, which is available from Vicon Motion Systems Limited of Yarnton, England.

Embodiments of the present invention use trilateration positioning based on a hybrid camera-LiDAR system. Monocular vision may be used for landmark identification while LiDAR may be used for landmark ranging. Object identification may be performed based on color using OpenCV, which is an open source library of programming functions originally developed for computer vision applications by the Intel Corporation of Santa Clara, California Each landmark may be assigned unique pixel RGB values. Each respective color range may then be calculated to obtain pixel coordinates that can be mapped to three-dimensional LiDAR data using a pinhole camera projection model. Embodiments of the invention may consider landmark identification solely based on color ranges, or may also use landmarks such as buildings or other distinct global features.

For a set of landmarks, a monocular RGB camera feed may be used for object identification based on color matching, and may be performed to identify each landmark's centroid in pixel coordinates. Landmark ranging may then be performed by mapping pixel coordinates to LiDAR data and finding the closest LiDAR data to each landmark's centroid. After determining each landmark's range from the UAV, the respective landmark positions and ranges may be used as input to a trilateration process. The trilateration process may use an optimization algorithm that minimizes the least squares error for a set of distance equations from the UAV to each landmark.

Landmarks such as buildings, signs, street intersections, or other distinct features can be used as position references given their known location. Hybridizing visual classification of landmarks in a scene and laser ranging can be achieved using a camera and scanning LiDAR facing the same direction. Vehicle distance from a landmark can then be measured using scanning LiDAR where the three-dimensional ranges generated by the LiDAR are matched to two-dimensional images of scenes with landmarks. Computer vision may be used to correlate a two-dimensional landmark location to a three-dimensional range. Advantageously, this may only require a few ranges that can quickly be extracted from a scanning LiDAR instead of processing hundreds of thousands of data points. Hybrid visual and ranging position estimation may provide an alternative localization process that utilizes existing sensors on autonomous vehicles and has the potential to improve navigation and safety of systems operating in denied environments.

FIG. 1 illustrates an exemplary process 10 for estimating a position in accordance with an embodiment of the invention. The process 10 may generally operate by identifying landmarks in an image frame, and projecting data points from a three-dimensional point cloud onto the image frame. The data points from the point cloud associated with projected points closest to the center of each landmark in the image frame may then be identified. The three-dimensional data points associated with the selected projected points may then be used for range approximation to determine a position, e.g., of a vehicle.

In block 12, the process 10 may receive image data from a camera, e.g., a color camera that outputs red, green, and blue image data, or "RGB camera". In block 14, the process 10 may perform frame processing on the image data received from the camera. The frame processing may, for example, use landmark color ranges 16 (e.g., predetermined color ranges or thresholds stored in local memory) to identify one or more landmarks in the image data by masking the image for a color range. In block 18, the process 10 may determine a centroid of each two-dimensional landmark object identified in the image data. The centroid of each landmark object may be determined, for example, based on a weighted average pixel intensity of the landmark object.

In block 20, the process 10 may generate a point cloud comprising a plurality of three-dimensional data points $P_D(x,y,z)$ each associated with a ranging point on the surface of an object. The ranging point may be generated by a laser beam emitted by a scanning LiDAR unit. In block 22, the three-dimensional point cloud data may be projected on to a two-dimensional image, e.g., an image obtained from the camera feed 12. This projection may generate a set of two-dimensional data points $P_D(u,v)$ that overlays the pixels of the image. In block 24, the process 10 may identify the two-dimensional data point $P_D(u,v)$ closest to the centroid of each landmark object in the image. In block 26, the process 10 may determine a range to each of the one or more landmarks based on the distance from the LiDAR unit to the three-dimensional data point $P_D(x,y,z)$ associated with the projected two-dimensional data point $P_D(u,v)$ closest to the centroid of the landmark in question. To compensate for differences in the position of the data point $P_D(x,y,z)$ and the center of the landmark, the process 10 may add an offset to the range data. This offset may comprise an estimated distance from the surface of the landmark corresponding the data point $P_D(x,y,z)$, and a three-dimensional point of the landmark associated with the known location of the landmark, e.g., a point located in the center of the landmark. Surface fitting to landmarks may also be used to improve navigation position estimation. Known landmark position and shapes may enable surface fitting to be performed.

Once the ranges to the one or more landmarks have been determined, the process 10 may proceed to block 27 and perform trilateration to determine the position of a solution point $P_S(x,y,z)$. This position may be one that solves or minimizes the error for a trilateration algorithm given the three-dimensional data points $P_D(x,y,z)$ identified as being closest to the landmark centroids. In block 28, the process 10 may estimate a position of the vehicle based on the position of the solution point $P_S(x,y,z)$.

Figure 2:
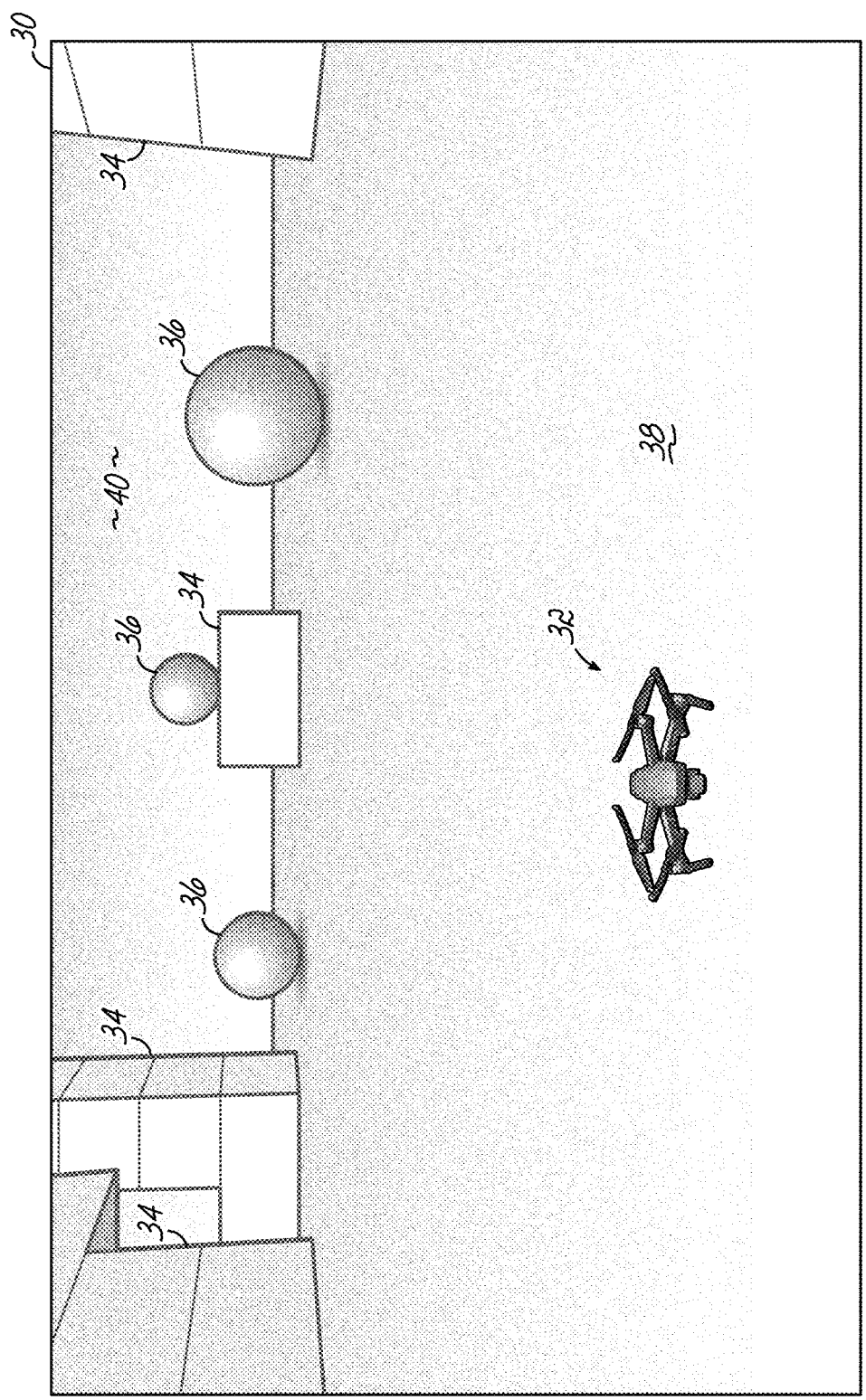
FIG. 2 is a diagrammatic view of an environment including landmarks which may be used to determine the position of a vehicle using the process of FIG. 1.

FIG. 2 depicts an environment 30 for conducting a no-noise sensor simulation. The environment 30 may include a UAV 32, obstacles 34, landmarks 36, a surface 38 (e.g., the ground), and an empty zone 40 (e.g., the sky). The simulation may identify the best performing optimization algorithm, as well as determine the effects of landmark placement and number with regard to simulated GPS. Simulations were performed that included uncertainties in sensor measurements to identify the operation limits of an embodiment of the present invention. Finally, experiments using a ground robot to prove real-time feasibility were performed with the goal of evaluating conclusions from sensor simulation. Simulations used AirSim to simulate default vehicles that included a quadrotor UAV and a car in which the vehicle dynamics of each vehicle could be manipulated. AirSim can be used to create multiple vehicle scenarios, simulate sensors, manipulate vehicle dynamics models, change lighting conditions, and add objects.

Figure 3:
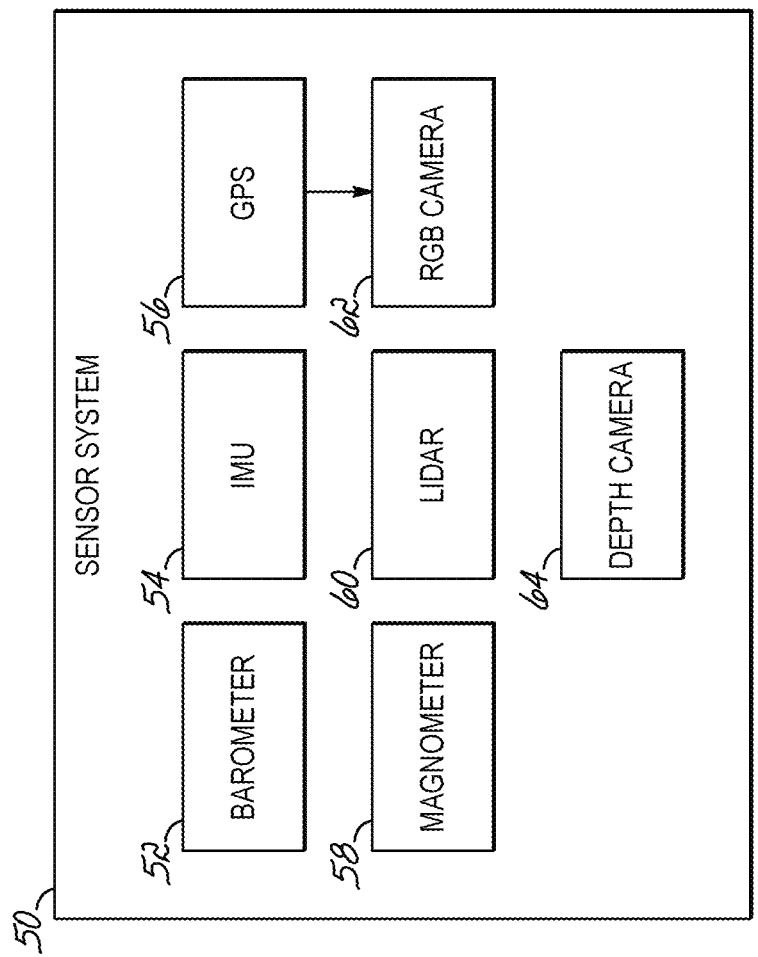
FIG. 3 is a diagrammatic view of a sensor system including a LiDAR unit and a camera that may be used to generate the three-dimensional point cloud and two-dimensional image, respectively, of FIG. 1.

FIG. 3 depicts an exemplary sensor system 50 that may provide sensor data for determining the position of a vehicle. The system 50 may include one or more of a barometer 52, an Inertial Measurement Unit (IMU) 54, a GPS unit 56, a magnetometer 58, a LiDAR unit 60, an RGB camera 62, and a depth camera 64. For the experimental results discussed below, simulated data from the GPS unit 56, LiDAR unit 60, and RGB camera 62 was used. Spheres each having a unique color were used as the landmarks 36, and a quadrotor UAV 32 was used to simulate vehicle dynamics.

Sensor simulation may be used to identify an optimization method for the trilateration solution that produces the least amount of deviation from the baseline simulated ground truth GPS output from AirSim. Other desired results from sensor simulation may include the effects of landmark location, effects of landmark number, and the best performance that can be obtained using this method with regard to deviation from the baseline ground truth GPS value.

Trilateration positioning may assume that landmark coordinates are known and that the observer is able to measure the distance to each landmark. In an embodiment of the invention, a trilateration positioning method was used that assumed landmark absolute positions were known. In general, a solution to the trilateration problem is a solution point $P_S(x,y,z)$ that satisfies the following set of distance equations:

$$r_i^2 = (x-x_i)^2 + (y-y_i)^2 + (z-z_i)^2 \qquad \text{Eqn. 1}$$

where $x_i$, $y_i$, and $z_i$ represent the coordinates of the absolute known position of a reference point $L(x_i,y_i,z_i)$ (e.g., a point on a landmark), and $r_i$ is the range from the solution point $P_S(x,y,z)$ to the reference point $L(x_i,y_i,z_i)$. The solution point $P_S(x,y,z)$ is typically at or near the location of an observer (e.g., a sensor on a vehicle).

The solution point $P_S(x,y,z)$ may be obtained in closed form. However, in cases where errors exist, the closed form becomes more complex as more landmarks are introduced, and cannot be solved for over-determined scenarios where there are more landmarks than there are dimensions to be solved. To avoid these issues, an optimization approach may be taken which allows for error in the system and facilitates the introduction of additional landmarks. One type of optimization approach to estimating the position of the solution point $P_S(x,y,z)$ uses numerical optimization. Optimization methods have been evaluated to determine an algorithm which generates the least error when compared to ground truth GPS values in AirSim. Advantageously, using a numerical optimization approach to the trilateration problem enables use of an arbitrary number of landmarks. The trilateration solution may assume the landmark locations are known and that distances to those landmarks can be measured. The function to be minimized from Equation 1 is:

$$e_i = (x-x_i)^2 + (y-y_i)^2 + (z-z_i)^2 - r_i^2 = R_m - r_i \qquad \text{Eqn. 2}$$

where e represents the error between the measured landmark range R. and the distance function r. The point which minimizes the least squares error (LSE) may be considered as the final position for the trilateration solution where the lease squares error is defined as:

$$LSE = \Sigma e_i^2 \qquad \text{Eqn. 3}$$

Figure 5:
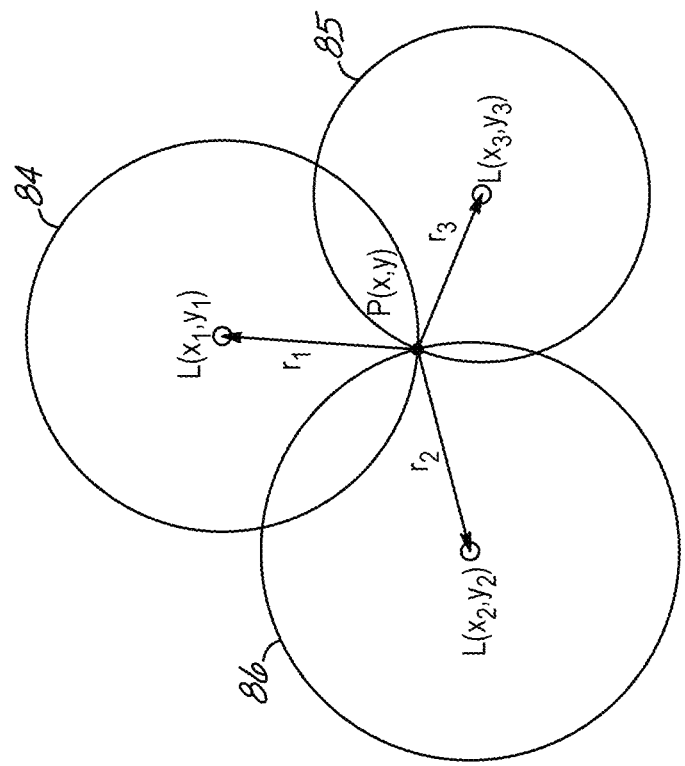
FIG. 5 is diagrammatic view of a two-dimensional space including a plurality of circles that define a solution point determined using trilateration of the landmarks in FIG. 1 and FIG. 2.
Figure 4:
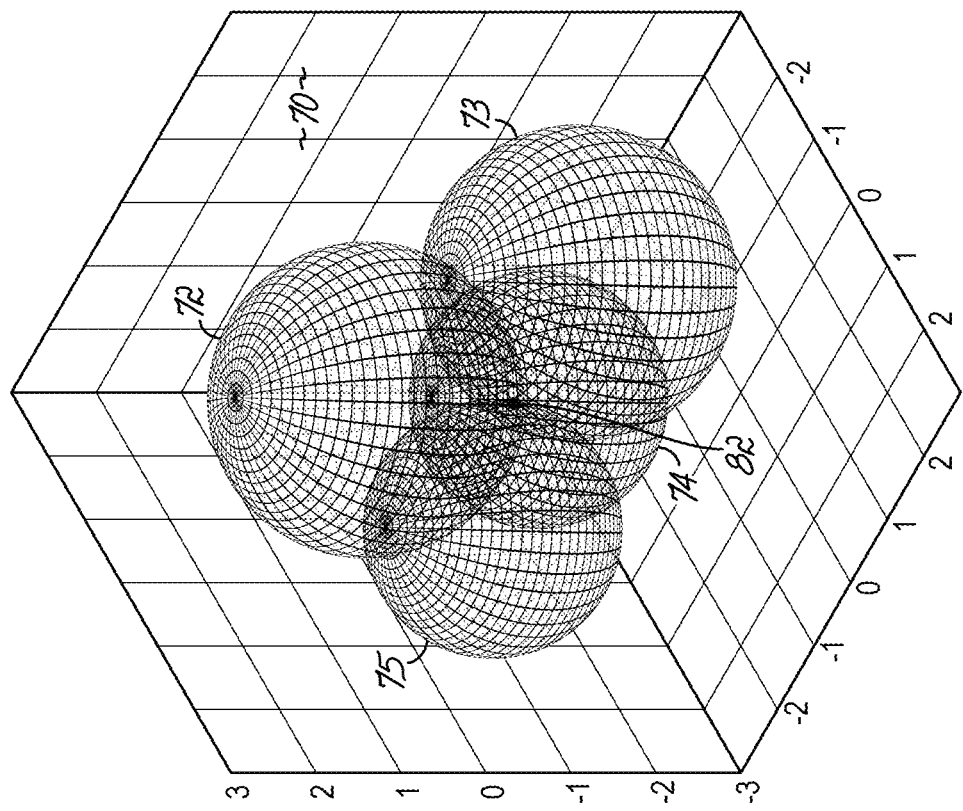
FIG. 4 is diagrammatic view of a three-dimensional space including a plurality of spheres that define a solution point determined using trilateration of the landmarks in FIGS. 1 and 2.

Optimization algorithms that may be used include a Limited-memory Broyden-Fletcher-Goldfarb-Shanno with Bound constraints (L-BFGS-B) algorithm, Powell's method, a Nelder-Mead algorithm, or any other suitable algorithm. Referring now to FIG. 4, the optimization solution may be represented as the intersection point of a plurality of spheres 72-75 e.g., four spheres in a three-dimensional space 70. The radius of each sphere 72-75 may represent the range $r_i$ from the observer to the reference point $L(x_i,y_i,z_i)$, which is typically the center point of a landmark used to determine the position of the observer. The point 82 located at the center of the region enclosed by intersection of the spheres 72-75 may represent the solution point $P_S(x,y,z)$. FIG. 5 shows a two-dimensional example in which the intersection point of three circles 84-86 provides a solution point P(x,y) where the radius of each circle $r_i$ is the distance measured from the observer to the reference point $L(x_i,y_i)$ at the center of the respective landmark.

Trilateration techniques may assume the minimum number of landmarks for a robust solution in a two-dimensional case is two landmarks, and at least three landmarks for a three-dimensional case. However, adding more landmarks may affect the accuracy of the trilateration solution and allow for 3D position estimation. To determine how adding additional landmarks may affect error in determining the position of a vehicle, a landmark number study was performed using a baseline of three landmarks. Another potential source of solution variation may arise from the placement of landmarks within the environment. To evaluate this potential source of error, simulations were performed with each landmark located on the same plane in different configurations. First, each landmark was set at the same X, Y, or Z position to determine the effects of having all landmarks located on the same plane.

The output of LiDAR sensors may be used to generate a set of data points defining a point cloud, with each point having X, Y, and Z coordinates. LiDAR parameters may include number of lasers, points measured per second, range, rotations per second, vertical field of view, horizontal field of view, and pose. LiDAR points can be represented in an image frame given a projection matrix which converts real-world three-dimensional coordinates into two-dimensional pixel coordinates. Generally, LiDAR data can be translated to X, Y, and Z coordinates given a range D, azimuth angle $\alpha$, and laser angle $\beta$. For a single LiDAR range output in three-dimensional space:

$$X = D\cos(\alpha)\sin(\beta) \qquad \text{Eqn. 4}$$

$$Y = D\cos(\alpha)\cos(\beta) \qquad \text{Eqn. 5}$$

and $$D = D\sin(\alpha) \qquad \text{Eqn. 6}$$

The values for D, $\alpha$, and $\beta$ may each have an associated uncertainty. This uncertainty may produce an additional error in the final position estimate. The simulated LiDAR sensor was modeled after the Velodyne VLP-16, which is available from Velodyne Lidar of San Jose, California, United States. The VLP-16 is a 16-laser scanning LiDAR believed to have a range of 100 m, a range accuracy of ±3 cm, vertical field of view (FOV) of −15 degrees to +15 degrees with a 2 degree resolution, and horizontal field of view of 360 degrees with 0.1 to 0.4 degree resolution. The Velodyne VLP-16 can capture up to 1.39 million points per second.

Figure 6:
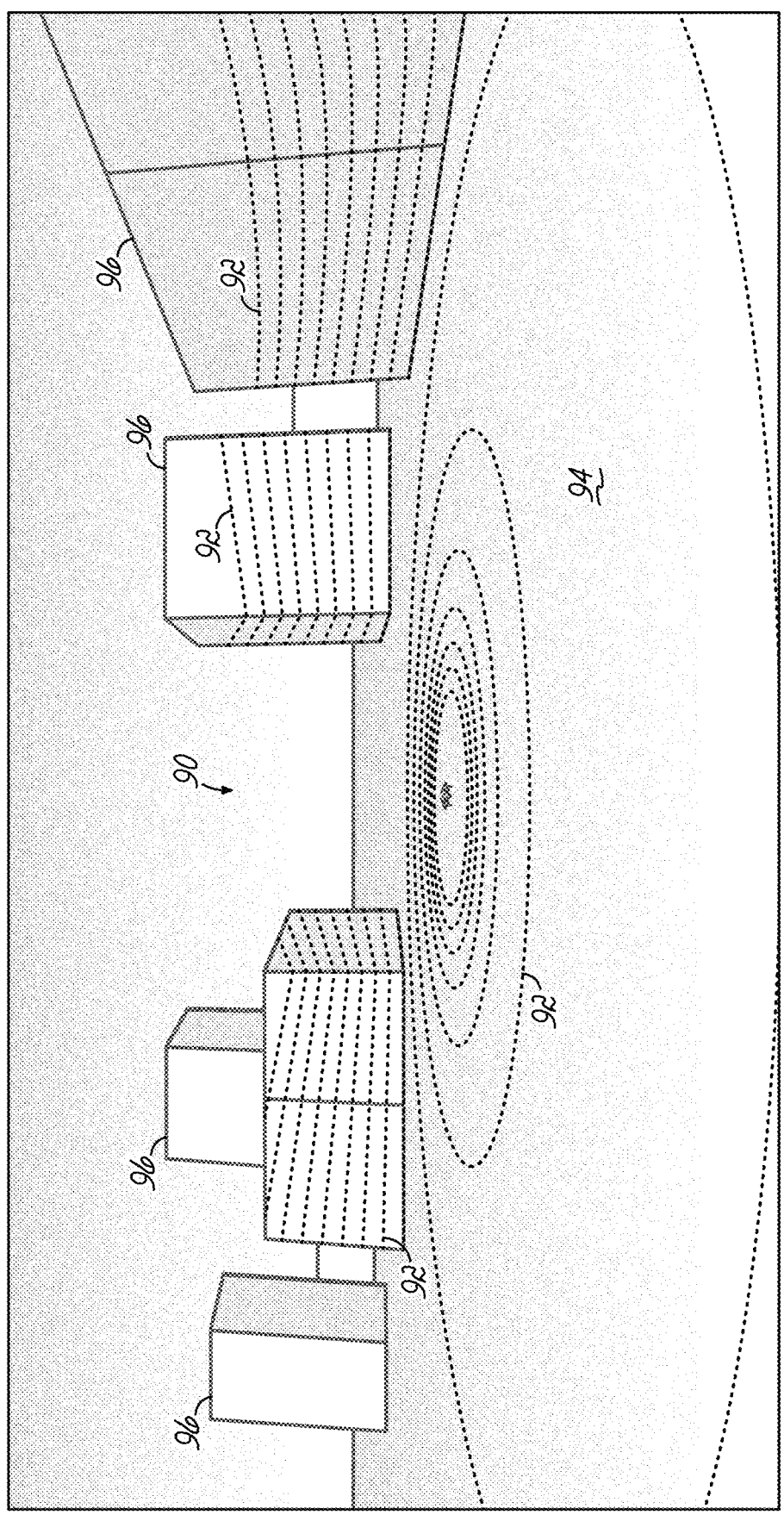
FIG. 6 is a diagrammatic view of the point cloud of FIG. 1.

FIG. 6 depicts an exemplary point cloud 90 including a plurality of data points 92. Each data point 92 may include data indicative of the range (i.e., distance and direction) of a ranging point on the surface of the ground 94 or one of a plurality of landmarks 96 from the position of the range measuring device, e.g., a LiDAR unit.

Another method that may be used to obtain distance information in a computer vision application uses calibrated intrinsic and extrinsic parameters of a given pinhole camera to approximate world depth in three-dimensional coordinates. The general form for a pinhole three-dimensional projection is represented as:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} [R|T] \begin{bmatrix} X \\ Y \\ Z \\ 1 \end{bmatrix} \qquad \text{Eqn. 7}$$

$$C = K[R|T]W$$

$$C = KEW$$

where C contains the pixel coordinates in the image frame (u,v), K is the intrinsic camera matrix containing the image principal point ($c_x$, $c_y$), $f_x$ and $f_y$ are focal lengths, E is the extrinsic camera matrix containing the rotation matrix R and translation matrix T, and W contains three-dimensional world points X, Y, and Z. The intrinsic camera matrix K may be obtained through a calibration process that inherently produces additional error. The extrinsic matrix E may require measurements to be made between sensors and the UAV. The uncertainty in these measurements may also introduce error into the system.

Using the camera to LiDAR relationship presented in Equation 7, it may be possible to map a given LiDAR feed that locates data points $P_D$ using cartesian coordinates (x,y,z) to pixel coordinates (u,v). To achieve this mapping, the camera to LiDAR rotation matrix R, translation matrix T, and the camera intrinsic matrix K may be required. Starting with a pinhole camera model, the focal lengths $f_x$ and $f_y$ and principal point $(c_x, c_y)$ may be approximated in AirSim using FOV and camera resolution by the following:

$$f_x = \frac{w}{2\tan\left(\frac{FOV}{2}\right)} \quad \text{Eqn. 8}$$

$$f_y = f_x \quad \text{Eqn. 9}$$

$$c_x = \frac{w}{2} \quad \text{Eqn. 10}$$

$$c_{xy} = \frac{h}{2} \quad \text{Eqn. 11}$$

where w is the camera resolution width in pixels and h is the camera resolution height in pixels.

The rotation matrix R may be defined by matrices $R_z$, $R_y$, and $R_x$ which represent the rotational transformation from the camera's coordinate system to the LiDAR's coordinate system as follows:

$$R = R_z R_y R_z \quad \text{Eqn. 12}$$

where $$R_z = \begin{bmatrix} \cos(\theta_z) & -\sin(\theta_z) & 0 \\ \sin(\theta_z) & \cos(\theta_z) & 0 \\ 0 & 0 & 1 \end{bmatrix} \quad \text{Eqn. 13}$$

$$R_y = \begin{bmatrix} \cos(\theta_y) & 0 & \sin(\theta_y) \\ 0 & 1 & 0 \\ -\sin(\theta_y) & 0 & \cos(\theta_y) \end{bmatrix} \quad \text{Eqn. 14}$$

$$R_x = \begin{bmatrix} 1 & 0 & 0 \\ 0 & \cos(\theta_x) & -\sin(\theta_x) \\ 0 & \sin(\theta_x) & \cos(\theta_x) \end{bmatrix} \quad \text{Eqn. 15}$$

and $\theta_x$, $\theta_y$, $\theta_z$ are the rotation angles from the camera coordinate system to the LiDAR coordinate system.

The camera to LiDAR translation matrix T may be defined as:

$$T = \begin{bmatrix} T_x \\ T_y \\ T_z \end{bmatrix} \quad \text{Eqn. 16}$$

where $T_x$, $T_y$, and $T_z$ represent the distances between the two sensors in their respective directions.

In AirSim, the projection matrix model may be based on field of view and clipping planes, and may be defined as:

$$\begin{bmatrix} u_f \\ v_f \\ z_f \\ w_f \end{bmatrix} = \begin{bmatrix} \frac{1}{AR\tan\left(\frac{FOV}{2}\right)} & 0 & 0 & 0 \\ 0 & \frac{1}{\tan\left(\frac{FOV}{2}\right)} & 0 & 0 \\ 0 & 0 & -\frac{f+n}{f-n} & \frac{2fn}{f-n} \\ 0 & 0 & -1 & 0 \end{bmatrix} \begin{bmatrix} T'_x \\ T'_y \\ T'_z \\ 1 \end{bmatrix} \quad \text{Eqn. 17}$$

where n is the near clipping plane, f is the far clipping plane, AR is the aspect ratio w/h of the image, and the values $u_f$, $v_f$, $z_f$, and $w_f$ are the resulting vertex coordinates of a projected point. The resulting vertex coordinates are in reference to the camera's pose, so three-dimensional coordinates may need to be rotated and translated to the camera's pose, represented by $T'_x$, $T'_y$, and $T'_z$. That is, because the camera and LiDAR units do not occupy the same position, and may have different orientations, the data points $P_D(x,y,z)$ generated by the LiDAR unit may be translated to the camera frame $(T^x, T^y, T^z)$ before projecting them onto the image.

Each three-dimensional data point $P_D(x,y,z)$ may be translated by subtracting the point's position vector from the camera's position vector. The camera quaternion may then be used to rotate all translated three-dimensional data points to the camera frame. After rotation and translation, the perspective divide needs to be carried out to transform points from vertex coordinates to pixel coordinates by dividing $u_f$, $v_f$, and $z_f$, by $w_f$ as shown by Equation 18, which gives the desired two-dimensional pixel coordinates (u,v) from three-dimensional pixel coordinates.

$$\begin{bmatrix} u \\ v \\ z_c \\ 1 \end{bmatrix} = \begin{bmatrix} \frac{u_f}{w_f} \\ \frac{v_f}{w_f} \\ \frac{z_f}{w_f} \\ \frac{w_f}{w_f} \end{bmatrix} \quad \text{Eqn. 18}$$

Options for camera parameters in AirSim may include resolution, field of view, motion blur, and forms of sensor noise. For the exemplary simulation, all forms of noise were turned off within AirSim and applied after grabbing the camera frame. Studies were performed using a camera field of view of 90 degrees while the effects of camera resolution were tested for three cases including 640×480 pixels, 960× 720 pixels, and 1980×1080 pixels.

Landmarks L need to be identified in pixel coordinates (u,v) to determine which LiDAR ranges corresponded to the correct landmark locations. The location of the landmark L(u,v) in pixel coordinates may be determined by first finding the data point $P_D(u,v)$ closest to the centroid of the landmark object in the RGB camera image. Objects corresponding to the landmarks may be classified in an image frame based on color ranges using OpenCV. Object location within an image can be determined using color based object detection by specifying an RGB value threshold for each object. Each frame may be masked according to the color threshold for each object. The centroid of each landmark may then be calculated based on the moment of the masked image, or "image moment" of the object corresponding to the landmark. The image moment may be defined, for example, as a weighted average of pixel intensity of the landmark object in the image identified by the masking function.

Figure 7:
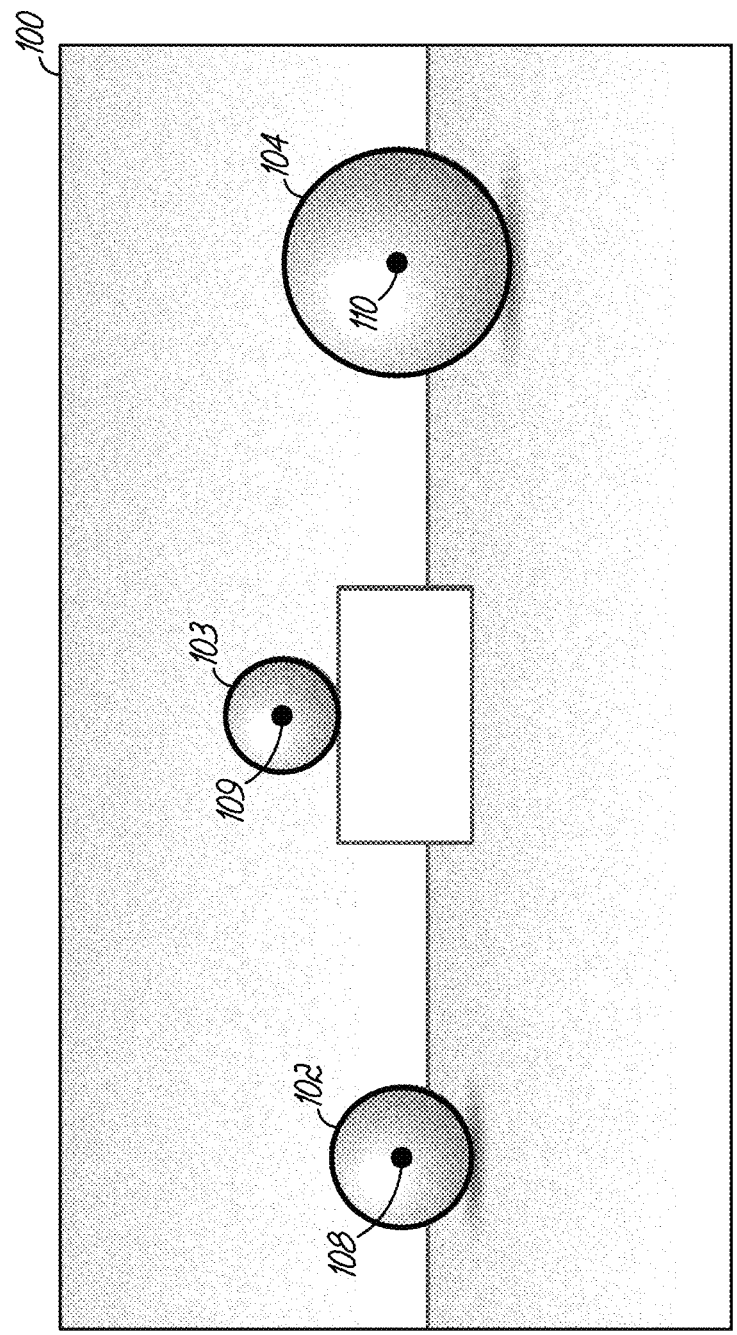
FIG. 7 is a diagrammatic view of an exemplary two-dimensional image including landmark objects having centroids.

FIG. 7 depicts an exemplary environment 100 including a plurality (e.g., three) landmarks 102-104 each including a centroid 108-110 and having a different color (e.g., green, purple, and orange). The environment 100 was used to test an exemplary color based object detection implemented using OpenCV's in Range function by specifying an RGB value threshold for each landmark 102-104. Each frame may be masked according the given color threshold for each landmark 102-104. The centroid 108-110 of each landmark may then be calculated by determining the image moment of the masked image, which can be defined by the weighted average of the pixel intensities. Variations may be introduced into sensor data depending on the placement of LiDAR spots on the surface of each landmark and the resulting range data of the data point 92. In addition to taking the single data point 92 in the point cloud 90 closest to the landmark centroid L(u,v), results obtained by taking multiple data points 92 present on the surface of the landmark may be determined by applying a curve fit to a plurality of data points 92 representing spots along the surface of each landmark.

Experimental Data

Experiments were performed to evaluate the accuracy of the above the simulations by using a Raspberry Pi 3 Model B+ based ground robot. The robot was equipped with a 360° scanning single laser A2 RP LiDAR and ELP 3 megapixel camera having a 3.7 mm pinhole lens, and was used to conduct hybrid camera-LiDAR positioning experiments. Uniquely colored Light Emitting Diode (LED) illuminated orbs were used for landmarks, and were identified using the same color identification method used in the simulations. Results from the presented hybrid camera-LiDAR method were compared to position results obtained from eight Vicon Vero motion capture cameras interfaced with Vicon Tracker software. First, a static case was run that compared the Vicon position results to the hybrid camera-LiDAR method to identify any sensor drift. A straight path scenario using feedback from Vicon motion capture was then used and compared to hybrid camera-LiDAR position data. Finally, the same straight path scenario was run using position feedback from the hybrid camera-LiDAR method and compared to Vicon position data to prove implementation feasibility.

AirSim was used to create a simulation environment for the presented position estimation process because it provides cameras that can be used for computer vision, simulates LiDAR, is easy to setup, scriptable, and allows custom landmarks to be added. LiDAR point cloud data was generated and projected to an image frame using a projection matrix provided in AirSim according to Equation 17. The projected vertex coordinates were then converted to pixel coordinates according to Equation 18. The three-dimensional data point $P_D(x,y,z)$ associated with the two-dimensional data point in pixel coordinates $P_D(u,v)$ closest to the centroid $L(u,v)$ of the landmark was used for computing the range $r_L$ to that landmark. Range approximations were then used in trilateration to compute an estimated position for the vehicle using known global positions of each landmark. The final estimated position generated by the hybrid process was then compared to the vehicle's known global position.

Position estimation using the sensor system 50 was achieved using trilateration, where RGB monocular vision was used for landmark identification and LiDAR was used for landmark ranging. Visual images were generated using an RGB camera and used to identify landmarks in an image frame with color matching in OpenCV. Landmarks were identified in the image frame to find the nearest two-dimensional data points $P_D(u,v)$ to the location of the landmarks. While landmark identification has been described herein based on color ranges, embodiments of the invention are not limited to this type of landmark identification. Landmarks may include buildings or other distinct global features. Each landmark may be assigned unique pixel RGB values, then a respective color range used to obtain pixel centroid coordinates. Three dimensional point clouds may be generated based on LiDAR measurements simulated from the Velodyne HDL-32E scanning LiDAR and projected onto an image frame to determine the nearest LiDAR ranging point which maps to a landmark centroid. The range of the LiDAR ranging point which maps nearest to the landmark centroid may then be used in the trilateration position estimation. Trilateration process inputs may include landmark global position data and range data which was used in an optimization algorithm that minimized the least squares error between a set of distance equations from the LiDAR to each landmark and their respective measured distances to solve for the final position estimation. For the cases described below, a ground vehicle was used for simplicity to evaluate the process 10 depicted in FIG. 1 unless otherwise indicated. However, the results are applicable to all types of vehicles, including aerial and ground vehicles.

Figure 8:
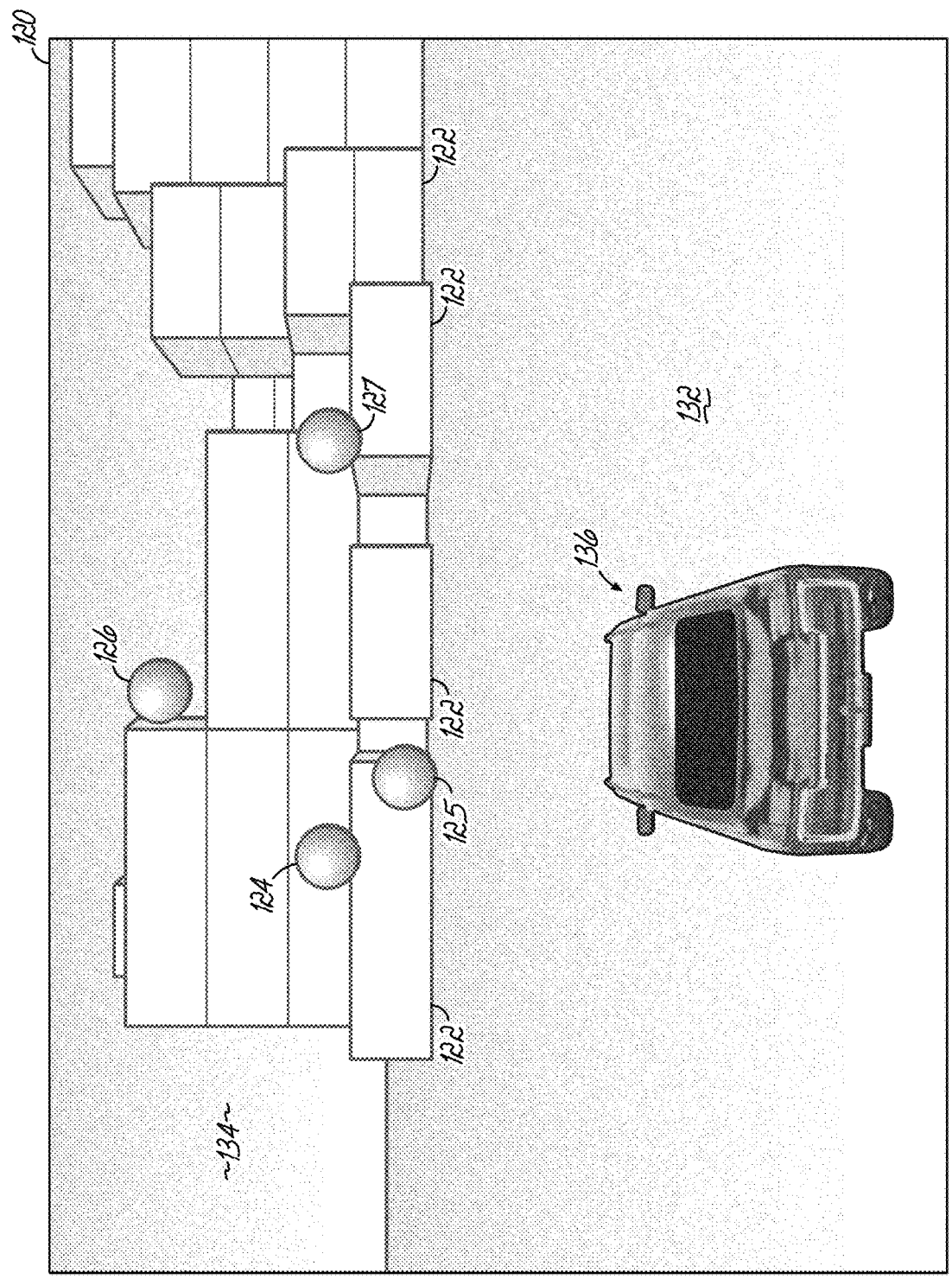
FIG. 8 is a diagrammatic view of an exemplary test environment including obstacles, landmarks, and a vehicle.

FIG. 8 depicts a test environment 120 including a plurality of obstacles 122, a plurality of landmarks 124-127, a driving surface 132 (e.g., the ground), a background 134 (e.g., the sky), and a vehicle 136. Each landmark 124-127 comprises a sphere having a radius of 1.6 meters and an RGB color value, e.g., orange, purple, green, and red. The global position and color of each landmark is presented in Table I. Obstacles 122 were represented as gray blocks, and the vehicle 136 was oriented so that it faced all landmarks 124 during testing.

TABLE I

Landmark Position and Color

| Ref No. | X-coordinate | Y-coordinate | Z-coordinate | Color | Radius (m) |
|---|---|---|---|---|---|
| 124 | −35.78 | 7.89 | −4.24 | Orange | 1.6 |
| 125 | −47.75 | 6.30 | −1.02 | Red | 1.6 |
| 126 | −49.68 | 2.19 | −13.02 | Purple | 1.6 |
| 127 | −52.75 | −11.08 | −4.91 | Green | 1.6 |

Sensors included an RGB camera located on the front of the vehicle 136 and a LiDAR unit located on the roof of the vehicle 136. The RGB camera was used for landmark identification, and the LiDAR unit was used to measure the range to each respective landmark 124-127. Several options exist for setting camera parameters in AirSim. These options may include one or more of a resolution, field-of-view, motion blur, and forms of sensor noise. The present work ignored camera sensor noise, and all simulations were performed using a 90 degree field-of-view and a resolution of 960×720 pixels. Images from the front mounted RGB camera were used to determine the location of each landmark 124-127 in the frame using the known color ranges of the landmarks 124-127 and OpenCV to mask the image. The masked image only included pixels identified as corresponding to the desired landmark. The location of the centroid of each landmark 124-127 was determined by finding the contour of the masked image function, then calculating the centroid of the contour. The resulting pixel coordinates $(u_L,v_L)$ were used later in the process to determine which LiDAR generated three-dimensional data point $P_D(x,y,z)$ maps closest to each respective landmark's pixel centroid.

The LiDAR sensor was modeled after the Velodyne HDL-32E, which has 32 scanning lasers and a range of 100 m. The HDL-32E has a range accuracy of ±2 cm, a vertical field-of-view of +10 degrees to −30 degrees with a 1.33 degree resolution, a horizontal field-of-view of 360 degrees with a 0.1 to 0.4 degree resolution, and can capture up to 1.39 million points per second. However, a data capture rate of 100,000 points per second was used to decreased computation time and provided sufficient information. The LiDAR was used to generate a point cloud with points located using X, Y, and Z coordinates, which were translated and rotated to the camera's coordinate frame to project three-dimensional world coordinates onto two-dimensional pixel coordinates. The positions and quaternions of the camera and LiDAR were obtained using AirSim. Each data point $P_D(x,y,z)$ was translated by subtracting the camera's position from the point's position, then rotated to the camera's coordinate frame using the camera's quaternion resulting in $T'_x$, $T'_y$, and $T'_z$ to be used in the three-dimensional to two-dimensional projection model provided by Equations 17 and 18. The range for each landmark was determined by finding the projected LiDAR data point in pixel coordinates (u,v) which minimized the distance from the landmark centroid $L_C(u_L,v_L)$ as follows:

$$I = \arg\min(\sqrt{(u-u_L)^2+(v-v_L)^2}) \quad \text{Eqn. 19}$$

$$D = \sqrt{(T'_x[I])^2+(T'_y[I])^2+(T'_z[I])^2} \quad \text{Eqn. 20}$$

where I is the location of the closest LiDAR point to the landmark centroid $L_C(u_L,v_L)$ in the data set, and $T'_x[I]$, $T'_y[I]$, $T'_z[I]$ are the three-dimensional point cloud distances in each direction at I from the LiDAR to the landmark. The distance D is the measured distance to the landmark's surface. Because the distance needed is the distance to the volumetric center of the landmark, the measured distance may be adjusted by adding the radius of the sphere R to the measured distance D:

$$r_L = D+R \quad \text{Eqn. 21}$$

Figure 9:
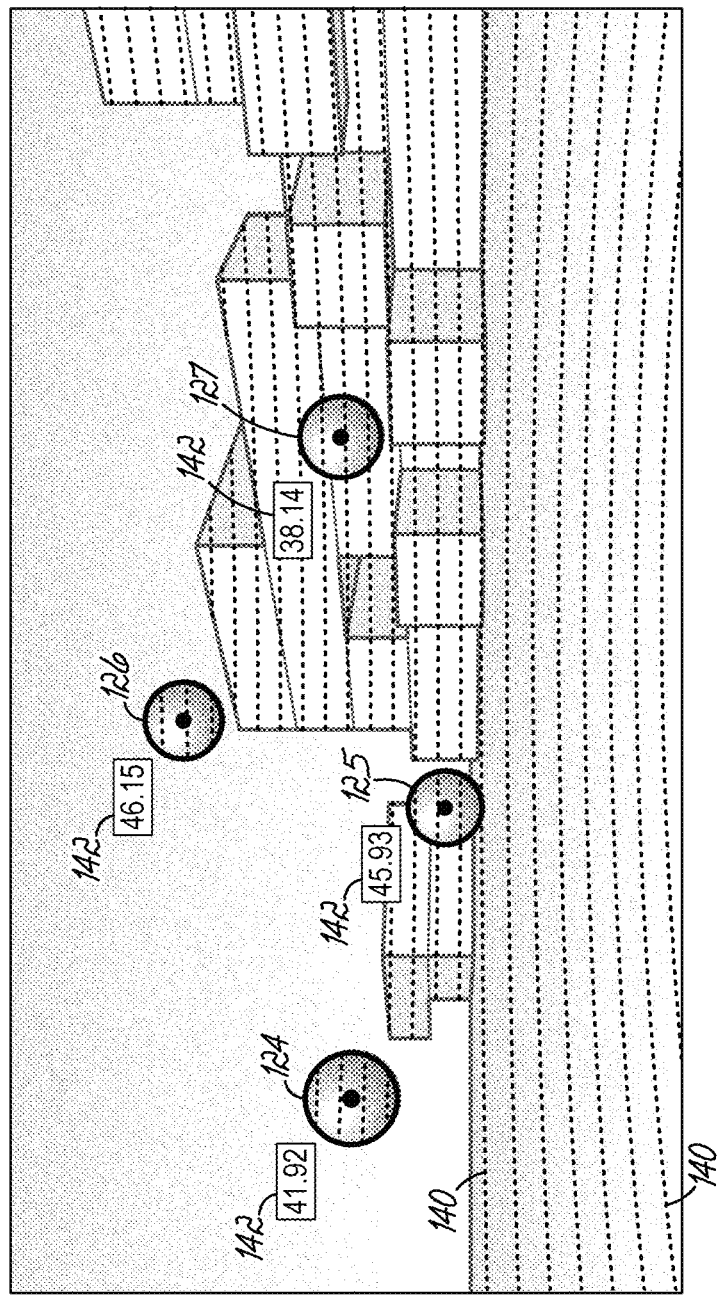
FIG. 9 is a diagrammatic view of the exemplary test environment of FIG. 8 including a plurality of ranging points projected onto the surfaces of the obstacles and landmarks.

FIG. 9 depicts a diagrammatic view of a snapshot of an image frame from the hybrid camera-LiDAR projection process at a test point. Each point 140 represent a data point $P_D(x,y,z)$ of the three-dimensional LiDAR point cloud that was converted to pixel coordinates $P_D(u,v)$. Data fields 142 contain values indicative of the estimated distance $r_L$ in meters from the LiDAR unit to the respective landmark 124-127.

After landmark range approximations have been determined, a solution point $P_S(x,y,z)$ may be computed using trilateration. Although four landmarks 124-127 were used in the present example, it should be understood that different numbers of landmarks may be used to achieve a solution. Because there are more landmarks then there are dimensions being solved (i.e., the system is over-determined), the problem may be solved numerically. Position estimation of the vehicle may be achieved via trilateration by minimizing Equation 3 where range approximations $r_L$ are measured using LiDAR, and landmark positions $L(x_L,y_L,z_L)$ are obtained and used for the lease squares error minimization. The L-BFGS-B optimization algorithm may be used to determine the solution point $P_S(x,y,z)$ by minimizing the least squares error. Algorithm 1 shown below presents an exemplary camera-LiDAR trilateration positioning solution process, with reference to the equations presented where the output is a final position estimation.

---

Algorithm 1 Hybrid camera-LiDAR trilateration positioning process
    for X, Y, and Z in lidarData do
        Rotate and translate LiDAR points to camera frame
        $T'_x$, $T'_y$, $T'_z$ = rotateAndTranslate(X, Y, Z)
        Convert LiDAR coordinates to pixel coordinates
        u, v = Equations 17 and 18 ($T'_x$, $T'_y$, $T'_z$)end for
    for
        Compute landmark centroid
        $u_L$, $v_L$, = getLandmarkCentroid(landmark[color])
        Find closest point to landmark centroid
        I = Equation 19(u, v, $u_L$, $v_L$)
        Compute range of closest point
        D = Equation 20($T'_x[I]$, $T'_y[I]$, $T'_z[I]$)
        Add radius offset to range approximation
        $r_L$ = Equation 21(D, R)
    end for
    Minimize least square error of ranges, $r_L$ using L-BFGS-B algorithm and return position estimation
    return x, y, z = trilateration($r_L$, landmark[$x_L$, $y_L$, $z_L$])

---

Figure 10:
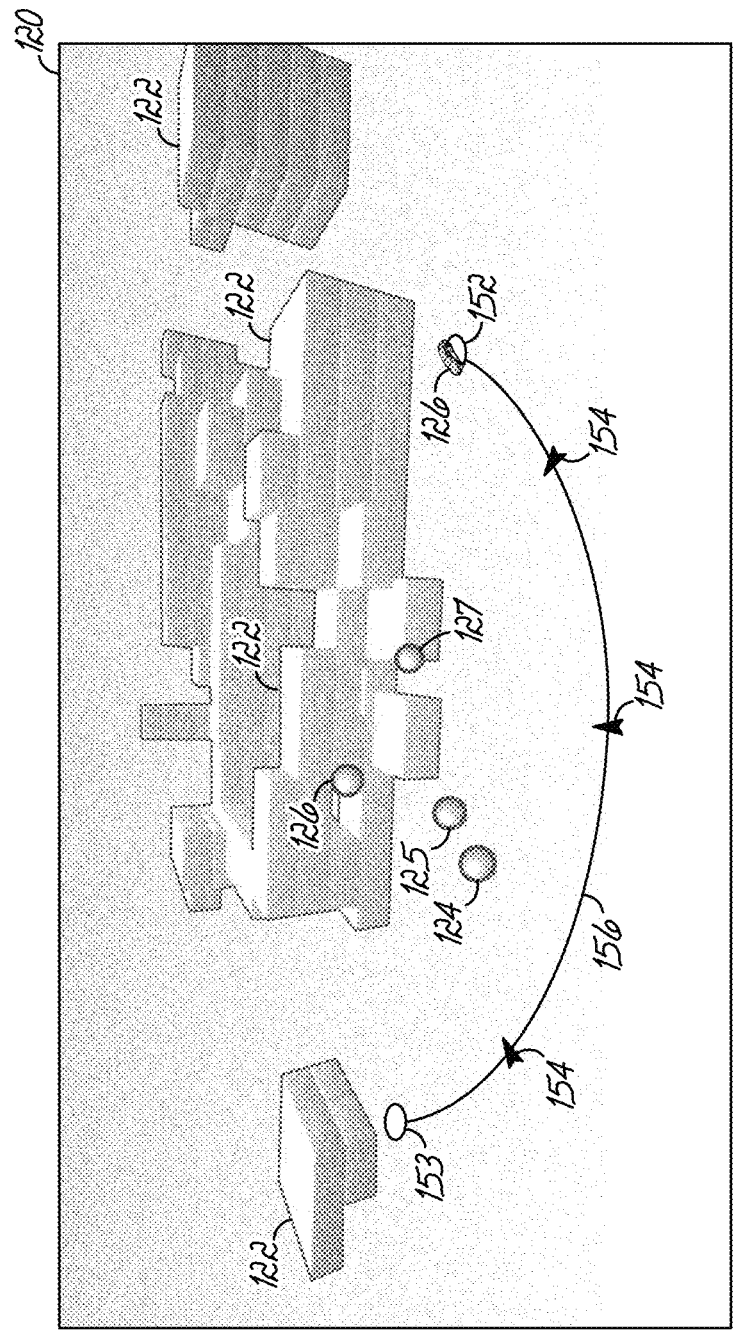
FIG. 10 is a diagrammatic view of the exemplary test environment of FIG. 8 showing a path over which the vehicle may move during testing.

FIG. 10 depicts the test environment 120 including the landmarks 124-127 from a side view, and depicts a starting position 152 and an ending position 153 of the vehicle 136. Simulations were performed using the above method and compared to the known vehicle position in AirSim. All simulations were performed in the same environment 120, and the vehicle was placed at locations along a 180 degree arc 156 spanning from −90 degrees to +90 degrees around the collective center of the landmarks 124-127. The vehicle 136 was oriented so that the RGB camera was always facing the landmarks 124-127. Measurements were taken at 28 positions 154 plus the starting and ending positions 152, 153 on the arc (30 positions 152-154 total), and 15 iterations were run at each position 152-154. At each position 152-154 on the arc 156 where measurements were taken, the vehicle 136 was oriented so that it was facing the landmarks 124-127.

Trilateration vehicle position estimation and actual positions were recorded at each position 152-154 around the arc 156 to determine average positioning error at each position 152-154. An average position estimation error magnitude of 0.08 meters was found in the X and Y directions over all locations, with a maximum deviation of 0.36 meters in the X-direction and 0.31 meters in the Y-direction as compared to measured positions, which were used to simulate GPS positions. When including the Z-dimension (altitude) in calculations, the average error increased to 2.14 meters, with a maximum deviation of 2.61 meters. This deviation may be due to a small separation between all landmarks with respect to the Z-distance. However, it may possible to include other sensors capable of determining altitude to decrease this error, such as the barometer 52.

Figure 11:
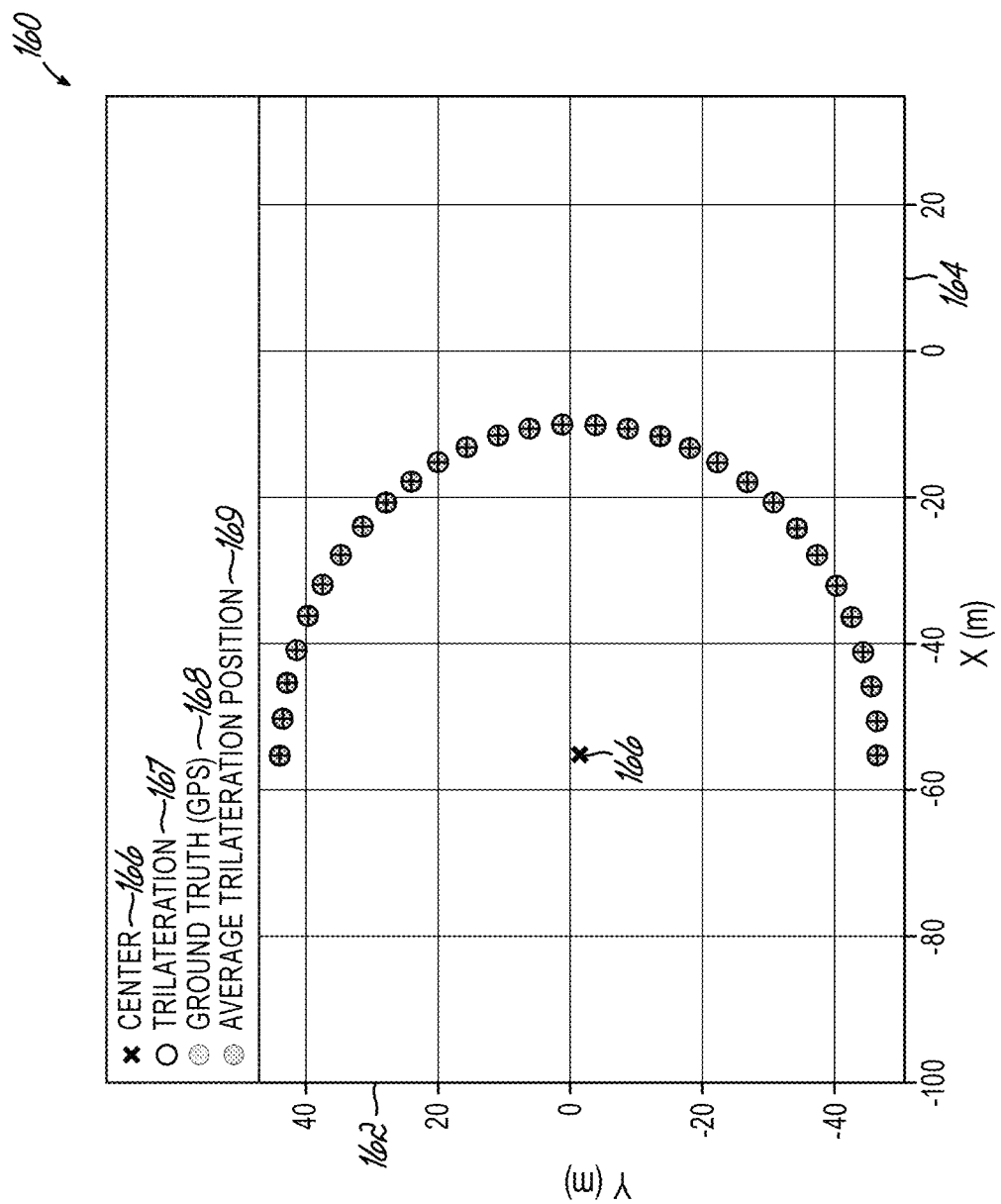
FIGS. 11-14 are graphical views illustrating the accuracy of the process of FIG. 1 in estimating the position of the vehicle of FIG. 8.
Figure 12:
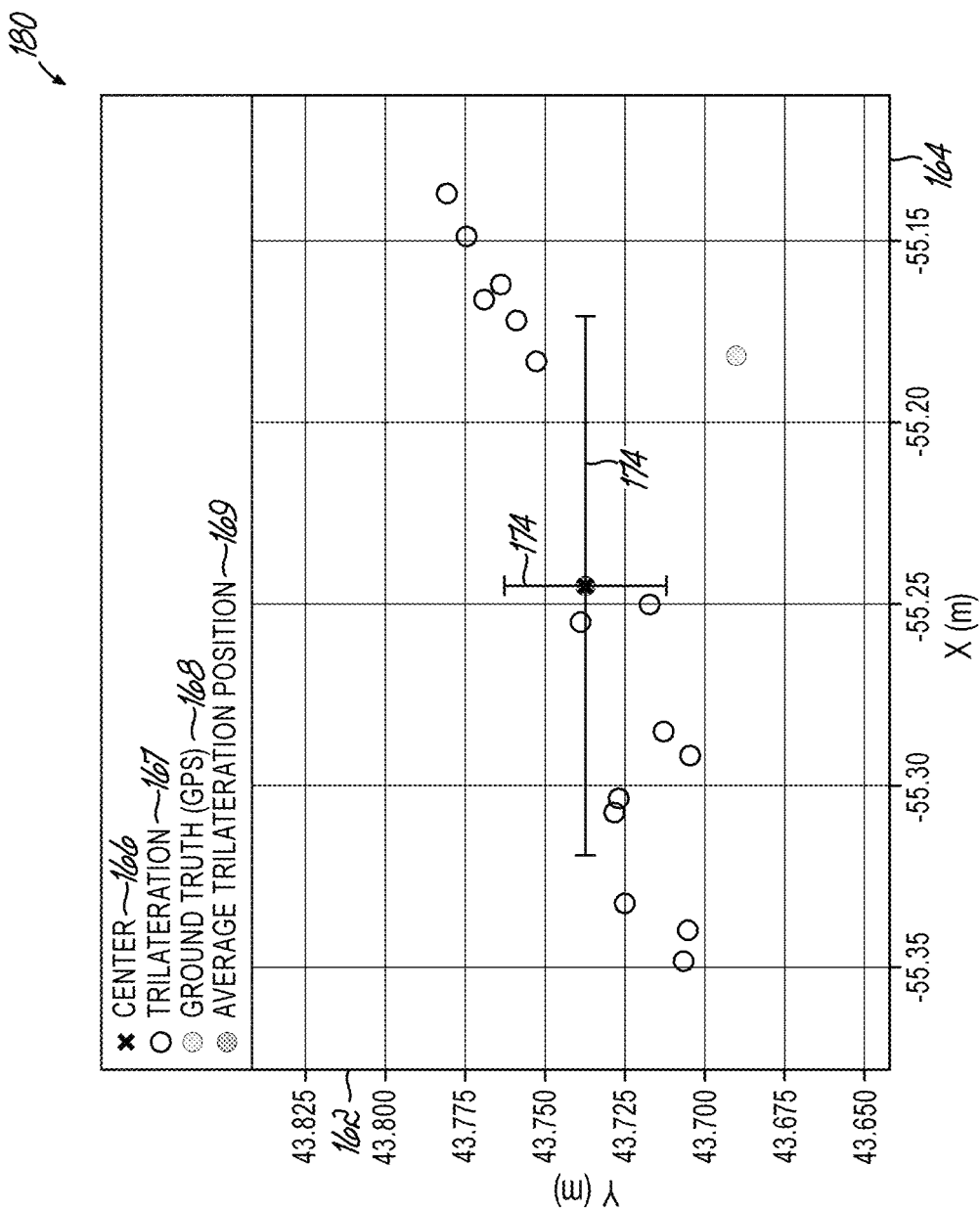
Figure 13:
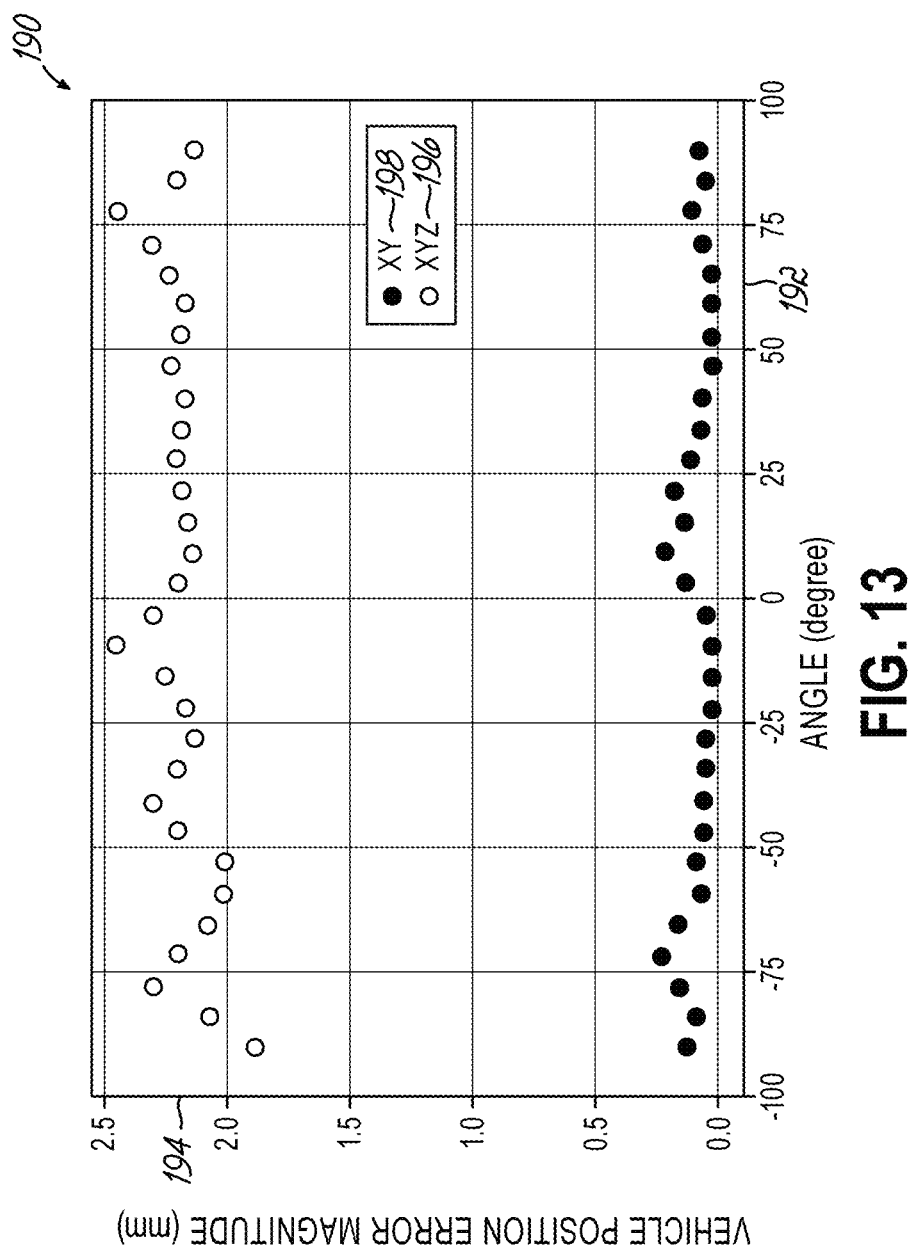

FIGS. 11-13 present hybrid camera-LiDAR positioning results with simulated GPS (FIG. 11), camera-LiDAR position estimation and simulated GPS at (−55.25, 43.74) where the vehicle is at the starting position 152 (i.e., the −90 degree position) on the arc 156 (FIG. 12), and hybrid camera-LiDAR positioning average error results at each position 152-154 were measurements were taken (FIG. 13). FIG. 11 includes a graph 160 having a vertical axis 162 corresponding to the Y-direction, a horizontal axis 164 corresponding to the X-direction, a marker 166 indicating the position of the center point of arc 156, trilateration solution points 167, ground truth points 168, and average trilateration position points 169. The graph 160 plots actual and trilateration (x,y) position estimation results with the respective error bars 174 at each location. FIG. 12 is a zoomed in example point from FIG. 11 showing position estimations 166-169 and error bars 174 more clearly at the starting position 152. The ground truth points 168 are the simulated GPS locations in AirSim, the trilateration points 167 are the camera-LiDAR position estimations, and the solid gray circles 169 represent the average position estimation for that location, the error bars 174 for each location show the standard deviation of the position estimation, and the marker 166 represents a point about which the vehicle rotates to keep all landmarks in the camera's image frame. FIG. 13 includes a graph 190 having a horizontal axis 192 corresponding to angle in degrees, and a vertical axis 194 corresponding to vehicle position error magnitude in meters. Graph 190 shows error magnitudes at each location where the white circles 196 represent the magnitude of the position estimation error when compared to GPS for X, Y, and Z positions, and the black circles 198 only consider X and Y position.

Figure 14:
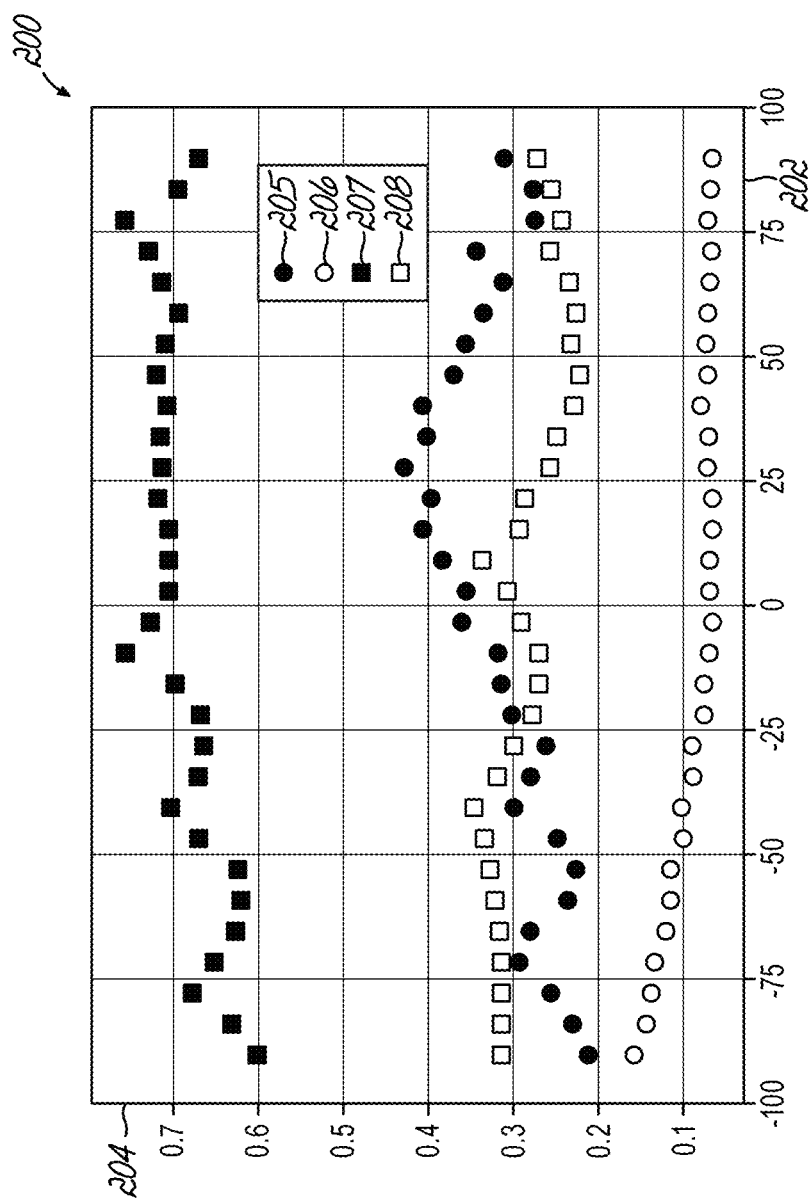

Spherical landmarks were used for this study, but range measurements from the LiDAR assumed flat surfaces, resulting in an inaccurate distance to the landmark center. The landmark radius was added to the LiDAR range to compensate for this distance, but was only an accurate representation of that distance if the laser hit the landmark a point on the surface directly in line with the centroid. The landmark range error was calculated for every location along the arc for every landmark and an average error of 0.32 meters for landmark 124, 0.09 meters for landmark 125, 0.69 meters for landmark 126, and 0.28 meters for landmark 127 was calculated. FIG. 14 includes a graph 200 having a horizontal axis 202 corresponding to angle, and a vertical axis 204 corresponding to landmark range error in meters. Average landmark ranging error for each landmark 124-127 at each location is plotted on graph 200, where the filled in circles 205 represent the average range error for landmark 124, the open circles 206 represent the average range error for landmark 125, the filled in squares 207 represent the average range error for landmark 126, and the open squares 208 represent the average range error for landmark 127.

Figure 15:
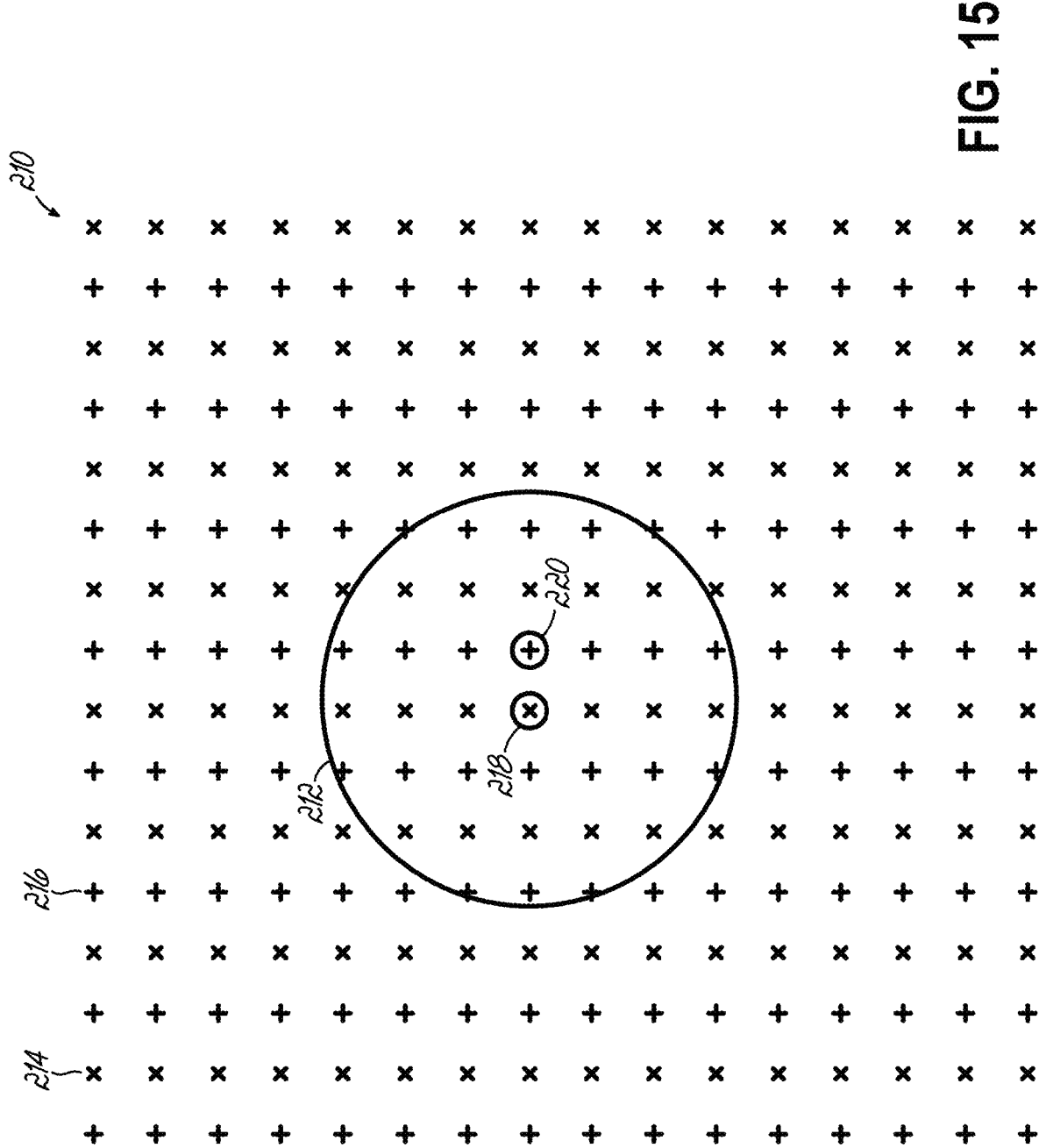
FIG. 15 is a diagrammatic view of an image frame showing an offset between the data points of consecutively generated point clouds.

The most significant sources of variation in this study was the position of LiDAR ranging points varying along the surface of the spherical landmarks as the scan was being simulated, and treating landmarks as flat surfaces. FIG. 15 depicts two exemplary consecutive LiDAR scans projected onto an image frame 210 including a contour 212 of a landmark object, points 214, 216 showing the positions of projected data points $P_D(x,y)$ for consecutive scans, one centroid 218 calculated using the projected data points $P_D(x,y)$ 214 from one scan, and another centroid 220 calculated from the projected data points $P_D(x,y)$ 216 from the other scan. As can be seen, the projected data points $P_D(x,y)$ 214 from the one scan do not match the projected data points $P_D(x,y)$ 216 from the other scan. The offset between the points is believed to be due to how the LiDAR is modeled and implemented within AirSim. The discrepancy in the two centroid approximations results in different values for range approximation. This may cause a variation in the final trilateration positioning.

Embodiments of the present invention use hybrid visual and laser ranging position estimation that determines position based on LiDAR data and computer vision recognition of landmarks. Advantageously, positioning methods in accordance with embodiments of the invention may allow the global position of a vehicle to be estimated using hardware (e.g., LiDAR and camera systems) which is already present on many vehicles. LiDAR point-cloud data may be mapped to a visual scene using a projection matrix model with the purpose of converting three-dimensional range data to two-dimensional pixel coordinates. Unique visual landmarks may be identified using computer vision classifiers to locate two-dimensional pixel coordinates and known position lookup. The closest three-dimensional range may be mapped to the landmark centroid. A trilateration solution may then be used with all ranges to the landmarks to estimate a three-dimensional local position in the environment. Microsoft AirSim software may be used to evaluate the hybrid process with an RGB camera and LiDAR on a typical automobile sized vehicle by moving in a constant radius around a center point. The landmarks may be fixed but viewed in different scene configurations to test the scene identification. Compared to the true location, the hybrid method produced an average position error of 0.08 meters in two-dimensions. Extending to three-dimensions, the error increased due to limited separation between the landmarks in the altitude (Z) direction. The main source of position estimation error is believed to be from a flat surface assumption of the spherical landmarks when a laser range did not hit the exact centroid. Advantageously, the hybrid camera-LiDAR positioning method achieves a position estimation for different views of the landmarks without the need for external positioning data, such as from GPS.

Figure 16:
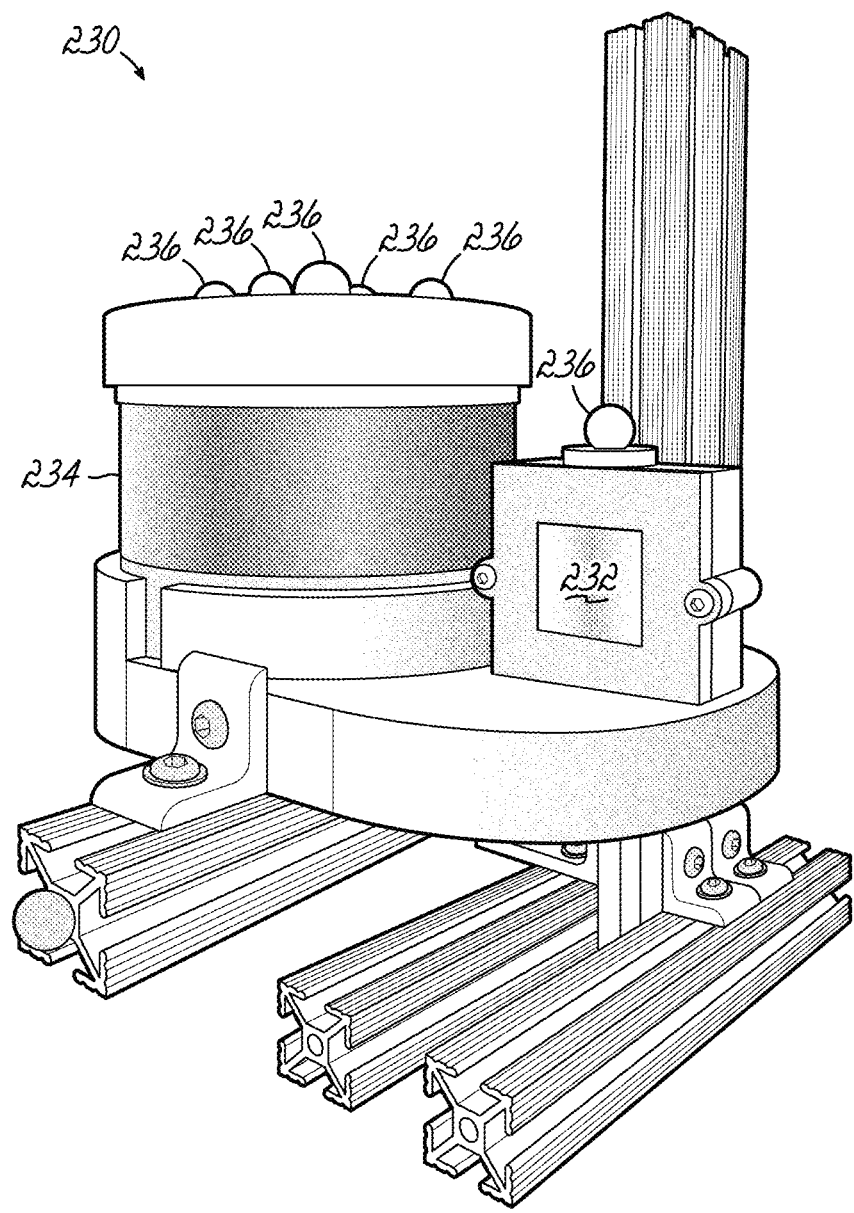
FIG. 16 is a perspective view of an apparatus for determining the position of the vehicle of FIG. 8 using the process of FIG. 1.

FIG. 16 depicts an exemplary hybrid camera-LiDAR apparatus 230 that may be used to determine the position of a vehicle in accordance with an embodiment of the invention. The apparatus 230 may include a visual camera 232 (e.g., an RGB camera) and scanning LiDAR unit 234. Motion tracking infrared reflective balls 236 may be mounted to the apparatus 230 for position tracking of the apparatus 230. The positions determined using the tracking balls 236 may then be compared to the position determined based on data from the visual camera 232 and scanning LIDAR unit 234. The apparatus 230 was used to collect images and range scans, and the offset position of the camera was corrected to the LiDAR position. The resulting data was processed to find a location of the apparatus 230, and position estimations compared to a motion tracking system having a known position error of about 0.1 mm. Landmarks were represented as unique color spheres with locations coming from the motion capture system. The experimental data collected by the apparatus shows that positions can be found and accurately quantified using the disclosed hybrid camera-LiDAR positioning methods.

Embodiments of the invention may use machine learning to identify landmarks based on images and current positions. This data may be saved to a landmark database, thereby automating the process of importing a landmark table. Machine learning may also be used to identify the landmarks visually to compensate for different viewing orientations and improve recognition beyond classical computer vision matching.

It should be understood that embodiments of the invention are not limited to visual identification of the landmarks, i.e., cameras that operate only in the visible spectrum. Rather, any suitable signals in the electromagnetic spectrum (Ultra-Violet, visual, Infra-Red, millimeter wave, microwave, and radio waves) may be used for identification. In addition, ranging methods other than LiDAR, such as passive radio frequency distance measurement, ultrasonic ranging, or the like may also be used.

Advantageously, embodiments of the invention may be able to operate in dense areas where GPS does not work or is unreliable. In addition, many potential landmarks (road signs, building signs, unique buildings and signs, etc.) may be used to determine position. Intra-vehicle estimation may also be performed where one vehicle estimates its position, and then other vehicles use that vehicle as a landmark to estimate their own location. This may allow cost savings by leveraging one high-accuracy inertial measurement system to supplement positioning systems in other vehicles with the described location method. Embodiments of the invention may be used for autonomous vehicles (aerial, ground, water, or space) that are required to know their position to perform tasks.

Figure 17:
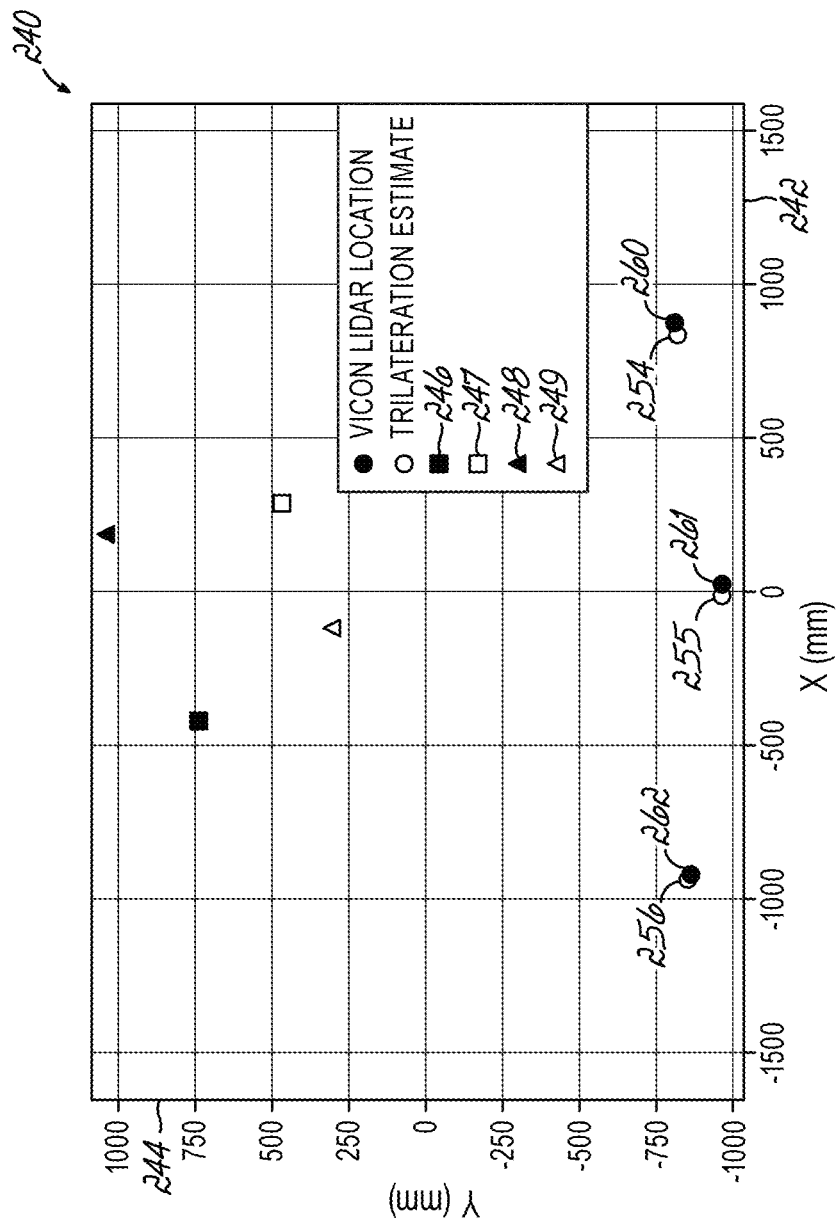
FIG. 17 is a graphical view illustrating the accuracy of positions of the vehicle of FIG. 8 as determined using the apparatus of FIG. 16.
Figure 18:
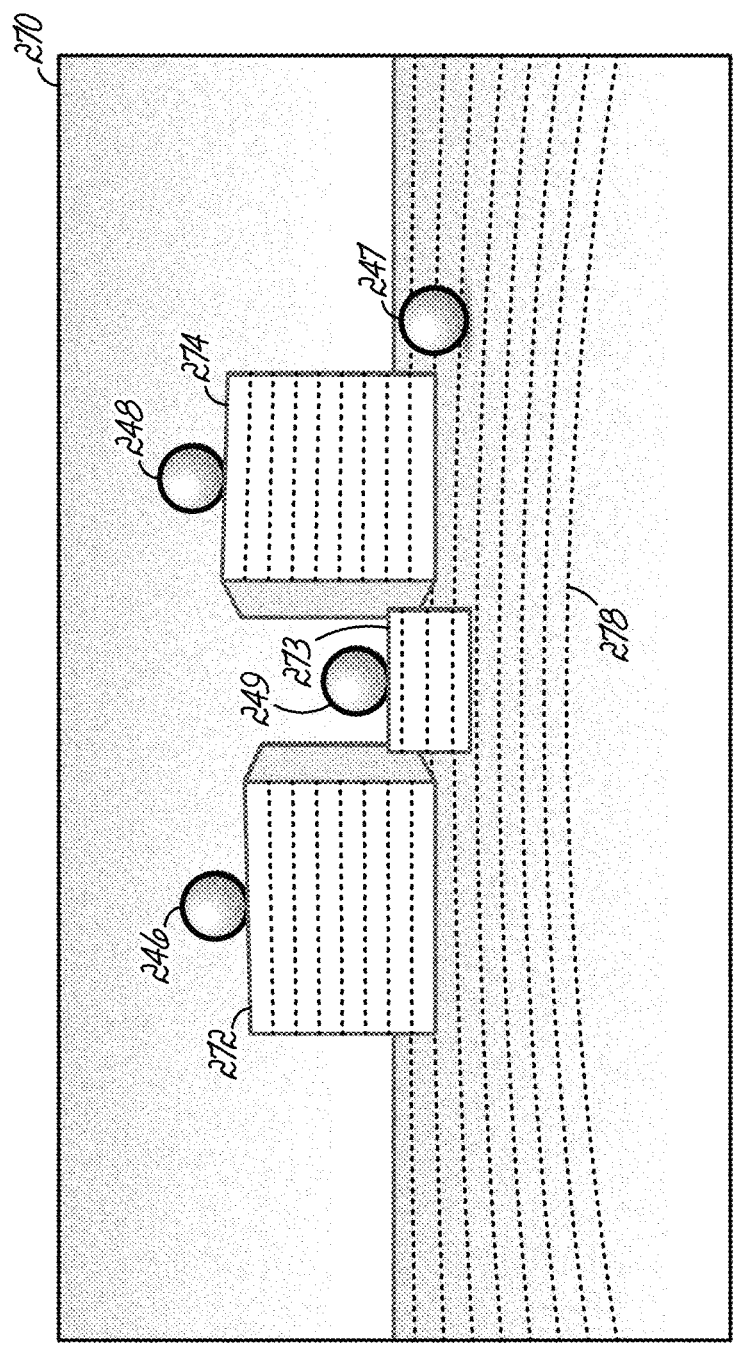
FIG. 18 is a diagrammatic view of a test setup used to obtain the data depicted by FIG. 17.

FIG. 17 includes a graph 240 having a horizontal axis 242 corresponding to position in the X-direction, and a vertical axis 244 corresponding to position in the Y-direction. The locations of each of a plurality of landmarks 246-249 and three separate localization results 254-256 and, and three different positions 260-262 of the apparatus 230 are plotted on the graph 240. FIG. 18 depicts a front view of a test setup 270 used to obtain the positions 255, 261 of the apparatus 230 shown in FIG. 17. In addition to the landmarks 246-249, the test setup 270 includes a plurality of obstacles 272-274, and a plurality of laser scanning points 278. Additional views (not shown) were taken from the positions to the left 256, 262 and the right 254, 260 of the central position 255, 261. Tables II-IV show the position data and position error for each of the positions and methods used to determine the position of the apparatus 230 in the test setup 270.

TABLE II

Position Data with Apparatus in Left Position

| Direction | X (mm) | Y (mm) | Z (mm) |
| --- | --- | --- | --- |
| Vicon LiDAR | −913.2 | −868.1 | 162.9 |
| Trilateration | −932.9 | −860.2 | 246.5 |
| Error | −14.4 | 4.30 | 86.8 |

TABLE III

Position Data with Apparatus in Center Position

| Direction | X (mm) | Y (mm) | Z (mm) |
| --- | --- | --- | --- |
| Vicon LiDAR | 19.2 | −972.8 | 159.0 |
| Trilateration | −7.88 | −972.1 | 202.4 |
| Error | −27.1 | 0.73 | 43.4 |

TABLE IV

Position Data with Apparatus in Center Position

| Direction | X (mm) | Y (mm) | Z (mm) |
| --- | --- | --- | --- |
| Vicon LiDAR | 870.9 | −809.6 | 158.4 |
| Trilateration | 838.0 | −816.0 | 338.5 |
| Error | −32.89 | −6.36 | 180.1 |

Figure 19:
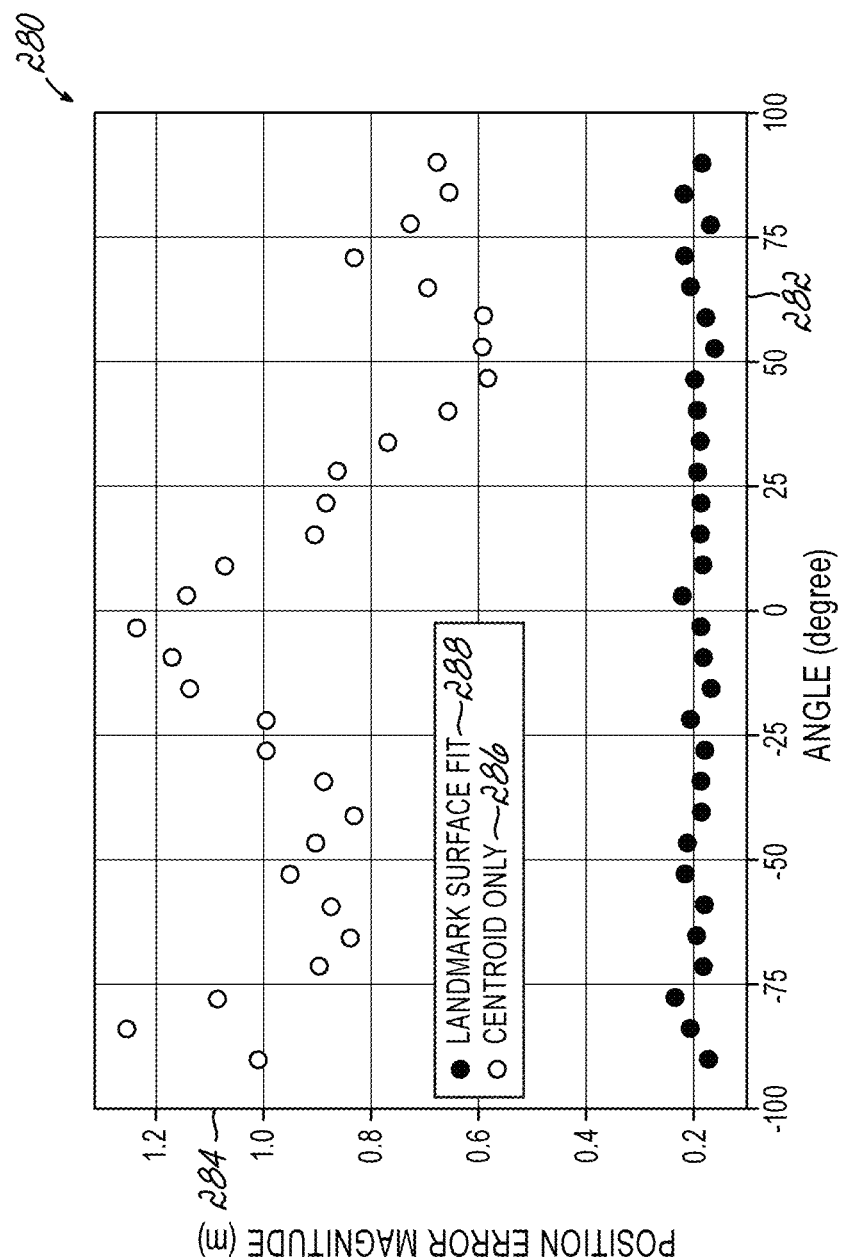
FIGS. 19 and 20 are graphical views illustrating an improvement in the accuracy of the apparatus in determining the position of the vehicle of FIG. 8 by using curve fitting.
Figure 20:
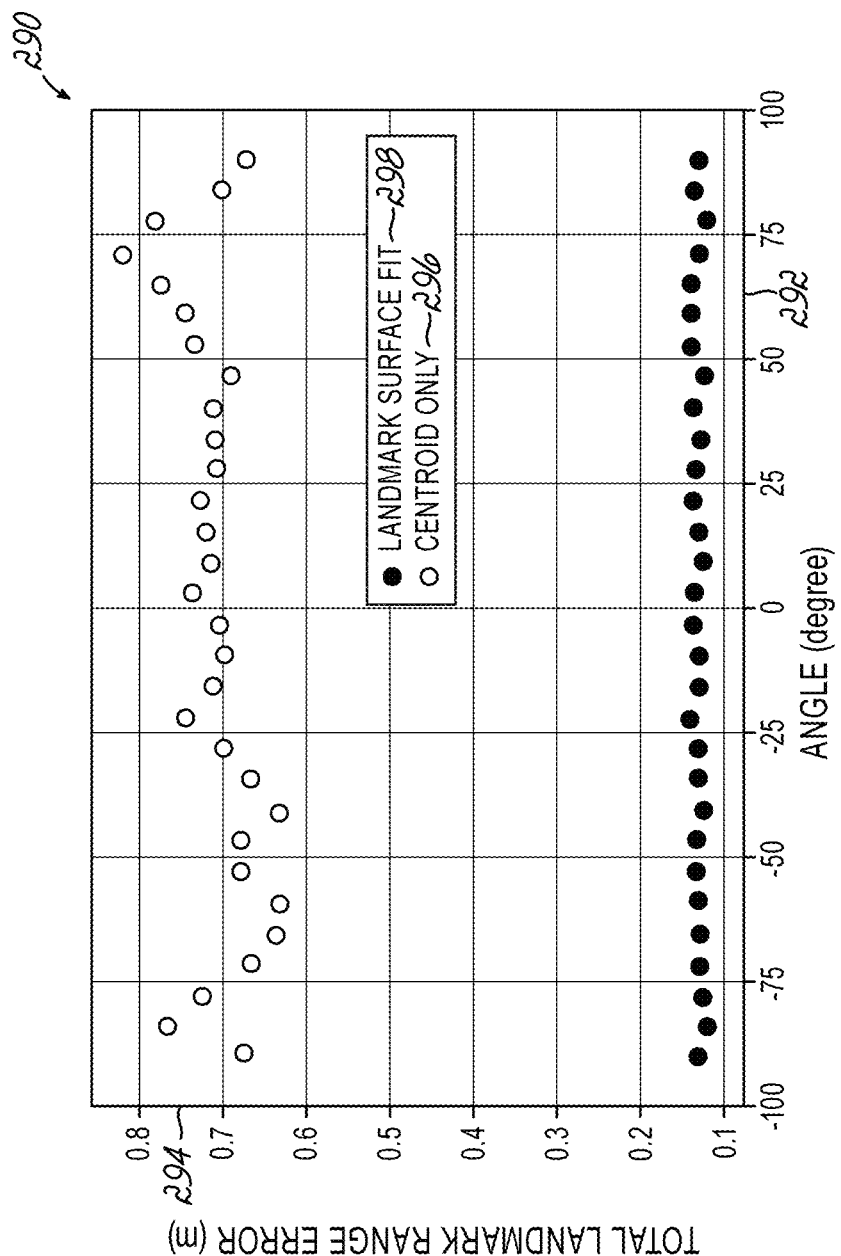

Referring now to FIGS. 19 and 20, spherical surface fitting was implemented for each landmark 246-249 with hybrid camera-LiDAR trilateration at multiple locations and compared to non-curve fit results. FIG. 19 depicts a graph 280 including a horizontal axis 282 corresponding to an angle in degrees, and a vertical axis 284 corresponding to a position error magnitude. Markers 286, 288 plotted on graph 280 show the position error magnitude at several locations in the environment for centroid only and surface fitting, respectively. FIG. 20 depicts a graph 290 including a horizontal axis 292 corresponding to an angle in degrees, and a vertical axis 294 corresponding to a total landmark range error. Markers 296, 298 plotted on graph 290 show the total range error magnitude at several locations in the environment for centroid only and surface fitting, respectively. As can be seen from graphs 280, 290, surface fitting provides a significant reduction in position error magnitude and total landmark range errors.

Figure 21A:
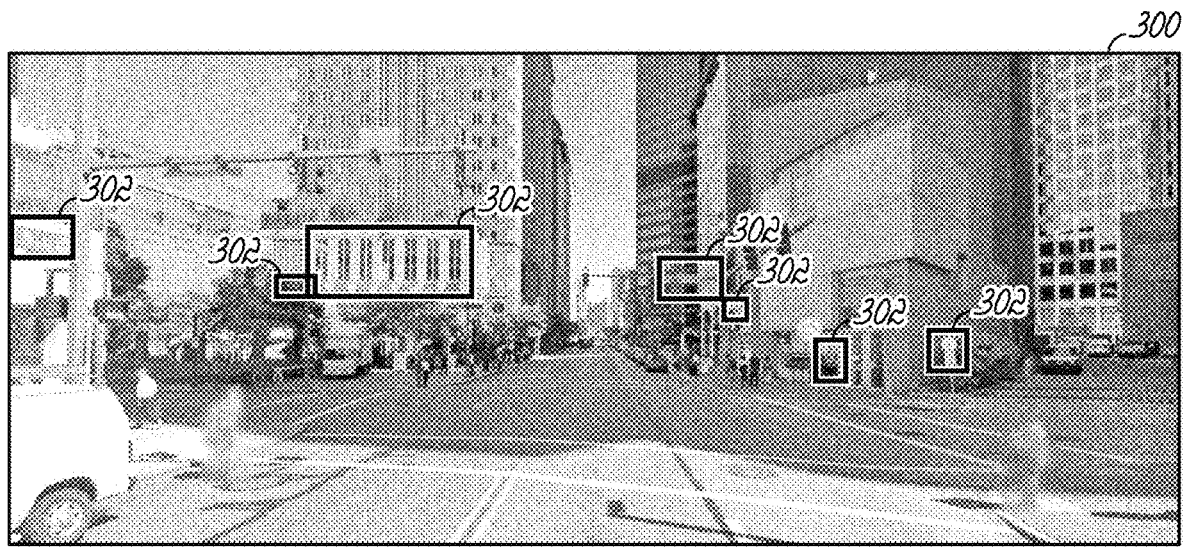
FIGS. 21A and 21B are diagrammatic views illustrating how landmarks may be identified in a two-dimensional image.
Figure 21B:
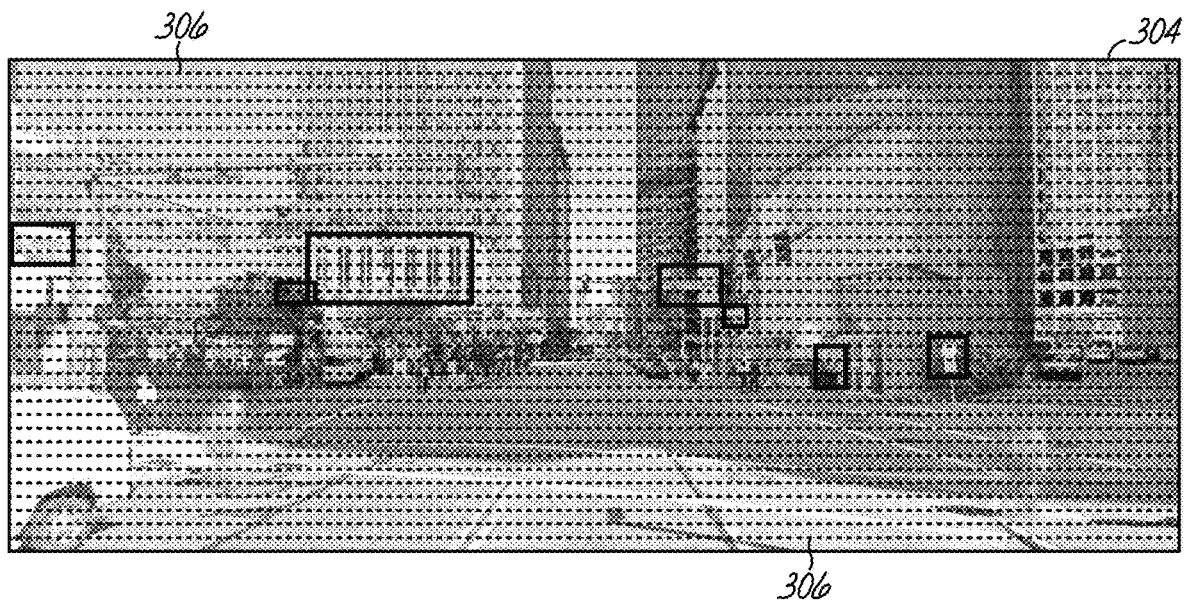

FIG. 21A depicts an image 300 of an exemplary urban scene. The image 300 includes a plurality of landmark objects 302 that may have been identified by the process 10. FIG. 21B depicts an image 304 of the same scene including the landmark objects 302 and exemplary superimposed data points $P_D(u,v)$ 306.

Surface Fitting

The impacts of spherical surface mapping of landmarks in a digital twin simulation environment on position error for a camera-LiDAR trilateration process and LiDAR to camera projection methods have been investigated. This included implementation of LiDAR point spherical surface fitting for landmark ranging, identification of a relationship between the average number of points on landmark surfaces to dilution of precision (DOP), and experimental validation of the camera-LiDAR localization process.

The hybrid camera-LiDAR positioning process was explored while performance with spherical surface mapping of LiDAR points was estimated to improve localization accuracy of GPS constrained systems operating with camera and LiDAR hardware. The methods disclosed herein for spherical landmarks in indoor scenarios are exemplary only, and may also be applied to more generic indoor or outdoor cases. In these cases, distinct features may be identified by a camera such as road signs, QR codes, fire extinguishers, or eye wash stations, by removing the spherical fitting portion and relying on either a single ranging value or using a different surface fitting technique.

Surface fitting of points on a landmark surface may allow for a range estimate that is more accurate than single-point methods. Accordingly, surface fitting may result in more accurate position estimates from trilateration of landmark ranges. The exemplary surface fitting examples provided below are focused on spherical landmarks as they are easily and consistently identifiable from varying viewing angles. However, the results are equally applicable for other types of surface fitting.

Least squares spherical fitting may be implemented given point cloud data to solve for the sphere's center and radius. The general equation of a sphere can be represented as:

$$r_s^2 = (x_d - x_0)^2 + (y_d - y_0)^2 + (z_d - z_0)^2 \quad \text{Eqn. 22}$$

where $r_s$ is the sphere radius, $(x_d, y_d, z_d)$ are the coordinates of the input point obtained from LiDAR ranges, and $(x_0, y_0, z_0)$ are the coordinates of the sphere center. The sphere equation may be expressed in vector form by first rearranging to separate like terms, $$x_d^2 + y_d^2 + z_d^2 = 2x_d x_0 + 2y_d y_0 + 2z_d z_0 + r_s^2 - x_0^2 - y_0^2 - z_0^2 \quad \text{Eqn. 23}$$

and in vector form, $$f = \begin{bmatrix} x_{d(i)}^2 + y_{d(i)}^2 + z_{d(i)}^2 \\ x_{d(i+1)}^2 + y_{d(i+1)}^2 + z_{d(i+1)}^2 \\ \vdots \\ x_{d(n)}^2 + y_{d(n)}^2 + z_{d(n)}^2 \end{bmatrix} \quad \text{Eqn. 24}$$

$$B = \begin{bmatrix} 2x_{d(i)} & 2y_{d(i)} & 2z_{d(i)} & 1 \\ 2x_{d(i+1)} & 2y_{d(i+1)} & 2z_{d(i+1)} & 1 \\ \vdots & & & \\ 2x_{d(n)} & 2y_{d(n)} & 2z_{d(n)} & 1 \end{bmatrix} \quad \text{Eqn. 25}$$

$$c = \begin{bmatrix} x_0 \\ y_0 \\ z_0 \\ r_s^2 - x_0^2 - y_0^2 - z_0^2 \end{bmatrix} \quad \text{Eqn. 26}$$

Figure 22:
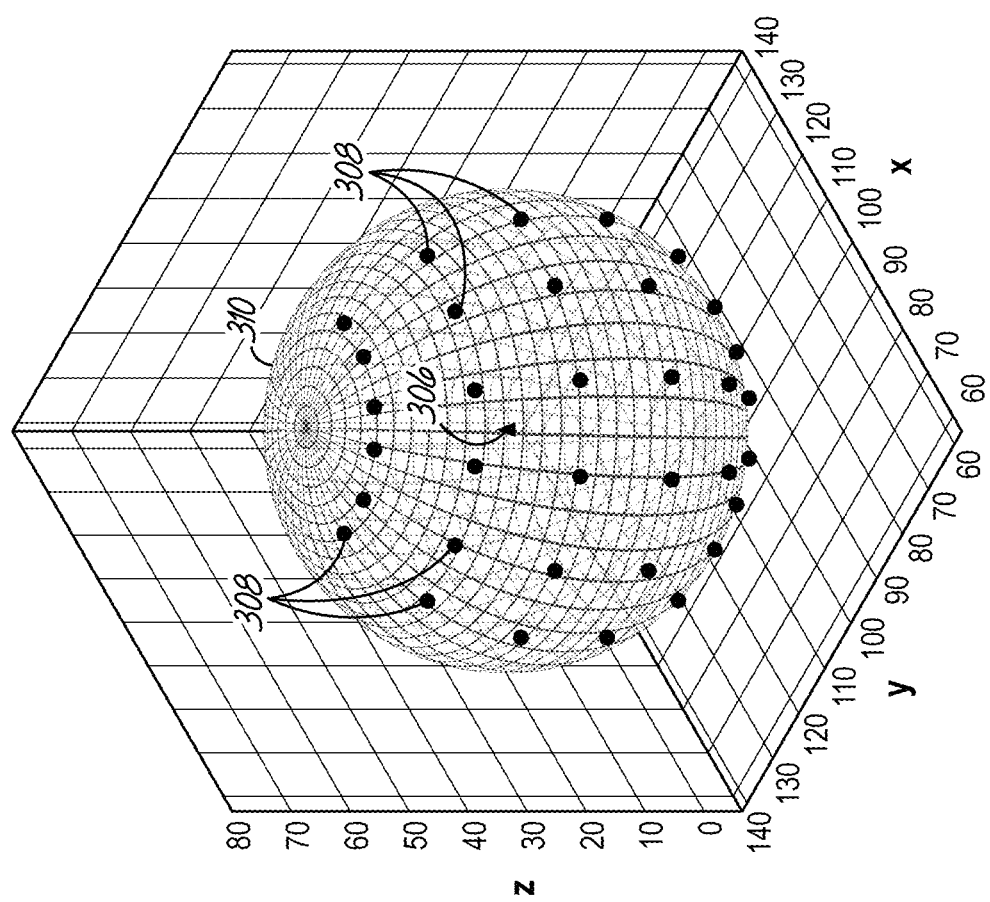
FIG. 22 is a diagrammatic view of LiDAR point cloud data fit to the surface of a landmark.

The system solution then becomes, $$f = Bc \quad \text{Eqn. 27}$$

where c provides the radius $r_s$ and center point $(x_0, y_0, z_0)$, which can be solved using linear least squares. Estimates for the sphere center and radius can then be used to determine the best-fit sphere from a nonlinear least-squares solution starting with an initial guess using a linear approach. The best-fit sphere solution may be computed using the trust region reflective (TRF) algorithm for nonlinear least square minimization problems. The trust region reflective algorithm provides the final update for the estimated center point $(x_0, y_0, z_0)$ of the sphere, and minimizes the error in the predicted sphere radius $r_s$ when compared to the known radius. The extraction of the center point of the sphere $(x_0, y_0, z_0)$ allows for a direct correlation for range to a specific landmark, without the need for applying an offset from the landmark's surface to the center point of the sphere $(x_0, y_0, z_0)$ as described above. LiDAR points on a landmark's surface can be used directly to find the center point of the sphere $(x_0, y_0, z_0)$, which represents the range to landmark from the sensor. LiDAR point cloud data fit to a landmark using a least square fit is presented in FIG. 22, where the black triangle 306 indicates the center location of the landmark center as determined from the LiDAR data, the black circles 308 indicate the LiDAR point cloud range coordinates, and the sphere 310 is the resulting surface.

Predicting performance of trilateration-based position systems can be achieved using dilution of precision, which relates land-mark or satellite geometry to the precision of the final location estimate. Identifying which factors most impact dilution of precision allows for setting requirements on the needed environment or when position solutions may be unreliable. Poorly oriented landmarks that are close together result in less certainty of the receiver position. More separation between all landmark positions may produce higher certainty in the receiver's location. Landmarks that are close together and higher uncertainty in the range estimate to one or more of the landmarks increases the size of the possible area in which the receiver could be.

Dilution of precision for determining the effects of landmark geometry on localization precision may be computed using the distance observation model in Eq. (1) by rearranging and assuming measurement noise, $v_i$ $$(x - x_i)^2 + (y - y_i)^2 + (z - z_i)^2 + v_i r_i(x, y, z) + v_i = Eqn.28$$

Equation 28 may be linearized using a Taylor series expansion with provisional values $(x_0, y_0, \text{and } z_0)$ while ignoring higher order terms, $$r_{observed} = \quad \text{Eqn. 29}$$

$$r_i(x_0, y_0, z_0) + (x - x_0)\frac{\partial r_i}{\partial x} + (y - y_0)\frac{\partial r_i}{\partial y} + (z - z_0)\frac{\partial r_i}{\partial z} + v_i =$$

$$r_i(x_0, y_0, z_0) + \Delta x \frac{\partial r_i}{\partial x} + \Delta y \frac{\partial r_i}{\partial y} + \Delta z \frac{\partial r_i}{\partial z} + v_i$$

Using the residual observation equation model as the difference between the observed range $r_{observed}$ and computed range $r_{computed}$ gives, $$\Delta r_i = r_{observed} - r_{computed} \quad \text{Eqn. 30}$$

where the with provisional values $(x_0, y_0, \text{and } z_0)$ result in, $$r_{computed} = r_i(x_0, y_0, z_0) \quad \text{Eqn. 31}$$

Substituting Equations 29 and 31 into Equation 30 yields:

$$\Delta r_i = \quad \text{Eqn. 32}$$

$$r_i(x_0, y_0, z_0) + \Delta x \frac{\partial r_i}{\partial x} + \Delta y \frac{\partial r_i}{\partial y} + \Delta z \frac{\partial r_i}{\partial z} + v_i - r_i(x_0, y_0, z_0) =$$

$$\Delta x \frac{\partial r_i}{\partial x} + \Delta y \frac{\partial r_i}{\partial y} + \Delta z \frac{\partial r_i}{\partial z} + v_i$$

The resulting system can be converted to matrix form to identify a linear relationship:

$$[\Delta r_i] = \begin{bmatrix} \frac{\partial r_i}{\partial x} & \frac{\partial r_i}{\partial x} & \frac{\partial r_i}{\partial x} \end{bmatrix} \begin{bmatrix} \Delta x \\ \Delta y \\ \Delta z \end{bmatrix} + v_i \quad \text{Eqn. 33}$$

The resulting relationship can be extended to a general form, for L number of landmarks in the system, $$\begin{bmatrix} \Delta r_1 \\ \Delta r_2 \\ \vdots \\ \Delta r_L \end{bmatrix} = \begin{bmatrix} \frac{\partial r_1}{\partial x} & \frac{\partial r_1}{\partial x} & \frac{\partial r_1}{\partial x} \\ \frac{\partial r_2}{\partial x} & \frac{\partial r_2}{\partial x} & \frac{\partial r_2}{\partial x} \\ \vdots & \vdots & \vdots \\ \frac{\partial r_L}{\partial x} & \frac{\partial r_L}{\partial x} & \frac{\partial r_L}{\partial x} \end{bmatrix} \begin{bmatrix} \Delta x \\ \Delta y \\ \Delta z \end{bmatrix} + \begin{bmatrix} v_1 \\ v_2 \\ \vdots \\ v_L \end{bmatrix} \quad \text{Eqn. 34}$$

and finally represented in matrix symbol form as, $$p = A\delta + v \qquad \text{Eqn. 35}$$

where p contains the residual observations of $r_i$, the design matrix A built from the partial derivatives of the observations, unknown corrections of $\delta$, and noise matrix v.

The covariance matrix Co is a square matrix of expected values of two errors multiplied or, in the case of trilateration, how the geometry of two landmarks maps into uncertainty of the position estimate. The design matrix A and variance of each landmark, a, is used to compute the covariance by:

$$C_o = \sigma^2 (A^T A)^{-1} = \sigma^2 \begin{bmatrix} \sigma_x^2 & \sigma_{xy} & \sigma_{xz} \\ \sigma_{yx} & \sigma_y^2 & \sigma_{yz} \\ \sigma_{zx} & \sigma_{zy} & \sigma_z^2 \end{bmatrix} \qquad \text{Eqn. 36}$$

Assuming a constant value for a is typically used on the scale of GPS, and provides a method for a dilution of precision calculation that relies solely on landmark or satellite geometry. There are several measures of dilution of precision, including vertical dilution of precision (VDOP), horizontal dilution of precision (HDOP), position dilution of precision (PDOP), time dilution of precision (TDOP), and geometric dilution of precision (GDOP). Vertical, horizontal, and position dilution of precision only represent the effects of landmark geometry on error propagation for position estimation. In contrast, time and geometric dilution of precision include timing errors from satellites to a receiver. GPS standards indicate that a position dilution of precision value of less than or equal to six provides generally acceptable positioning accuracy. The present disclosure assumes negligible effects from timing and ignores geometric dilution of precision and time dilution of precision because direct time-of-flight measurements from the LiDAR are being made to collect ranges to the environment. Position dilution of precision is used as the main measure of uncertainty as it encompasses all three dimensions where values are computed by:

$$\text{PDOP} = \sqrt{\sigma_x^2 + \sigma_y^2 + \sigma_z^2} \qquad \text{Eqn. 37}$$

Consistent range variances between all satellites are typically assumed for GPS because the most significant source of increasing dilution of precision is environmental factors. But for systems on a smaller scale operating with trilateration that have larger variances on range measurements between landmarks, it may be necessary to capture how uncertainty of landmark ranges propagates into final position estimate accuracy and precision. Without considering differences in specific landmark range variances, the system may operate significantly outside of the designed specifications. The weighted dilution of precision can instead be used to capture the specific range variance of each land-mark where a becomes a diagonal matrix built by the variance of each landmark:

$$\sigma_w = \begin{bmatrix} \frac{1}{\sigma_1^2} & 0 & 0 & 0 & 0 \\ 0 & \frac{1}{\sigma_2^2} & 0 & 0 & 0 \\ 0 & 0 & \frac{1}{\sigma_3^2} & 0 & 0 \\ 0 & 0 & 0 & \ddots & 0 \\ 0 & 0 & 0 & 0 & \frac{1}{\sigma_L^2} \end{bmatrix} \qquad \text{Eqn. 38}$$

The resulting matrix can be expressed as a weighted least-squares solution and reduced to compute the weighted position dilution of precision (WPDOP), $$\text{WPDOP} = \sqrt{tr(A^T \sigma_w A)^{-1}} \qquad \text{Eqn. 39}$$

which considers landmark geometry with the respective range variance. The weighted position dilution of precision may be computed to identify how sensitive trilateration with hybrid camera-LiDAR systems is to the number of points projected onto the surface of the landmark.

The trilateration process may be implemented for systems that assume the range variance to each landmark is the same. In the present disclosure, variance of each landmark may be used to identify the impacts of surface fitting. Identifying how the uncertainty of landmark range estimates propagate to the final position estimate may be used to predict performance. Uncertainty of landmark range may be calculated using weighted position dilution of precision, where the variance of points on each landmark surface is used to compute the uncertainty of landmark range using the sphere fit covariance matrix $C_s$, $$C_s = \sigma_p^2 (J^T J)^{-1} \qquad \text{Eqn. 40}$$

where $\sigma_p^2$ represents the variance of the LiDAR point cloud ranges on the landmark surface, and J is the geometry matrix of LiDAR points on the surface of the sphere. The cofactor matrix $(J^T J)^{-1}$ composed of the point variance $\sigma_s$, is then substituted into Eq. (40) to produce:

$$C_s = \sigma_p^2 \begin{bmatrix} \sigma_{sx}^2 & \sigma_{sxy} & \sigma_{sxz} \\ \sigma_{syx} & \sigma_{sy}^2 & \sigma_{syz} \\ \sigma_{szx} & \sigma_{szy} & \sigma_z^2 \end{bmatrix} \qquad \text{Eqn. 41}$$

LiDAR point variance may be obtained from the manufacturer, and may be assumed to be consistent for all points. The total variance of the landmark range a, may be computed using the trace of the sphere fit covariance matrix, $$\sigma_i = tr(C_s)$$

which can be substituted into Equations 38 and 39 to compute the weighted position dilution of precision of the trilateration process given a LiDAR point cloud and variances. Weighted position dilution of precision may provide a measure of the precision of the estimate, while accuracy of the trilateration process may be measured by computing the total position error, $E_p$ as follows, $$E_p = \sqrt{(x-x_p)^2 + (y-y_p)^2 + (z-z_p)^2} \qquad \text{Eqn. 43}$$

where $x_p$, $y_p$, and $z_p$ represent the ground truth position of the receiver obtained in simulation or using marker-based motion capture.

In an embodiment of the hybrid camera-LiDAR system, the system estimates position using trilateration based on RGB monocular vision for landmark identification and LiDAR for landmark ranging. Visual images produced by an RGB camera are used to identify landmarks in an image frame with color matching and OpenCV. Landmarks are identified in an image frame, and all LiDAR points that are contained on the surface of the landmark are used for surface fitting so that a range can be approximated. Each landmark is assigned unique and different colors, and each respective color range is used to obtain contours that define the edges of the landmarks in an image. The system generates three-dimensional point clouds, and these point clouds are projected onto an image frame to determine which points lay within the contour of the landmark. The points laying on the contour of the landmark are used to generate a surface, and the center of the landmark is determined from the surface. The center of the landmark may then be used to calculate the range to the landmark based on the LiDAR data. The range resulting from point cloud surface fitting is then used for trilateration-based position estimation.

Figure 23:
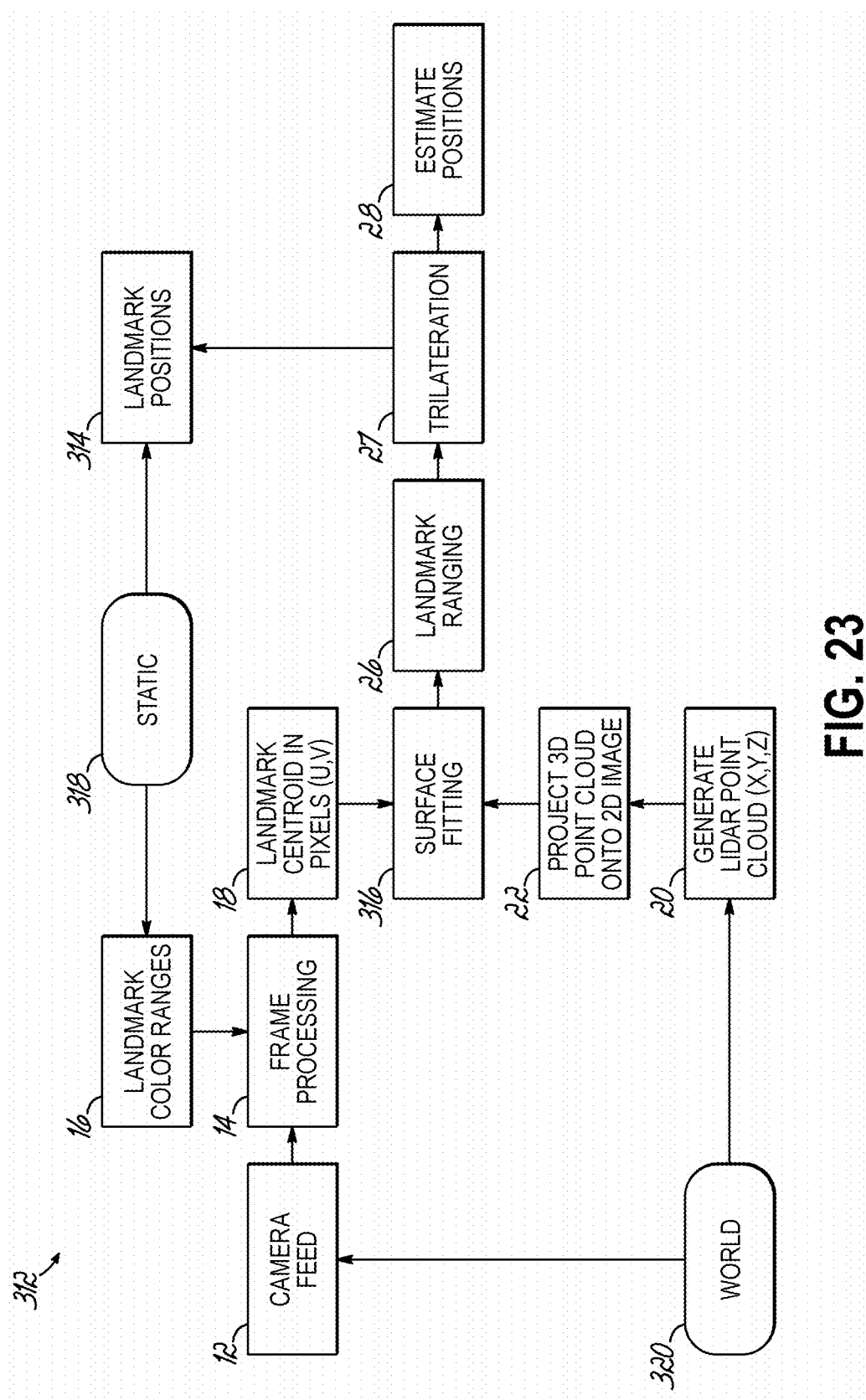
FIG. 23 is a diagrammatic view of an alternative process for determining a position based on a three-dimensional point cloud of data points indicating ranges to one or more landmarks and a two-dimensional image including the one or more landmarks that includes surface fitting.

Referring now to FIG. 23, inputs to an exemplary hybrid trilateration process 312 in accordance with an embodiment of the invention may include landmark global position 314 and range, which are used in the Powell optimization algorithm that minimized the least squares error between a set of distance equations from the LiDAR to each landmark and their respective measured distances to solve for the final position estimate. The hybrid trilateration process 312 differs from process 10 depicted in FIG. 1 primarily in that surface fitting 316 (e.g., sphere fitting) is used to determine ranges to landmarks rather than the data point closest to the centroid 24. Landmark color ranges 16 (RGB) and landmark positions are static data 318, while camera feed 12 and LiDAR data 20 are dynamic data obtained from the outside world 320.

Figure 24:
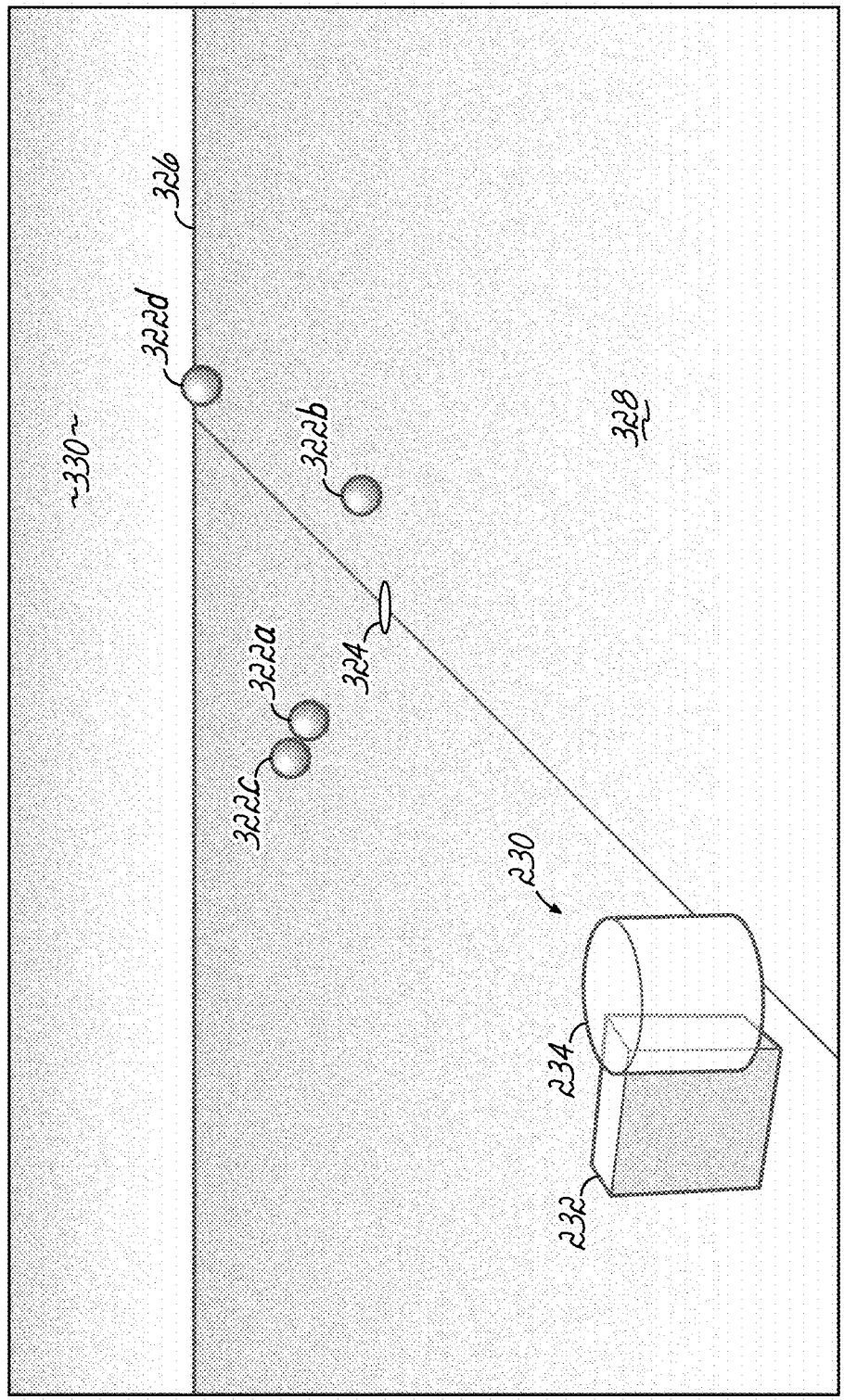
FIG. 24 is a diagrammatic view of an exemplary test environment including a hybrid camera-LiDAR apparatus and landmarks.

FIG. 24 depicts an exemplary digital twin simultaneous localization and mapping simulation environment that includes four landmarks 322 represented as spheres each having a unique RGB color value, e.g., orange, purple, green, and blue. A position estimate for the depicted setup may be obtained with only three landmarks 322. However, four landmarks 322 are used so that a unique solution can be obtained if one of the landmarks 322 is occluded. The visual camera 232 and scanning LiDAR unit 234 of apparatus 230 are located in front of the landmarks 322. The global positions and colors of the landmarks 322 are shown in Table V, where each sphere has a radius of 38.1 mm to model available landmark hardware. An origin 324 of the simulation environment is represented as a white disk. During simulations, the camera and LiDAR were oriented to face all landmarks 322. A horizon 326 separates the ground 328 and sky 330.

TABLE V

SIMULATED LANDMARK POSITION & COLOR

| LANDMARK | X (mm) | Y (mm) | Z (mm) | COLOR |
|---|---|---|---|---|
| 322a | 247.8 | 83.53 | 150.0 | ORANGE |
| 322b | −250.0 | −192.0 | 70.0 | BLUE |
| 322c | 238.8 | −303.6 | 225.7 | PURPLE |
| 322d | −451.0 | 258.7 | 440.0 | GREEN |

Simulated sensors include the visual camera 232 and LiDAR unit 234, with the visual camera 232 being located to the left of the LiDAR unit 234. These sensors are used for landmark identification (visual camera 232) and to measure the range to each respective landmark 322 (LiDAR unit 234). RGB images are used to determine the location of each landmark in a frame and may be achieved using known color ranges and OpenCV to mask the image. The masked image may only include the pixels that represented the desired landmark. The contour of each landmark may be computed and used later in the hybrid trilateration process 312 to determine which LiDAR points map inside the contour when projected to pixel coordinates (u, v) for surface fitting. The simulated LiDAR sensor is modeled after the aforementioned Velodyne VLP-16 Hi-Res, but with a vertical field of view of −10 to +10 degrees with a 1.33 degree resolution. Sensor noise is not modeled for ranges so that the process may be evaluated under an ideal scenario, and a horizontal resolution of 0.1 degrees is used to gather as many points as possible on the landmark surfaces. LiDAR is used to estimate ranges to objects in the environment where each range is represented as a point with X, Y, and Z components. The resulting points are translated and rotated to the coordinate system of the visual camera 232 and then projected to 2D pixel coordinates using positions and quaternions of the camera and LiDAR provided in simultaneous localization and mapping. Each point is translated by subtracting the camera's position from the point's position (X, Y, Z), and then rotated to the camera's coordinate frame using the camera's quaternion. This translation results in $T'_x$, $T'_y$, and $T'_z$, which is in a 3D to 2D projection model in simultaneous localization and mapping according to Equation 17. The range for each landmark may be determined by fitting all projected LiDAR points that lie in the landmark's contour and solving for the surface center using Equation 27, which estimates the sphere center using nonlinear least square fitting. Exemplary projected LiDAR points on an image frame are shown in FIG. 9.

After landmark range estimates are determined, a solution of the (x, y, z) position may be determined using trilateration. Because there are four landmarks, the system is overdetermined, and trilateration is solved numerically. The position estimate of the system may be determined via trilateration by minimizing Equation 3, where the range approximation $r_L$ for each landmark L is measured using LiDAR, and landmark positions $L(x_L, y_L, z_L)$ are obtained and used for the minimization of Equation 3. The Powell optimization algorithm may be used to solve the point (x, y, z) that minimized the least squares error by performing bidirectional search given a starting position of (0, 0, 0). The Powell optimization algorithm may be selected, for example, because derivatives are not required, and data can be assumed to be noisy when qualifying the process with sensor hardware. The camera-LiDAR trilateration positioning solution process is shown below as Algorithm 2 with reference to the equations presented where the output is a final position estimate.

---

Algorithm 2 Hybrid camera-LiDAR trilateration positioning process
  for X, Y, and Z in lidarData do
    Rotate and translate LiDAR points to camera frame
    $T'_x, T'_y, T'_z$ = rotateAndTranslate(X, Y, Z)
    Convert LiDAR coordinates to pixel coordinates
    if Simulation then
      If using simulation, do OpenGL projection from 3D LiDAR to 2D camera
      u, v = Equations 17 and 18 ($T'_x, T'_y, T'_z$)
    else
      If using physical sensors, do pinhole projection from 3D LiDAR to 2D camera
      u, v = Equation 7 ($T'_x, T'_y, T'_z$)
    end if
  end for

-continued

```
for landmark in landmarkList do
    Find all points in landmark contour
    x_d, y_d, z_d = inLandmarkCountour(u, v)
    Compute surface fit for landmark center and range estimate
    r_L, x_0, y_0, z_0 = Equation 27
end for
Minimize least square error of ranges, r_L using Powel algorithm and return
position estimation
return x, y, z = trilateration(r_L, landmarkL[x_L, y_L, z_L])
```

One benefit of increasing the accuracy of range estimates is a corresponding reduction in position estimate error when using trilateration. To identify improvements in range accuracy when increasing the number of points used for sphere fitting, the number of points on the sphere surface was varied from 4 points to 100 points in squared increments. Monte Carlo analysis was performed until the change in root-mean-squared error of the center point was less than $10^{-9}$. Random normal noise having a standard deviation of 1.5 mm was applied to every point on the surface to identify the effects of LiDAR noise with increasing number of points, as zero noise in ranges would result in zero error for range and position. The sphere diameter was set to 76.2 mm, which is the diameter of the color-selectable LED orbs used for experimentation. Nonlinear-spherical fitting was applied for each set of point clouds. To identify improvements when using the sphere fitting process for range estimates, the spherical fitting approach was compared to calculating the distance to the point on the landmark closest to the vehicle and adding the radius of the sphere to this distance.

Figure 25:
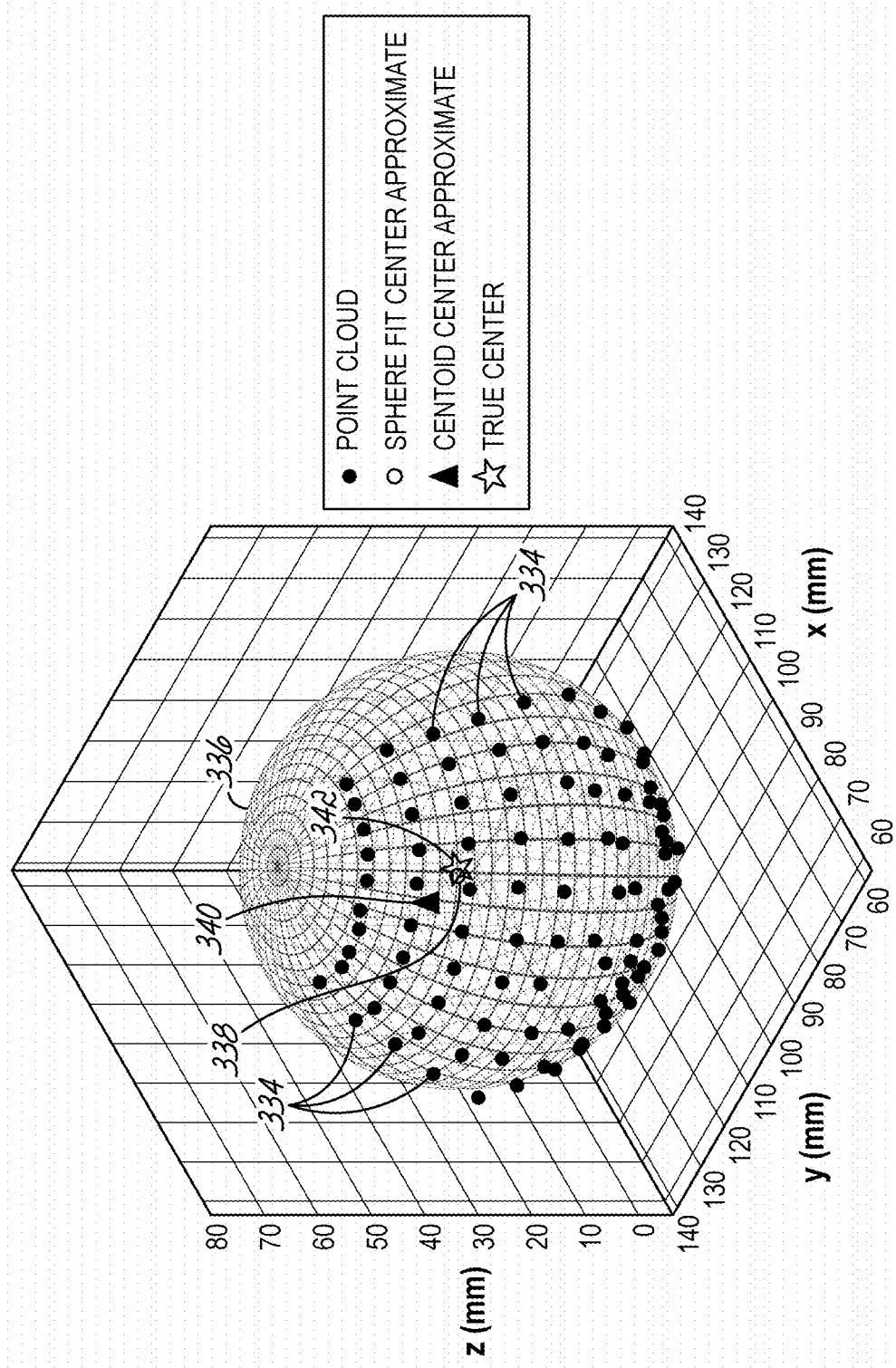
FIG. 25 is another diagrammatic view of LiDAR point cloud data fit to the surface of a landmark in which surface fitting is used to determine a sphere fit center of the landmark.

FIG. 25 depicts an exemplary fitted sphere including points 334 used for sphere fitting with the applied normally distributed noise, a wire frame that represents the best fit sphere 336 to the points 334, a star that represents a nonlinear least square solution to the sphere center 338, a triangle that indicates the centroid method center estimate 340, and a true center 342 of the sphere. As can be seen, the nonlinear least square solution to the sphere center 338 is closer to the true center 342 of the sphere than the center estimate 340 using the centroid method.

The accuracy of the final position estimate may increase as the position dilution of precision decreases for the same ranging errors. A decrease in position dilution of precision may be achieved by introducing more landmarks or adding more separation between each landmark. However, introducing more landmarks or adding more separation between each landmark does not capture the effects of surface fitting. To demonstrate the effects of surface fitting, simulations were performed to identify changes in dilution of precision when adding the spherical surface fitting process by computing the weighted position dilution of precision and varying the number of points on landmark surfaces. Monte Carlo analysis was performed while the change in position estimate root-mean squared error was greater than $10^{-9}$, and random normal noise having a standard deviation of 1.5 mm was applied to every point on the surface to identify effects of improved range error from sphere fitting on final position estimate accuracy. The number of landmarks was set at four, which provided enough landmarks for a unique solution as only 3D position was of interest. Total position error and weighted position dilution of precision were both calculated and averaged to identify performance changes when increasing the number of points on landmark surfaces.

Figure 26:
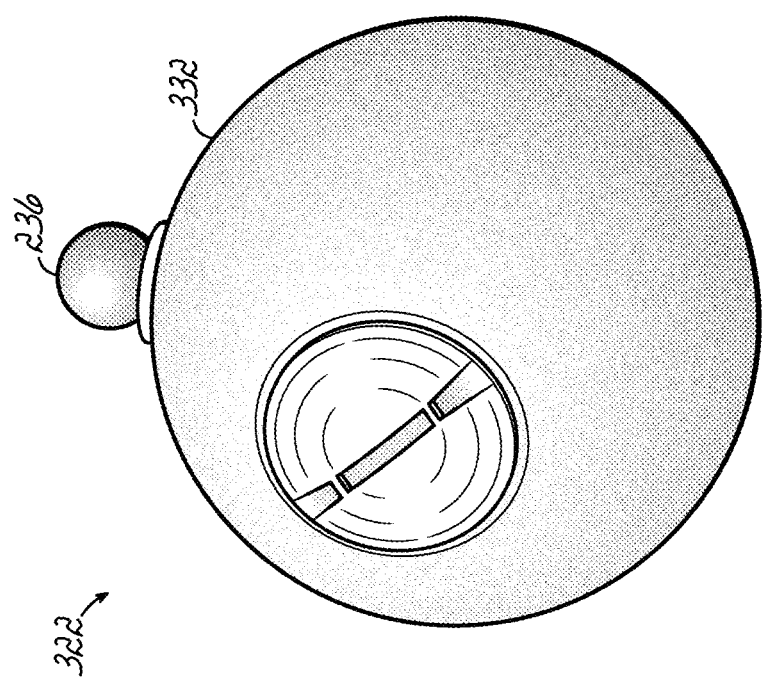
FIG. 26 is a diagrammatic view of a landmark including an orb and a motion tracking infrared reflective ball.

The hybridized camera-LiDAR positioning system was implemented experimentally to evaluate the LiDAR to camera projection process while identifying hardware-specific issues. Equipment for the hybrid position estimate process consisted of the aforementioned Velodyne VLP-16 Hi-Res 3D scanning LiDAR unit for generating point clouds, and a 3.0-megapixel camera with a pinhole lens for generating RGB images. The sensors were mounted to maintain consistent extrinsic parameters between the scanning LiDAR unit and the pinhole RGB camera. A motion tracking infrared reflective ball 236 was attached to the apparatus 230 for obtaining a ground truth position as shown in FIG. 16. The use of a pinhole lens may simplify the computation of the 3D LiDAR point cloud to 2D pixel projection matrix as negligible lens distortion needed to be considered. FIG. 26 depicts an exemplary landmark 322 including an orb 332 and a motion tracking infrared reflective ball 236.

The scanning LiDAR unit 234 was calibrated by placing it in front of a known distance flat wall. Several scans were then taken to identify a calibration range offset value for each laser. Each laser was then zeroed (tared) based on its respective offset value. The number of scans was increased in increments of one for each laser while computing the average error and standard deviation for the increasing number of scans. The average range error for each laser converged at around 100 samples where a change in standard deviation was used as the convergence metric. The average error at 100 scans was then used to apply tare values to each laser. Calibration of the LiDAR sensor was made to ensure that the sensor was operating in manufacturing specifications while providing the highest achievable accuracy when computing position.

The camera was calibrated to obtain a 3D LiDAR to 2D pixel projection matrix using OpenCV given a set of 50 images taken of an 8×6 checkerboard assuming a pinhole lens model. Camera calibration may be performed to compute a projection matrix that maps the 3D LiDAR ranges to 2D image pixels. The conversion of LiDAR ranges to pixel coordinates allows for specific locations in image to contain information of the relative range from the LiDAR to that specific location in an image. The sphere fitting process was first qualified by taking 100 scans and incrementally increasing the number of samples while averaging each repeated point in the set of points, to generate an averaged point cloud. The averaged point cloud was then projected onto the image of a single landmark, and the sphere fitting process applied for each incrementally averaged point cloud. Qualification of the sphere fitting process enabled the best possible performance to be identified in a given environment.

The hybrid camera-LiDAR apparatus 230 was placed at a single location in a test environment to examine the experimental performance of the hybrid trilateration process 312. The test environment included four landmarks in a similar arrangement as depicted in the exemplary test environments described above. The hybrid trilateration process 312 was evaluated by taking 100 scans of the test environment and averaging the point cloud over each sample. The hybrid trilateration process 312 concurrently computed a position estimate with an increasing number of averaged point clouds to identify a baseline performance. The total position error was computed for each number of samples by comparing positions computed by the hybrid trilateration process 312 to positions determined from motion tracking of infrared reflective balls 236. The previously described single-point trilateration process that relied only on one point on the surface of the landmark was also performed using the same averaged data sets to identify improvements from the single point ranging method. The current study utilized a stationary hybrid camera-LiDAR system for gathering data that was subject to post-processing localization solutions. However, the above described methods could be incorporated onto a mobile robot to perform complimentary navigation solutions to methods that rely on similar sensors such as simultaneous localization and mapping or remain the main source of a position estimate.

Digital twin simulations modeled after the test environment were performed with the surface fitting camera-LiDAR trilateration system to generate estimated positions. These estimated positions were compared to known vehicle positions inside the simulation to evaluate the surface fitting hybrid trilateration process at several viewing angles as well as characterize improvements in accuracy over the single point hybrid trilateration process. All simulations were performed in the same test environment where the system was placed at locations along an 180° arc from −90 to +90 degrees around the center of the landmarks so that the RGB camera was always facing the landmarks. Ten points around the arc were used where each location was performed for 30 iterations to identify performance at varying landmark viewing angles. The simulation environment included landmarks, camera-LiDAR apparatus, a starting location, and an ending position 153 in a similar configuration as shown in FIG. 10. The camera-LiDAR apparatus was placed along the arc 156 always facing the landmarks.

Figure 27:
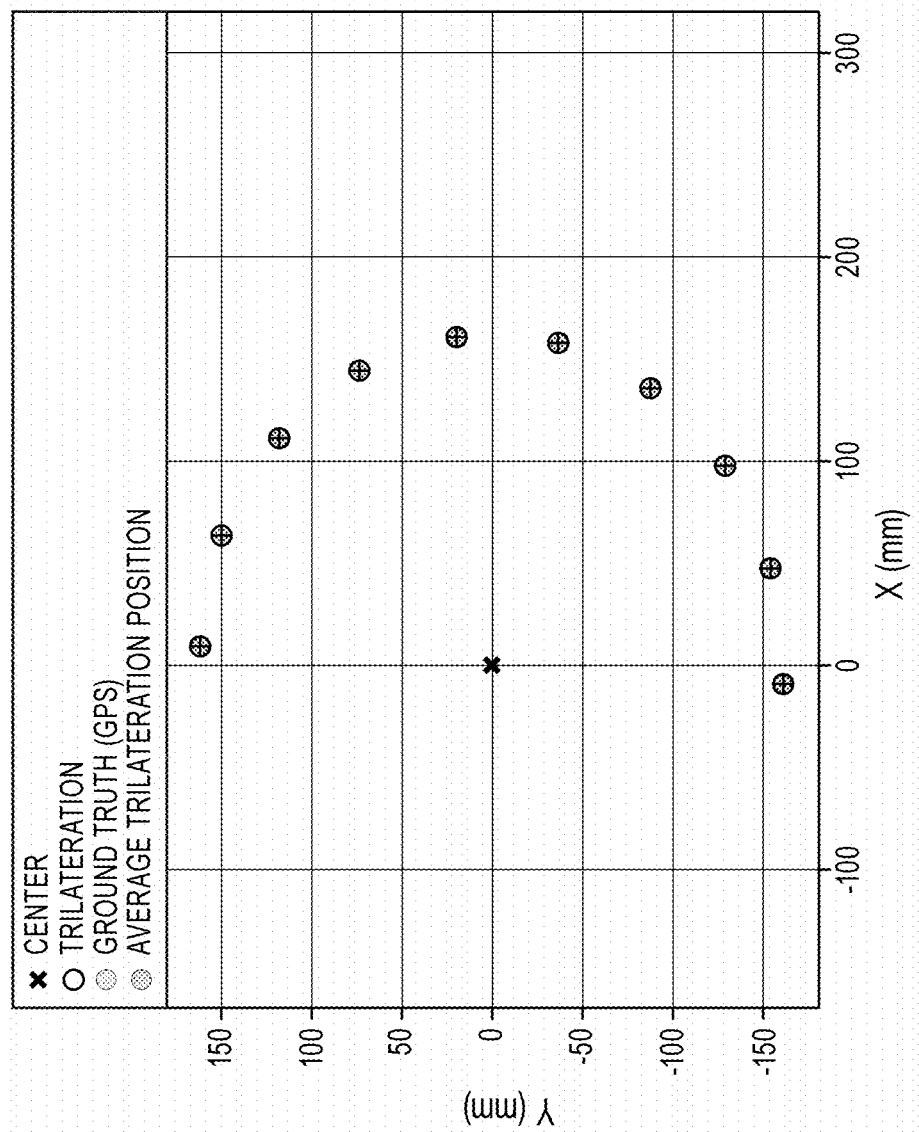
FIG. 27-36 are graphical views illustrating the accuracy of the process of FIG. 23 in estimating the position of the apparatus of FIG. 24.
Figure 28:
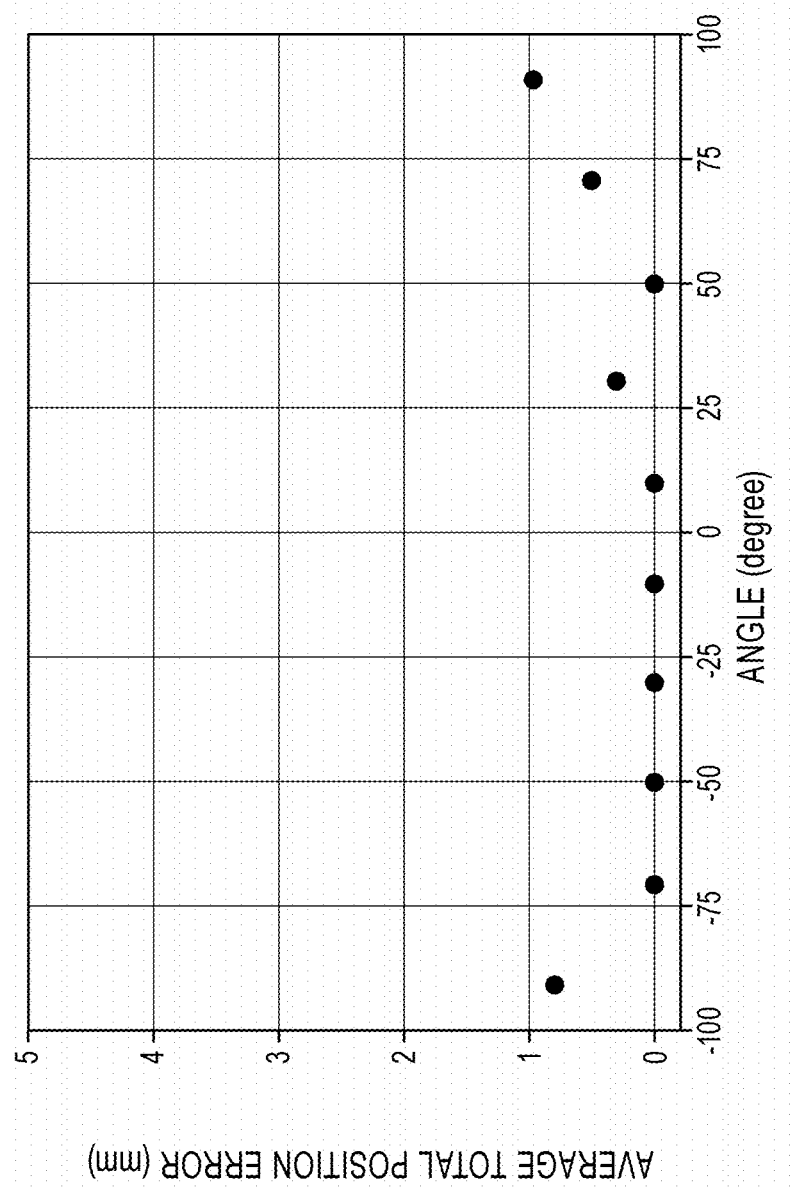
Figure 29:
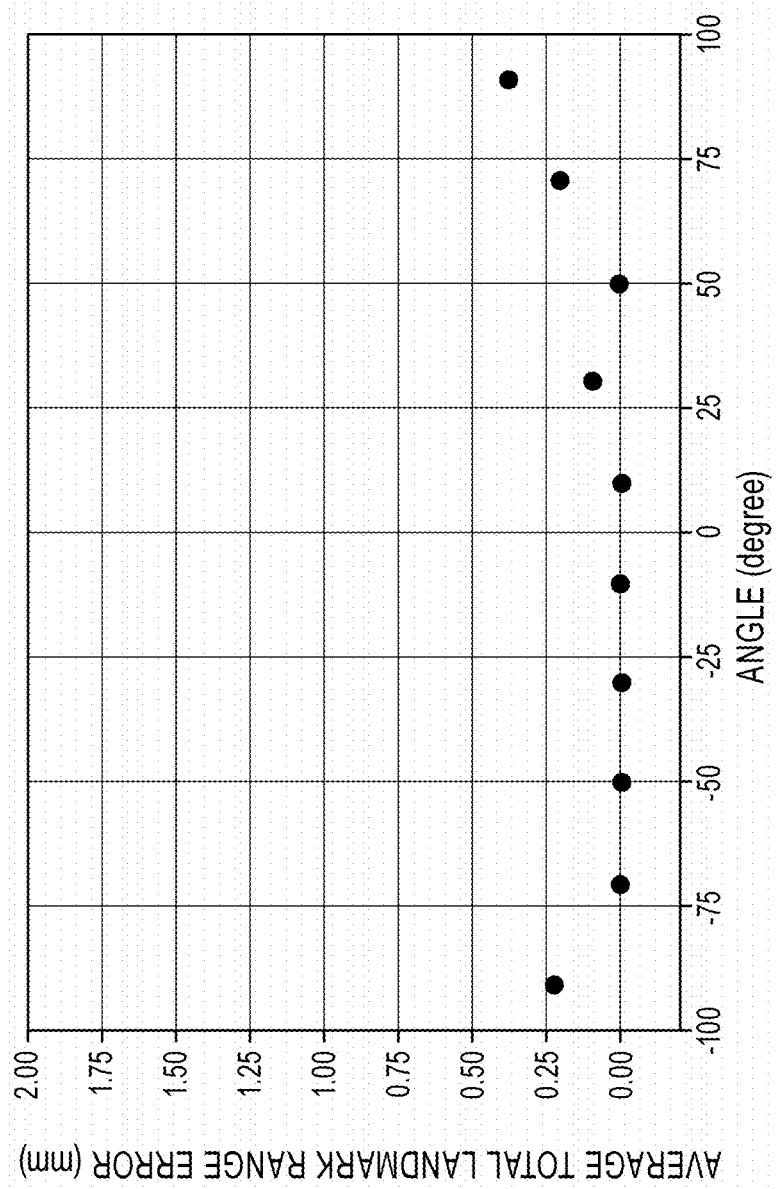

Hybrid camera-LiDAR trilateration position estimates and actual positions were recorded at each point around the arc to calculate average positioning error at each location where an average position estimate error magnitude of −0.11 mm was found in the X dimension, −0.005 mm in the Y dimension, and −0.142 mm in the Z dimension. FIG. 27 depicts a graph showing actual and trilateration (x, y) position estimate results, with the respective error bars at each location are presented in FIG. 27. The green points represent ground truth positions, open blue circles indicate the camera-LiDAR position estimates, teal circles represent the average position estimation for that location, black bars are the error bars for each location from the standard deviation of the position estimation, and the red X is the point that the vehicle was rotating about to keep all landmarks in the camera's image frame. FIG. 28 depicts a graph showing total position error results with standard deviation error bars that resulted in an average of 0.264 mm. FIG. 29 depicts a graph showing the range error magnitude for all landmarks with error bars, where an average of 0.1 mm is observed.

The hybrid camera-LiDAR trilateration process was evaluated in a simulation environment that was modeled and scaled based on the available test environment. The offset between the LiDAR and camera in simulation was set to measurements taken from the available hardware. The LiDAR unit was modeled after the Velodyne VLP-16 Hi-Res, without noise in the point cloud to test the feasibility of the process with perfect range measurements while identifying the best possible performance of the system. Results provided higher accuracy than typically available GPS according to GPS standards. Simulation results indicate that there is little impact on accuracy from moving the camera-LiDAR apparatus, as the number of points on the surface of landmarks, the variability of the points on the landmark surface, the position of landmarks, and number of landmarks are what drive the error of localization.

The trilateration process was performed assuming fixed landmark locations in the simulation environment to evaluate the process in a highly controlled environment and identify the effects of increasing the number of points on landmark surfaces. Sphere fitting range estimates for a single landmark were computed to identify range estimate improvements as compared to the single point method described above. The trilateration process was then evaluated while increasing the number of points on each landmark's surface and computing the position error and weighted position dilution of precision to identify performance in an ideal scenario.

Figure 30:
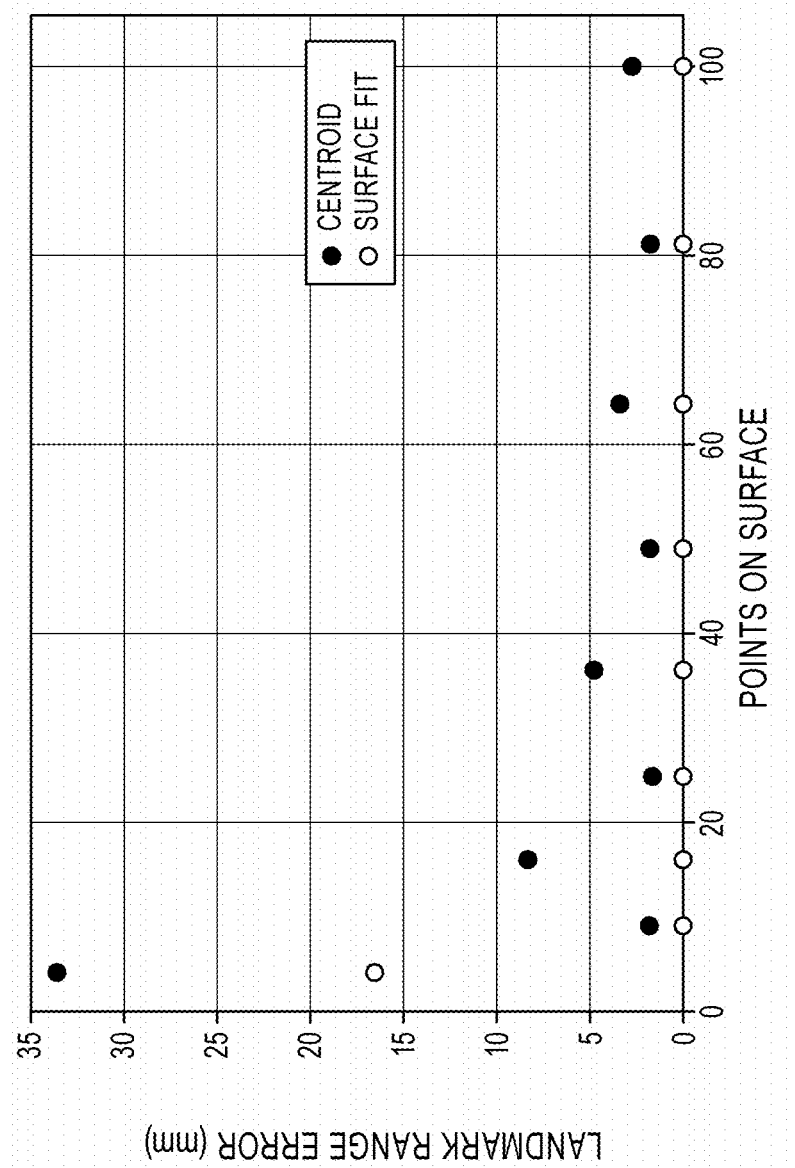

Ranging performance from the surface fitting process was investigated and compared to the single point method for LiDAR range estimates to landmarks when using trilateration. The number of points on the landmark surface was varied from 4 to 100 in squared increments. FIG. 30 depicts a graph showing the results of this simulation. As can be seen, the range error decreased for both methods as the number of points increased, with the surface fitting method consistently providing less range error than the single point method. Decreased range error may result in more accurate position estimate results, indicating that increasing the number of points on landmark surfaces will result in better localization when using surface fitting as compared to single point methods.

Figure 31:
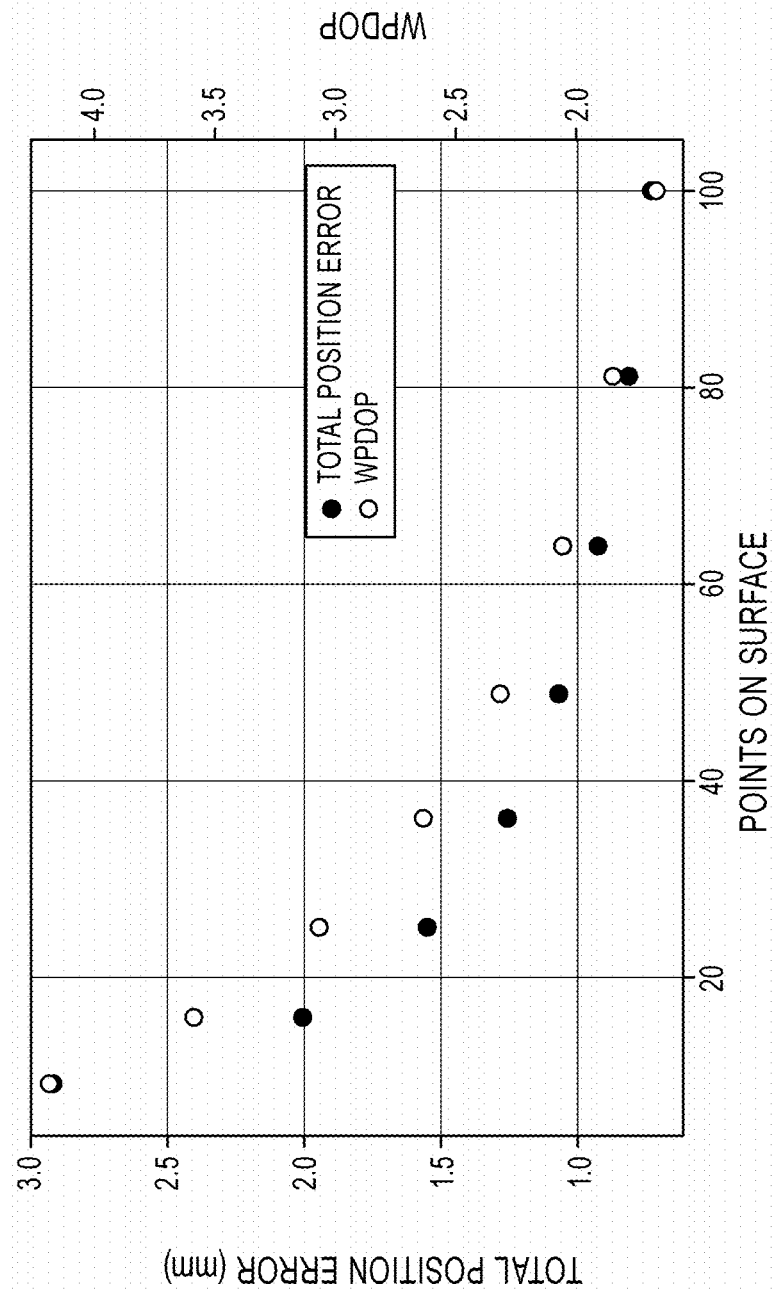

Trilateration position estimates were computed for increasing numbers of points on landmark surfaces to identify the effect of the number of LiDAR points on accuracy and precision. Four landmarks were used, and the number of points on the surface of each landmark was increased from 9 to 100 in squared increments. FIG. 31 depicts a graph showing the results of this simulation. As can be seen, average total position error and average weighted position dilution of precision both decreased as the number of points on the surface of the landmark increased. These results indicate that increasing the number of LiDAR points on a landmark increases position estimate accuracy and precision, and can be used to identify a minimum number of landmarks required to achieve a desired precision.

Figure 32:
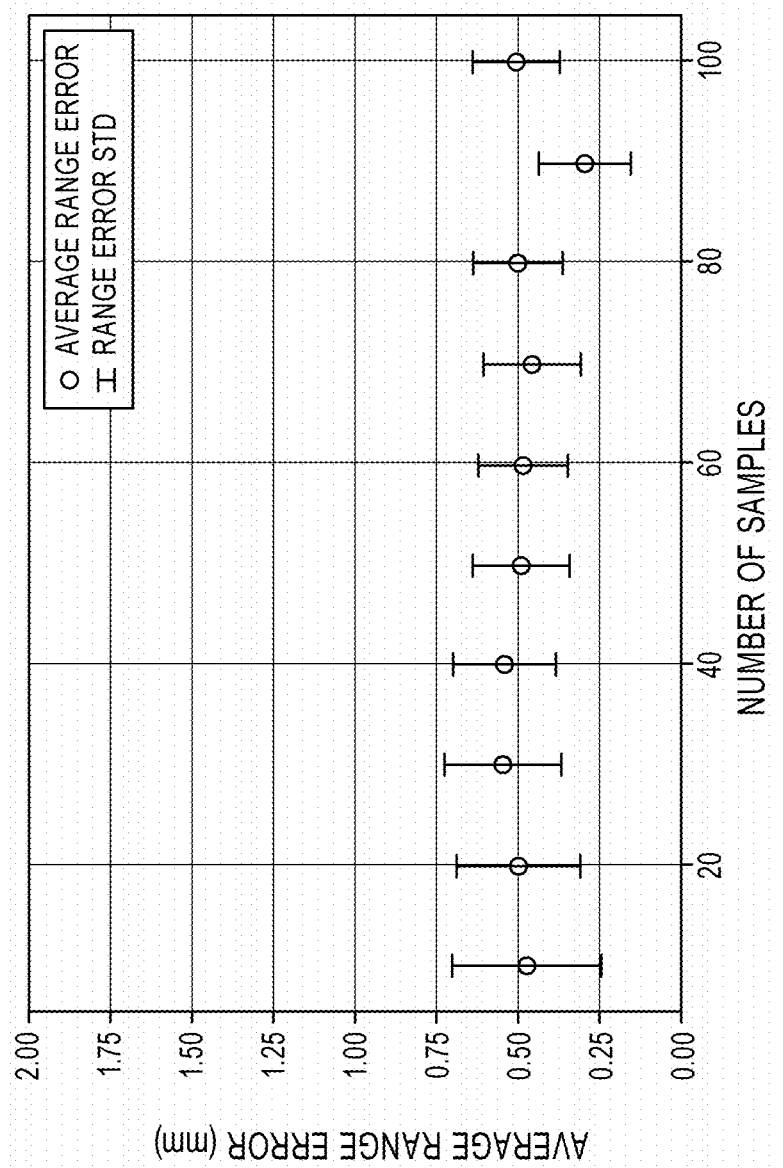

Experimental results were obtained using an indoor test environment to determine the performance of the hybrid camera-LiDAR surface fitting process. The positions measured by the hybrid camera-LiDAR surface fitting process was compared with positions generated by the previously described Vicon motion capture system. The hybrid camera-LiDAR surface fitting process was also compared to the hybrid camera-LiDAR single point process. To this end, images, LiDAR ranges, and Vicon positions were collected and postprocessed to determine the position estimates and weighted position dilution of precision. The hybrid camera-LiDAR surface fitting process was qualified by taking 100 scans of a single landmark on a desk where the known distance was measured. The landmark was placed 1146.4 mm away from and directly in front of the camera-LiDAR apparatus. The range to the centroid defined by the surface fitting process was 1145.69 mm. The point cloud was averaged incrementally with each sample gathered, and the range error computed with the respective point cloud per sample number. FIG. 32 depicts a graph showing average range error versus number of samples where black lines represent error bars from the standard deviation of each sample increment. As can be seen, the range error was found to be under 1 mm for all numbers of samples, and showed no clear trend indicating improvement with increasing numbers of samples. Accordingly, it appears that hybrid camera-LiDAR surface fitting process does not benefit by taking multiple scans of the same points.

Figure 33:
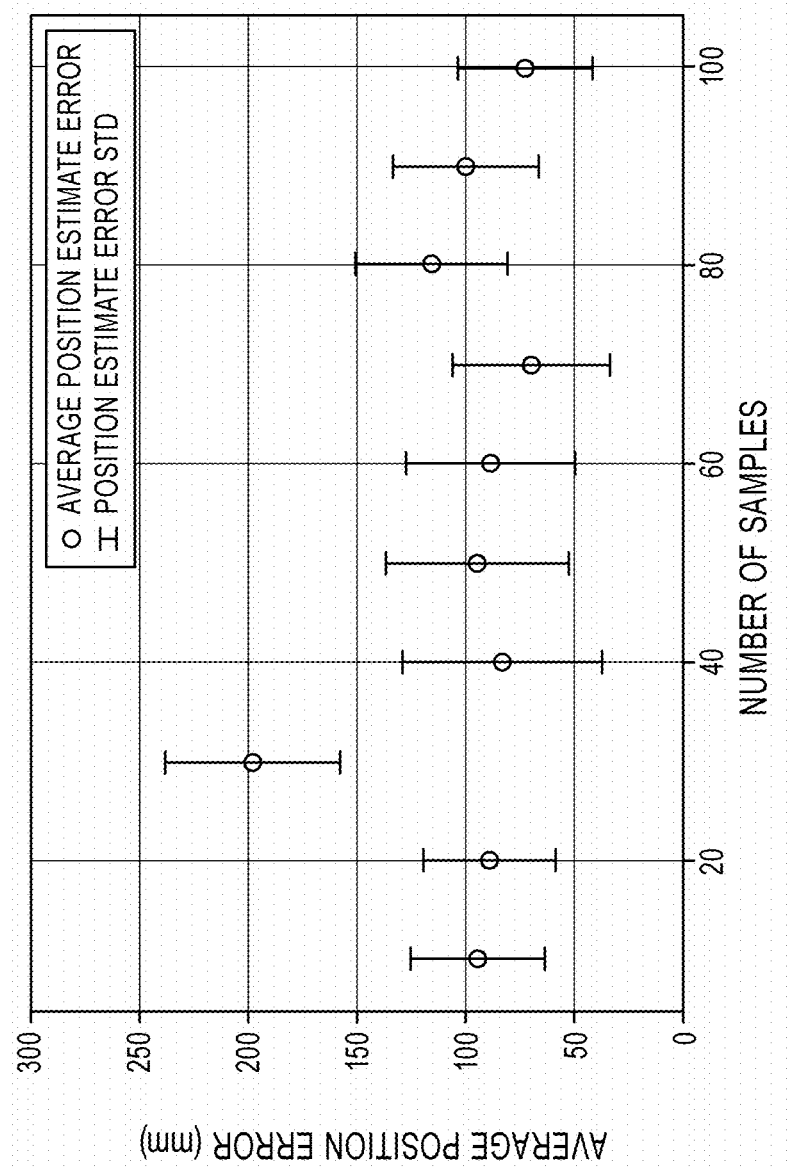
Figure 34:
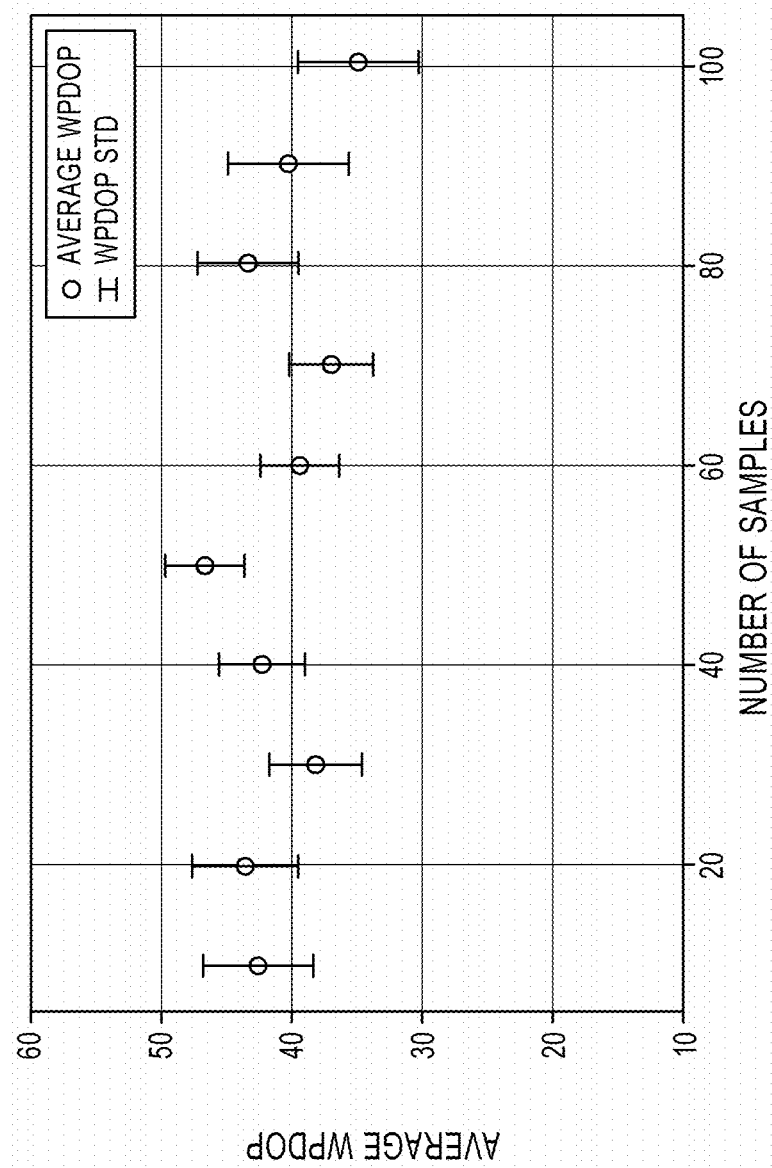

After simulation of the surface fitting process, four landmarks were used to obtain a position estimate using the hybrid camera-LiDAR trilateration process. As with previously described experimental tests, the fourth landmark was added to provide redundancy if one landmark was occluded. Table VI shows the positions of the landmarks as measured by the Vicon system. These positions were held constant during testing. The resulting data was postprocessed to calculate the weighted position dilution of precision and the position estimate while comparing to Vicon ground-truth position. The average error computed was 76.8 mm and the standard deviation was ±34.2 mm. FIG. 33 depicts a graph of average position error versus number of samples, where the black lines represent error bars from the standard deviation of each sample increment. FIG. 34 depicts a graph of weighted position dilution of precision versus number of samples. The average weighted position dilution of precision across all numbers of samples was 34.82. The weighted position dilution of precision includes the variance of each landmark's range estimates. This allows the dilution of precision to capture the effect of the number of points on variance. Solely examining position dilution of precision would have provided a constant value, as only the landmark geometry is considered with an assumed constant variance.

Figure 35:
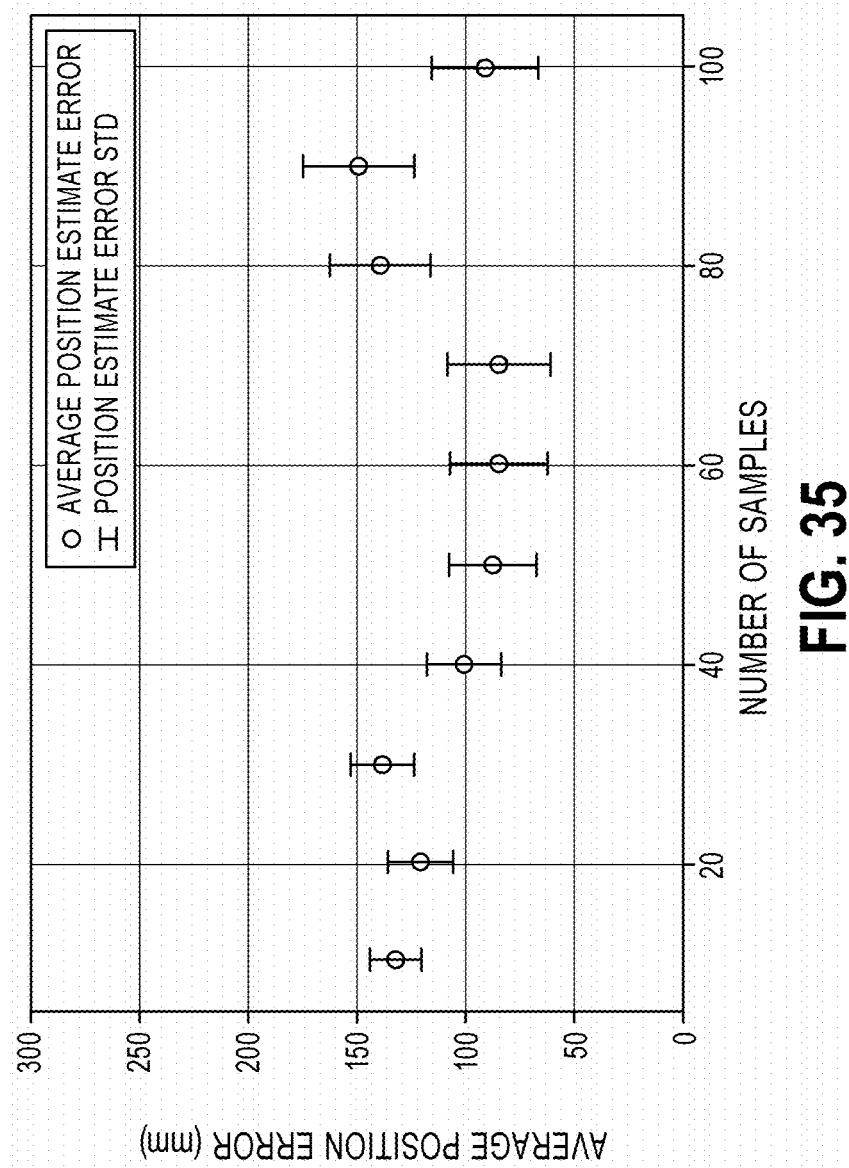

The surface fitting process was compared to the previous method of only taking a single point on the surface of the landmark and offsetting the range by the radius of the landmark to identify process improvements where the points clouds were incrementally averaged for both methods. FIG. 35 depicts a graph of average position error versus number of samples for the surface fitting method. The average error for the single-point method was 107.1 mm, with a standard deviation of ±18.9 mm. As can be determined from the data used to generate the graph of FIG. 35 that, on average, the surface fitting based hybrid trilateration process 312 of FIG. 23 provides an improvement of 28.3% in position accuracy over the single point process 10 of FIG. 1.

TABLE VI

EXPERIMENTAL LANDMARK POSITION & COLOR

| LANDMARK | X (mm) | Y (mm) | Z (mm) | COLOR |
|---|---|---|---|---|
| 1 | 374.8 | 83.52 | 250.0 | ORANGE |
| 2 | −249.9 | −191.9 | 70.0 | BLUE |
| 3 | 238.7 | −303.5 | −225.7 | PURPLE |
| 4 | −451.0 | 257.7 | 250.0 | GREEN |

The above experimental results show that the hybrid camera-LiDAR trilateration processes disclosed herein can be applied to a physical system with localization results rivaling GPS. Simulations show that increasing the number of points on landmark surfaces and the separation between landmarks result in more reliable navigation solutions by decreasing the weighted position dilution of precision in simulation. However, experiments were limited by the test environment as landmarks moved out of the field of view of the camera if separated by too great a distance. Sources of error for the present method can be attributed to the existence of minor lens distortion, small range errors mapping largely into position error due to relatively high weighted position dilution of precision, and the sensitivity of the LiDAR to camera projection to small angle offsets between the camera and LiDAR unit.

Figure 36:
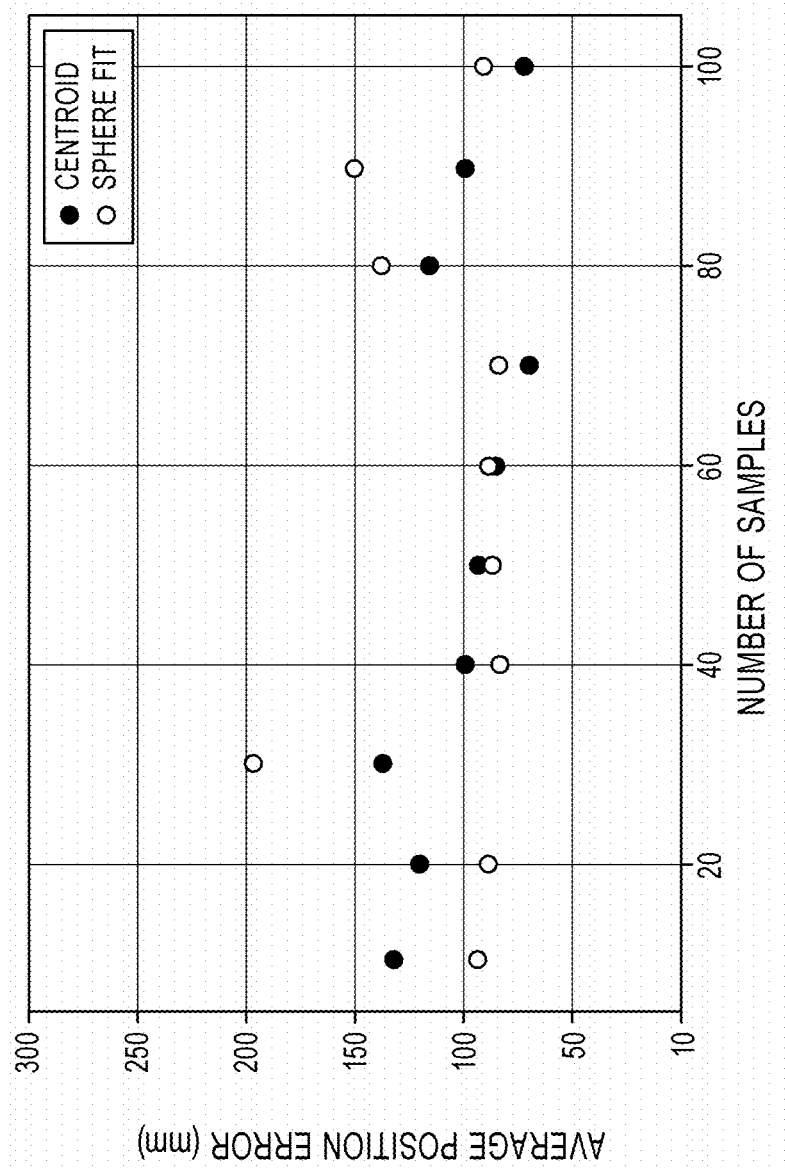

Although the disclosed process is explicitly defined for a pinhole camera model, it may be extended to a more generic case by including nonlinear lens distortion, such as is commonly present in wide-angle (e.g., fish-eye) lenses. FIG. 36 depicts a graph showing average position error verses number of samples for positions determined using the single-point landmark ranging method and the surface fitting landmark ranging method. As can be seen, trilateration using the surface fitting landmark ranging method typically produces a more accurate position estimate than trilateration using the single point landmark ranging method. That accuracy of the methods of determining position from landmarks disclosed herein (e.g., 77 mm for surface fitting, 107 mm for single point ranging) compare favorably with GPS (e.g., 3-5 meters), Global Differential GPS (GDGPS) (<100 mm), and Signals of Opportunity (SOOP) using Digital TeleVision (DTV) (1.9 meters).

Although spherical landmarks (and thus spherical surface fitting) were used in the simulations and experiments disclosed herein for purposes of simplicity, it should be understood that other shapes could be used for surface fitting. Indoor environments where spherical landmarks could be inserted such as warehouses or assembly lines could benefit from spherical fitting. For outdoor applications that are unable to rely as easily on surface fitting, trilateration using the single-point method with unique identifiable landmarks such as buildings, signs, or street intersections can provide sufficiently accurate position estimates in global position-constrained environments.

Figure 37:
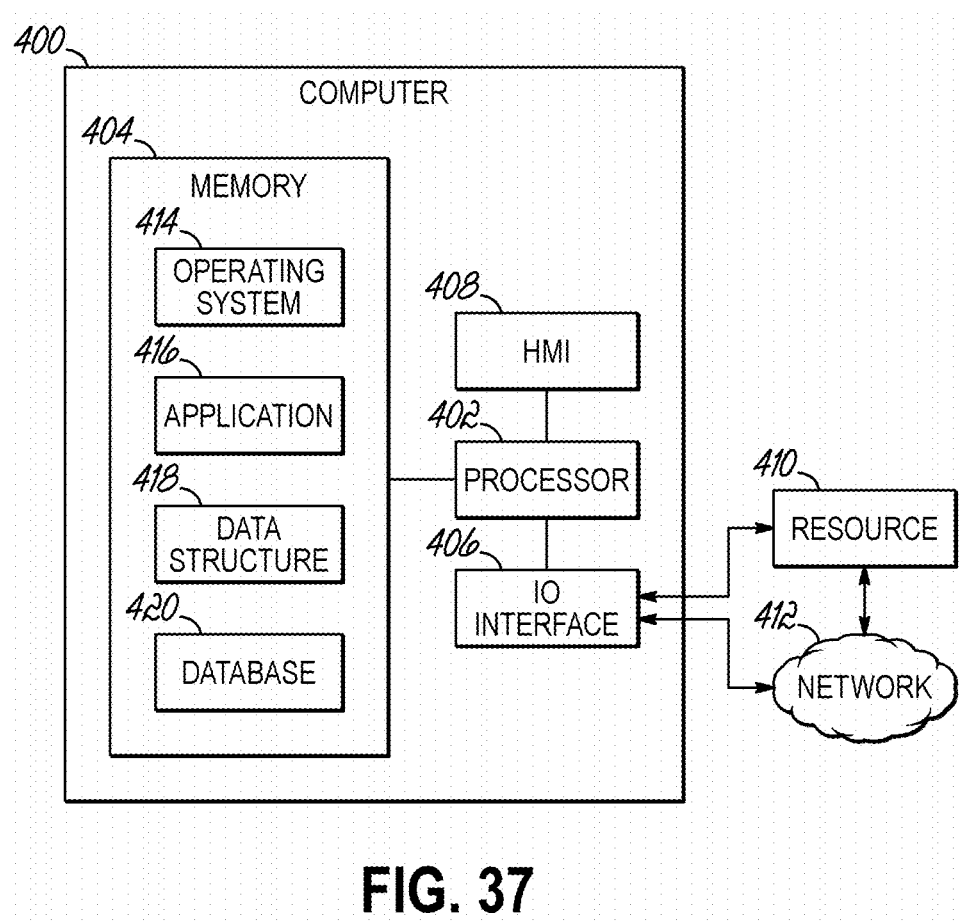
FIG. 37 is a diagrammatic view of a computer that may be used to implement one or more of the components or processes, or generate the data shown in FIGS. 1-21B.

Referring now to FIG. 37 embodiments of the invention described above, or portions thereof, may be implemented using one or more computer devices or systems, such as exemplary computer 400. The computer 400 may include a processor 402, a memory 404, an input/output (I/O) interface 406, and a Human Machine Interface (HMI) 408. The computer 400 may also be operatively coupled to one or more external resources 410 via one or more of the I/O interface 406 and a network 412. External resources may include, but are not limited to, servers, databases, mass storage devices, peripheral devices, cloud-based network services, or any other resource that may be used by the computer 400.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications, such as an application 416 residing in memory 404, may have instructions executed by the processor 402. In an alternative embodiment, the processor 402 may execute the application 416 directly, in which case the operating system 414 may be omitted. One or more data structures 418 may also reside in memory 404, and may be used by the processor 402, operating system 414, or application 416 to store or manipulate data.

The I/O interface 406 may provide a machine interface that operatively couples the processor 402 to other devices and systems, such as the external resource 410 or network 412. The application 416 may thereby work cooperatively with the external resource 410 or network 412 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 400. Indeed, given the nearly endless hardware and software configurations possible, persons having ordinary skill in the art will understand that embodiments of the invention may include applications that are located externally to the computer 400, distributed among multiple computers or other external resources 410, or provided by computing resources (hardware and software) that are provided as a service over the network 412, such as a cloud computing service.

The HMI 408 may be operatively coupled to the processor 402 of computer 400 to allow a user to interact directly with the computer 400. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404, and may be used to collect and organize data used by the various systems and modules described herein. The database 420 may include data and supporting data structures that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, which may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the text of the specification, flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of determining a position of a point in space, comprising:
   capturing a two-dimensional image from the point in space;
   identifying an object in the two-dimensional image that corresponds to a landmark;
   collecting range data that matches the two-dimensional image, the range data including one or more data points each defining a distance from the point in space to a respective point on the landmark;
   mapping a pixel of the object to a first data point of the range data; and
   estimating the position of the point in space based on a known global position of the landmark and a range to the landmark determined at least in part from the first data point.

2. The method of claim 1, wherein the one or more data points comprise a three-dimensional point cloud.

3. The method of claim 2 wherein mapping the pixel of the object to the first data point of the range data comprises:
   determining a centroid of the object;
   projecting the point cloud onto the two-dimensional image;
   converting projected vertex coordinates into pixel coordinates; and
   selecting the data point from the point cloud that produces the pixel coordinate nearest the centroid of the object as the first data point.

4. The method of claim 3, wherein the pixel is one of a plurality of pixels of the object each mapped to a respective data point of the three-dimensional point cloud, and further comprising:
   computing the range to the landmark as the distance from the point in space to the first data point plus an offset, wherein the offset is an estimated distance from the surface of the landmark corresponding the first data point and a three-dimensional point of the landmark associated with a known location of the landmark.

5. The method of claim 2, wherein the pixel is one of a plurality of pixels of the object each mapped to a respective data point of the three-dimensional point cloud, and further comprising:
   fitting the respective data points of the three-dimensional point cloud to a spherical surface;
   determining a center point of the spherical surface; and
   computing the range to the range to the landmark as the distance from the point in space to the center point of the spherical surface.

6. The method of claim 1 wherein the two-dimensional image is one of a group of one or more two-dimensional images captured from the point in space, and the object is one of a plurality of objects identified in at least one of the one or more two-dimensional images each corresponding to a respective landmark, and further comprising:
   identifying one or more additional objects in one or more of the one or more two-dimensional images that correspond to one or more additional landmarks;
   collecting range data for each of the one or more additional landmarks, the range data including a plurality of data points each defining the distance from the point in space to a respective point on the respective landmark;
   mapping, for each of the one or more pluralities of data points, a pixel of the respective object to a data point of the respective plurality of data points; and
   estimating the position of the point in space based on each distance defined by each mapped data point and the respective position of each landmark using trilateration.

7. The method of claim 1 wherein identifying the landmark in pixel coordinates comprises:
   masking the two-dimensional image according to a color threshold for the object; and
   determining a location of the object within the two-dimensional image using color based object detection.

8. The method of claim 7 further comprising:
   calculating a centroid of the object by defining an image moment of the masked two-dimensional image using a weighted average of pixel intensities.

9. The method of claim 7 wherein the object is one of a plurality of objects in the two-dimensional image each corresponding to a respective landmark, and a respective color threshold is defined for each object in the two-dimensional image.

10. The method of claim 1 wherein curve fitting is used to determine the distance from the point in space to the respective point in the respective landmark.

11. An apparatus for determining a position of a point in space, comprising:
- an imaging sensor;
- a ranging device;
- one or more processors; and
- a memory coupled to the one or more processors and including program code that, when executed by the one or more processors, causes the apparatus to:
- capture a two-dimensional image from the point in space;
- identify an object in the two-dimensional image that corresponds to a landmark;
- collect range data that matches the two-dimensional image, the range data including one or more data points each defining a distance from the point in space to a respective point on the landmark;
- map a pixel of the object to a first data point of the range data; and
- estimate the position of the point in space based on a known global position of the landmark and a range to the landmark determined at least in part from the first data point.

12. The apparatus of claim 11, wherein the one or more data points comprise a three-dimensional point cloud.

13. The apparatus of claim 12, wherein the program code causes the apparatus to map the pixel of the object to the first data point of the range data by:
- determining a centroid of the object;
- projecting the point cloud onto the two-dimensional image;
- converting projected vertex coordinates into pixel coordinates; and
- selecting the data point from the point cloud that produces the pixel coordinate nearest the centroid of the object as the first data point.

14. The apparatus of claim 13, wherein the pixel is one of a plurality of pixels of the object each mapped to a respective data point of the three-dimensional point cloud, and the program code further causes the apparatus to:
- compute the range to the landmark as the distance from the point in space to the first data point plus an offset, wherein the offset is an estimated distance from the surface of the landmark corresponding the first data point and a three-dimensional point of the landmark associated with a known location of the landmark.

15. The apparatus of claim 12, wherein the pixel is one of a plurality of pixels of the object each mapped to a respective data point of the three-dimensional point cloud, and the program code further causes the apparatus to:
- fit the respective data points of the three-dimensional point cloud to a spherical surface;
- determine a center point of the spherical surface; and
- compute the range to the range to the landmark as the distance from the point in space to the center point of the spherical surface.

16. The apparatus of claim 11, wherein the two-dimensional image is one of a group of one or more two-dimensional images captured from the point in space, and the object is one of a plurality of objects identified in at least one of the one or more two-dimensional images each corresponding to a respective landmark, and the program code causes the apparatus to:
- identify one or more additional objects in one or more of the one or more two-dimensional images that correspond to one or more additional landmarks;
- collect range data for each of the one or more additional landmarks, the range data including a plurality of data points each defining the distance from the point in space to a respective point on the respective landmark;
- map, for each of the one or more pluralities of data points, a pixel of the respective object to a data point of the respective plurality of data points; and
- estimate the position of the point in space based on each distance defined by each mapped data point and the respective position of each landmark using trilateration.

17. The apparatus of claim 11, wherein the program code causes the apparatus to identify the landmark in pixel coordinates by:
- masking the two-dimensional image according to a color threshold for the object; and
- determining a location of the object within the two-dimensional image using color based object detection.

18. The apparatus of claim 17, wherein the program code further causes the apparatus to:
- calculate a centroid of the object by defining an image moment of the masked two-dimensional image using a weighted average of pixel intensities.

19. The apparatus of claim 11, wherein the program code causes the apparatus to determine the distance from the point in space to the respective point in the respective landmark using curve fitting.

20. A computer program product for determining a position of a point in space, comprising:
- a non-transitory computer-readable storage medium; and
- program code stored on the non-transitory computer-readable storage medium that, when executed by one or more processors, causes the one or more processors to:
- capture a two-dimensional image from the point in space;
- identify an object in the two-dimensional image that corresponds to a landmark;
- collect range data that matches the two-dimensional image, the range data including one or more data points each defining a distance from the point in space to a respective point on the landmark;
- map a pixel of the object to a first data point of the range data; and
- estimate the position of the point in space based on a known global position of the landmark and a range to the landmark determined at least in part from the first data point.

* * * * *